(12) United States Patent
Chen et al.

(10) Patent No.: US 10,659,803 B2
(45) Date of Patent: *May 19, 2020

(54) PICTURE PREDICTION METHOD AND RELATED APPARATUS

(71) Applicant: Huawei Technologies Co., Ltd., Shenzhen (CN)

(72) Inventors: Huanbang Chen, Guangzhou (CN); Sixin Lin, Shenzhen (CN); Fan Liang, Guangzhou (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,329

(22) Filed: May 15, 2019

(65) Prior Publication Data

US 2019/0268616 A1 Aug. 29, 2019

Related U.S. Application Data

(63) Continuation of application No. 15/699,515, filed on Sep. 8, 2017, now Pat. No. 10,404,993, which is a
(Continued)

(30) Foreign Application Priority Data

Mar. 10, 2015 (WO) ................ PCT/CN2015/073969

(51) Int. Cl.
*H04N 19/139* (2014.01)
*H04N 19/513* (2014.01)
(Continued)

(52) U.S. Cl.
CPC ......... *H04N 19/513* (2014.11); *H04N 19/119* (2014.11); *H04N 19/537* (2014.11)

(58) Field of Classification Search
CPC .. H04N 19/513; H04N 19/537; H04N 19/119; H04N 19/52; H04N 19/182;
(Continued)

(56) References Cited

U.S. PATENT DOCUMENTS 6,084,912 A 7/2000 Reitmeier et al.
7,272,267 B1 9/2007 Nakajima
(Continued)

FOREIGN PATENT DOCUMENTS

CN 1347063 A 5/2002
CN 104363451 A 5/2002
(Continued)

OTHER PUBLICATIONS

Wu et al., "A differential method for simultaneous estimation of rotation, change of scale and translation", Signal Processing. Image Communication vol. 2, No. 1, XP024241821, Elsevier Science Publishers, Amsterdam (1990).
(Continued)

*Primary Examiner* — Howard D Brown, Jr.
(74) *Attorney, Agent, or Firm* — Leydig, Voit & Mayer, Ltd.

(57) ABSTRACT

A picture prediction method includes: determining two pixel samples in a current picture block, and determining a candidate motion information unit set corresponding to each of the two pixel samples; determining a merged motion information unit set i including two motion information units; and predicting a pixel value of the current picture block by using an affine motion model and the merged motion information unit set i.

12 Claims, 13 Drawing Sheets

Related U.S. Application Data continuation of application No. PCT/CN2015/075094, filed on Mar. 26, 2015.

(51) Int. Cl.
*H04N 19/119* (2014.01)
*H04N 19/537* (2014.01)

(58) Field of Classification Search
CPC ...... H04N 19/176; H04N 19/61; H04N 19/18; G06T 9/00; G06T 7/20; G06F 17/14
See application file for complete search history.

(56) References Cited

U.S. PATENT DOCUMENTS

| | | | |
|---|---|---|---|
| 10,404,993 B2* | 9/2019 | Chen | H04N 19/119 |
| 2002/0034250 A1 | 3/2002 | Yoo | |
| 2003/0133510 A1 | 7/2003 | Nishikawa et al. | |
| 2003/0154921 A1 | 8/2003 | Matsuki | |
| 2003/0174775 A1 | 9/2003 | Nagaya et al. | |
| 2004/0165664 A1 | 8/2004 | Karczewicz et al. | |
| 2008/0089428 A1 | 4/2008 | Nakamura et al. | |
| 2011/0103487 A1 | 5/2011 | Pateux et al. | |
| 2012/0106645 A1 | 5/2012 | Lin et al. | |
| 2013/0148734 A1 | 6/2013 | Nakamura | |
| 2013/0300591 A1* | 11/2013 | Marpe | H03M 7/46 341/67 |
| 2014/0126638 A1 | 5/2014 | Sievers et al. | |
| 2017/0188041 A1 | 6/2017 | Li et al. | |
| 2017/0195685 A1 | 7/2017 | Chen et al. | |
| 2017/0374379 A1* | 12/2017 | Chen | H04N 19/513 |
| 2018/0184109 A1 | 6/2018 | Lin et al. | |
| 2019/0098312 A1* | 3/2019 | Chen | H04N 19/139 |
| 2019/0268616 A1 | 8/2019 | Chen et al. | |

FOREIGN PATENT DOCUMENTS

| | | |
|---|---|---|
| CN | 1144469 C | 3/2004 |
| CN | 1211761 C | 7/2005 |
| CN | 101350928 A | 1/2009 |
| CN | 102158709 A | 8/2011 |
| CN | 102883160 A | 1/2013 |
| CN | 104539966 A | 4/2015 |
| CN | 104935938 A | 9/2015 |
| EP | 3177015 A1 | 6/2017 |
| JP | H043595 A | 1/1992 |
| JP | 2003274410 A | 9/2003 |
| JP | 2017536002 A | 11/2017 |
| JP | 6404487 B2 | 10/2018 |
| RU | 2509439 C2 | 3/2014 |
| WO | 0154418 A1 | 7/2001 |

OTHER PUBLICATIONS

He et al., "Efficient coding with adaptive motion models," Picture Coding Symposium, XP030080026 (Apr. 2003).

Huang et al., "Control-Point Representation and Differential Coding Affine-Motion Compensation," IEEE Transactions on Circuits and Systems for Video Technology, vol. 23, No. 10, pp. 1651-1660, Institute of Electrical and Electronics Engineers, New York, New York (Oct. 2013).

Yuan et al., "Affine Model Based Motion Compensation Prediction for Zoom," IEEE Transactions on Multimedia, vol. 14, No. 4, pp. 1370-1375, Institute of Electrical and Electronics Engineers, New York, New York Aug. 2012).

"Series H: Audiovisual and Multimedia Systems Infrastructure of audiovisual services—Coding of moving Video; Advanced video coding for generic audiovisual services," Recommendation ITU-T H.264, International Telecommunciation Union, Geneva, Switzerland (Feb. 2014).

"Series H: Audiovisual and Multimedia Systems Infrastructure of audiovisual services—Coding of moving Video; High efficiency video coding," Recommendation ITU-T H.265, International Telecommunication Union, Geneva, Switzerland (Oct. 2014).

Wang et al., "Four Parameter Model Based Motion Estimation in Frequency Domain," Acta Electronics Sinica vol. 31, No. 1, The Institute of Intelligent Control, Shanghai Jiaotong University, Shanghai, China (Jan. 2003).

Asamizu et al., "A Motion Model for Motion Compensation Based on Table Lookup," vol. 22, No. 8, pp. 7-12, The Institute of Image Information and Television Engineers, Japan (1998).

Yamaguchi, et al., "Motion compensation for moving picture coding of an object", Proceedings of the 1999 IEICE General Conference, Institute of Electronics, Information and Communication Engineers, Tokyo, Japan (1999).

* cited by examiner

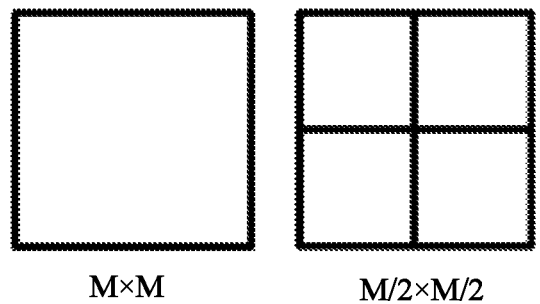
FIG. 1-a
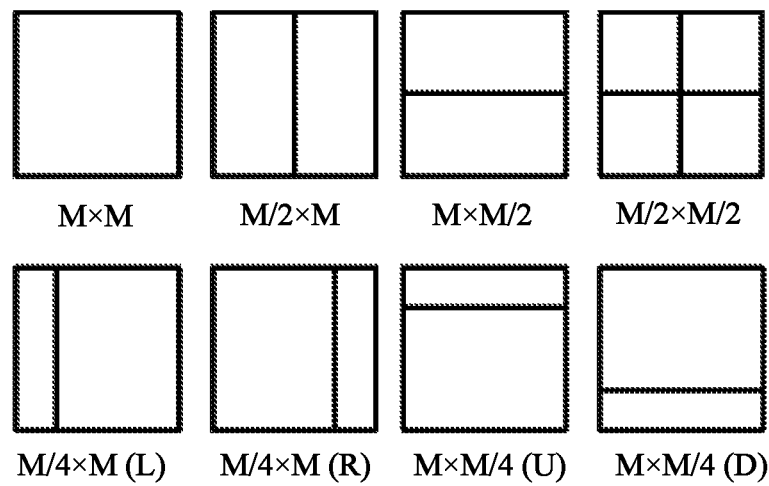
FIG. 1-b

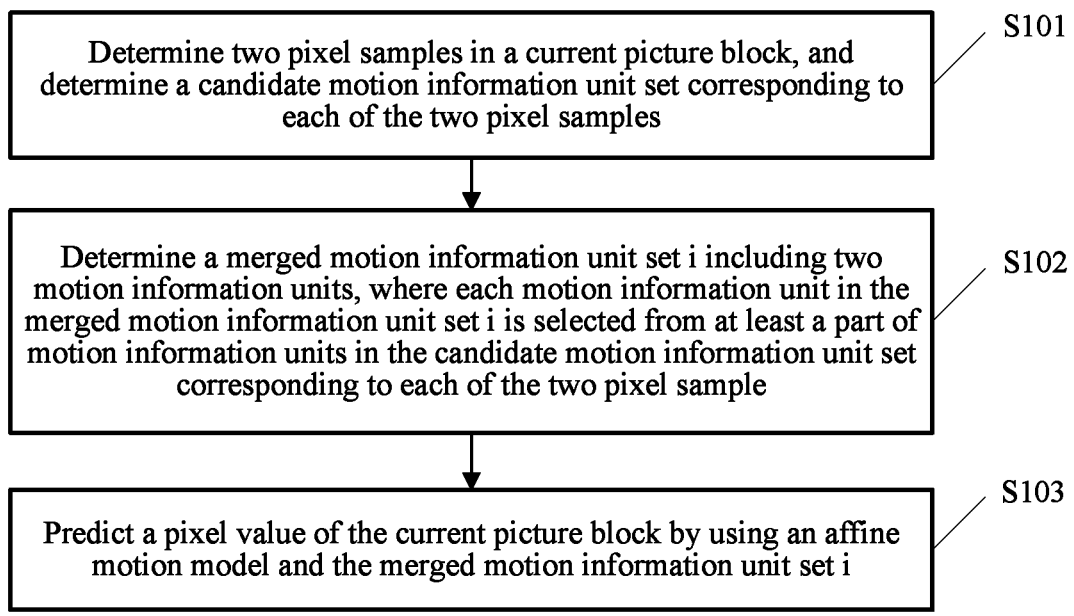
FIG. 1-c
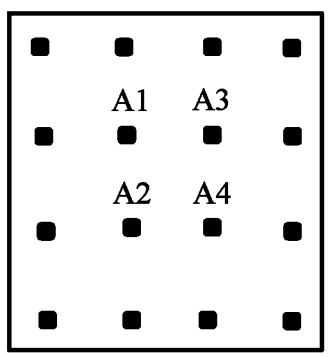
FIG. 1-d

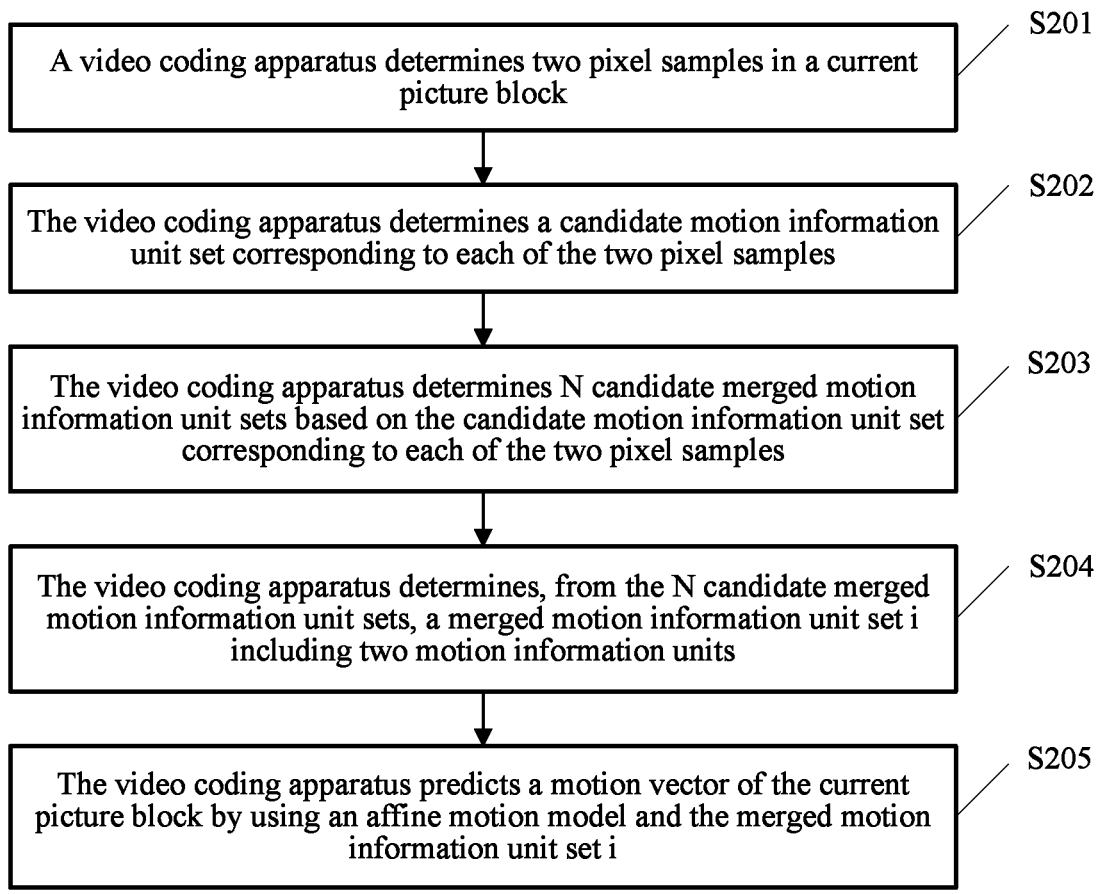
FIG. 2-a
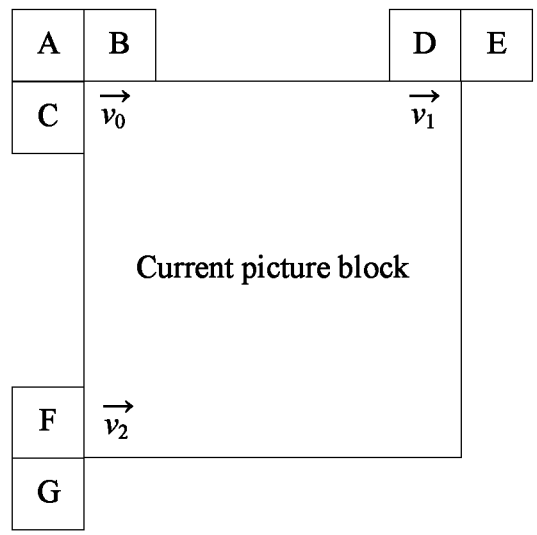
FIG. 2-b

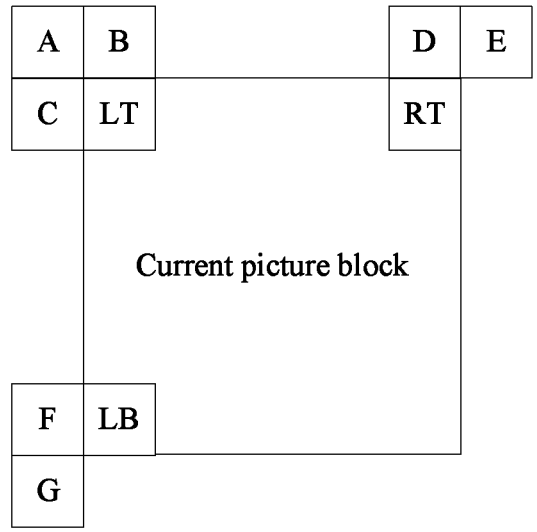
FIG. 2-c
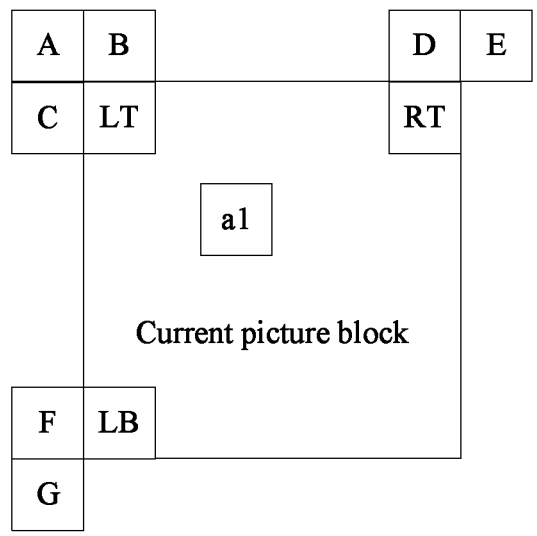
FIG. 2-d

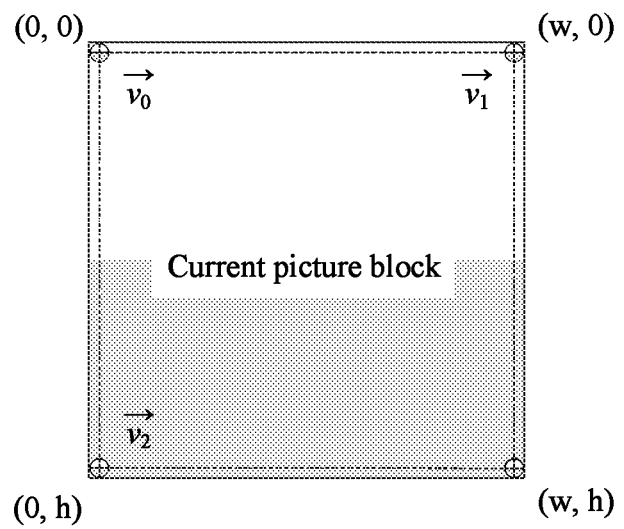
FIG. 2-e
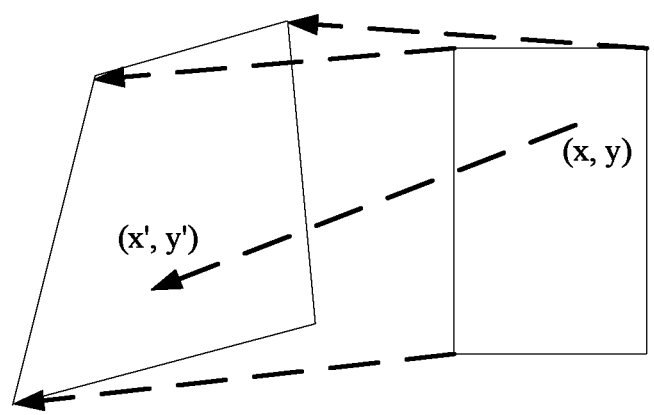
FIG. 2-f

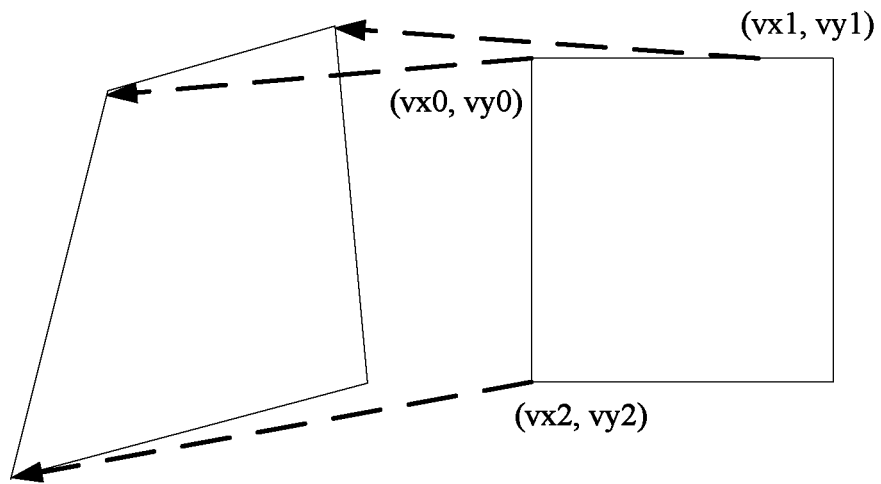
FIG. 2-g
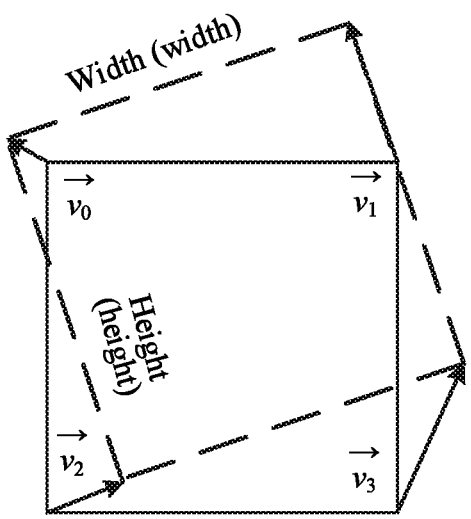
FIG. 2-h

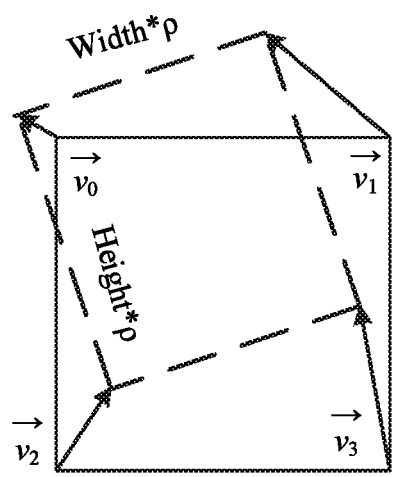
FIG. 2-i

PICTURE PREDICTION METHOD AND RELATED APPARATUS

CROSS-REFERENCE TO RELATED APPLICATIONS

This application is a continuation of U.S. patent application Ser. No. 15/699,515, filed on Sep. 8, 2017, which is a continuation of International Application No. PCT/CN2015/075094, filed on Mar. 26, 2015, which claims priority to International Application No. PCT/CN2015/073969, filed on Mar. 10, 2015. The disclosures of the aforementioned applications are hereby incorporated by reference in their entireties

TECHNICAL FIELD

The present disclosure relates to the field of video coding/decoding, and in particular, to a picture prediction method and a related device.

BACKGROUND

With development of photoelectric acquisition technologies and increasing requirements for high-definition digital videos, an amount of video data is becoming large. Due to limited heterogeneous transmission bandwidths and diversified video applications, higher requirements are continuously imposed on video coding efficiency. Development of a high efficiency video coding (HEVC) standard is initiated according to the requirements.

A basic principle of video compression coding is to use correlation between a space domain, a time domain, and a code word to remove redundancy as much as possible. Currently, a prevalent practice is to use a block-based hybrid video coding framework to implement video compression coding by performing steps of prediction (including intra-frame prediction and inter-frame prediction), transform, quantization, entropy coding, and the like. This coding framework shows high viability, and therefore, HEVC still uses this block-based hybrid video coding framework.

In various video coding/decoding solutions, motion estimation or motion compensation is a key technology that affects coding/decoding efficiency. In various conventional video coding/decoding solutions, it is assumed that motion of an object is always translational motion, and that motion of all parts of the entire object is the same. Basically, all conventional motion estimation or motion compensation algorithms are block motion compensation algorithms that are established based on a translational motion model (translational motion model). However, motion in the real world is diversified, and irregular motion such as scaling up/down, rotation, or parabolic motion is ubiquitous. Since the ninth decade of the last century, video coding experts have realized universality of irregular motion, and wished to introduce an irregular motion model (for example, an affine motion model) to improve video coding efficiency. However, computational complexity of conventional picture prediction performed based on the affine motion model is usually quite high.

SUMMARY

Embodiments of the present disclosure provide a picture prediction method and a related device to reduce computational complexity of picture prediction performed based on an affine motion model.

According to a first aspect, the present disclosure provides a picture prediction method, including:
determining two pixel samples in a current picture block, and determining a candidate motion information unit set corresponding to each of the two pixel samples, where the candidate motion information unit set corresponding to each pixel sample includes at least one candidate motion information unit;
determining a merged motion information unit set i including two motion information units, where
each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and
predicting a pixel value of the current picture block by using an affine motion model and the merged motion information unit set i.

With reference to the first aspect, in a first possible implementation of the first aspect, the determining a merged motion information unit set i including two motion information units includes:
determining, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

With reference to the first possible implementation of the first aspect, in a second possible implementation of the first aspect, the N candidate merged motion information unit sets meet at least one of a first condition, a second condition, a third condition, a fourth condition, or a fifth condition, where
the first condition includes that a motion mode of the current picture block indicated by a motion information unit in any one of the N candidate merged motion information unit sets is non-translational motion;
the second condition includes that prediction directions corresponding to two motion information units in any one of the N candidate merged motion information unit sets are the same;
the third condition includes that reference frame indexes corresponding to two motion information units in any one of the N candidate merged motion information unit sets are the same;
the fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples; and
the fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of any motion information unit in one of the N candidate merged motion information unit sets and a vertical component of a motion vector of a pixel sample Z is less than or equal to a horizontal component threshold, where the pixel sample Z in the current picture block is different from either of the two pixel samples.

With reference to any one of the first aspect, or the first to the second possible implementations of the first aspect, in a third possible implementation of the first aspect, the two pixel samples include two pixel samples in an upper left pixel sample, an upper right pixel sample, a lower left pixel sample, and a central pixel sample a1 of the current picture block, where the upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

With reference to the third possible implementation of the first aspect, in a fourth possible implementation of the first aspect, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer, where the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

With reference to the third or the fourth possible implementation of the first aspect, in a fifth possible implementation of the first aspect, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer, where the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

With reference to any one of the third to the fifth possible implementations of the first aspect, in a sixth possible implementation of the first aspect, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer, where the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

With reference to any one of the third to the sixth possible implementations of the first aspect, in a seventh possible implementation of the first aspect, a candidate motion information unit set corresponding to the central pixel sample a1 of the current picture block includes motion information units of x5 pixel samples, and one of the x5 pixel samples is a pixel sample a2, where a location of the central pixel sample a1 in the video frame to which the current picture block belongs is the same as a location of the pixel sample a2 in a video frame adjacent to the video frame to which the current picture block belongs, and x5 is a positive integer.

With reference to any one of the first aspect, or the first to the seventh possible implementations of the first aspect, in an eighth possible implementation of the first aspect, the predicting a pixel value of the current picture block by using an affine motion model and the merged motion information unit set i includes: when a reference frame index corresponding to a motion vector whose prediction direction is a first prediction direction in the merged motion information unit set i is different from a reference frame index of the current picture block, performing scaling processing on the merged motion information unit set i, so that the motion vector whose prediction direction is the first prediction direction in the merged motion information unit set i is scaled down to a reference frame of the current picture block, and predicting the pixel value of the current picture block by using the affine motion model and a scaled merged motion information unit set i, where the first prediction direction is forward or backward; or the predicting a pixel value of the current picture block by using an affine motion model and the merged motion information unit set i includes: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, performing scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predicting the pixel value of the current picture block by using the affine motion model and a scaled merged motion information unit set i.

With reference to any one of the first aspect, or the first to the eighth possible implementations of the first aspect, in a ninth possible implementation of the first aspect, the predicting a pixel value of the current picture block by using an affine motion model and the merged motion information unit set i includes:

obtaining a motion vector of each pixel in the current picture block through computation by using the affine motion model and the merged motion information unit set i, and determining a predicted pixel value of each pixel in the current picture block by using the motion vector that is of each pixel in the current picture block and is obtained through computation; or obtaining a motion vector of each pixel block in the current picture block through computation by using the affine motion model and the merged motion information unit set i, and determining a predicted pixel value of each pixel in each pixel block in the current picture block by using the motion vector that is of each pixel block in the current picture block and is obtained through computation.

With reference to any one of the first aspect, or the first to the ninth possible implementations of the first aspect, in a tenth possible implementation of the first aspect, the predicting a pixel value of the current picture block by using an affine motion model and the merged motion information unit set i includes: obtaining a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i.

With reference to the tenth possible implementation of the first aspect, in an eleventh possible implementation of the first aspect, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

With reference to any one of the first aspect, or the first to the eleventh possible implementations of the first aspect, in a twelfth possible implementation of the first aspect, the affine motion model is in the following form:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

the motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is the length or width of the current picture block.

With reference to any one of the first aspect, or the first to the twelfth possible implementations of the first aspect, in a thirteenth possible implementation of the first aspect, the picture prediction method is applied to a video coding process, or the picture prediction method is applied to a video decoding process.

With reference to the thirteenth possible implementation of the first aspect, in a fourteenth possible implementation of the first aspect, when the picture prediction method is applied to the video decoding process, the determining, from N candidate merged motion information unit sets, the merged motion information unit set i including the two motion information units includes: determining, from the N candidate merged motion information unit sets, based on an identifier that is of the merged motion information unit set i and is obtained from a video bit stream, the merged motion information unit set i including the two motion information units.

With reference to the thirteenth possible implementation of the first aspect or the fourteenth possible implementation of the first aspect, in a fifteenth possible implementation of the first aspect, when the picture prediction method is applied to the video decoding process, the method further includes: decoding the video bit stream to obtain motion vector differences of the two pixel samples, obtaining motion vector predictors of the two pixel samples by using motion vectors of pixel samples spatially adjacent or temporally adjacent to the two pixel samples, and obtaining the motion vectors of the two pixel samples separately based on the motion vector predictors of the two pixel samples and the motion vector differences of the two pixel samples.

With reference to the thirteenth possible implementation of the first aspect, in a sixteenth possible implementation of the first aspect, when the picture prediction method is applied to the video coding process, the method further includes: obtaining motion vector predictors of the two pixel samples by using motion vectors of pixel samples spatially adjacent or temporally adjacent to the two pixel samples, obtaining motion vector differences of the two pixel samples according to the motion vector predictors of the two pixel samples, and writing the motion vector differences of the two pixel samples into a video bit stream.

With reference to the thirteenth possible implementation of the first aspect or the sixteenth possible implementation of the first aspect, in a seventeenth possible implementation of the first aspect, when the picture prediction method is applied to the video coding process, the method further includes: writing an identifier of the merged motion information unit set i into the video bit stream.

According to a second aspect, an embodiment of the present disclosure provides a picture prediction apparatus, including:

a first determining unit, configured to: determine two pixel samples in a current picture block, and determine a candidate motion information unit set corresponding to each of the two pixel samples, where the candidate motion information unit set corresponding to each pixel sample includes at least one candidate motion information unit;

a second determining unit, configured to determine a merged motion information unit set i including two motion information units, where each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and a predicting unit, configured to predict a pixel value of the current picture block by using an affine motion model and the merged motion information unit set i.

With reference to the second aspect, in a first possible implementation of the second aspect, the second determining unit is specifically configured to determine, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

With reference to the first possible implementation of the second aspect, in a second possible implementation of the second aspect, the N candidate merged motion information unit sets meet at least one of a first condition, a second condition, a third condition, a fourth condition, or a fifth condition, where the first condition includes that a motion mode of the current picture block indicated by a motion information unit in any one of the N candidate merged motion information unit sets is non-translational motion;

the second condition includes that prediction directions corresponding to two motion information units in any one of the N candidate merged motion information unit sets are the same;

the third condition includes that reference frame indexes corresponding to two motion information units in any one of the N candidate merged motion information unit sets are the same;

the fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples; and the fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of one motion information unit in any one of the N candidate merged motion information unit sets and a vertical component of a motion vector of a pixel sample Z is less than or equal to a vertical component threshold, where the pixel sample Z in the current picture block is different from either of the two pixel samples.

With reference to any one of the second aspect, or the first to the second possible implementations of the second aspect, in a third possible implementation of the second aspect, the two pixel samples include two pixel samples in an upper left pixel sample, an upper right pixel sample, a lower left pixel sample, and a central pixel sample a1 of the current picture block, where the upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

With reference to the third possible implementation of the second aspect, in a fourth possible implementation of the second aspect, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer, where the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

With reference to the third or the fourth possible implementation of the second aspect, in a fifth possible implementation of the second aspect, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer, where the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

With reference to any one of the third to the fifth possible implementations of the second aspect, in a sixth possible implementation of the second aspect, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer, where the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

With reference to any one of the third to the sixth possible implementations of the second aspect, in a seventh possible implementation of the second aspect, a candidate motion information unit set corresponding to the central pixel sample a1 of the current picture block includes motion information units of x5 pixel samples, and one of the x5 pixel samples is a pixel sample a2, where a location of the central pixel sample a1 in the video frame to which the current picture block belongs is the same as a location of the pixel sample a2 in a video frame adjacent to the video frame to which the current picture block belongs, and x5 is a positive integer.

With reference to any one of the second aspect, or the first to the seventh possible implementations of the second aspect, in an eighth possible implementation of the second aspect, the predicting unit is specifically configured to: when a reference frame index corresponding to a motion vector whose prediction direction is a first prediction direction in the merged motion information unit set i is different from a reference frame index of the current picture block, perform scaling processing on the merged motion information unit set i, so that the motion vector whose prediction direction is the first prediction direction in the merged motion information unit set i is scaled down to a reference frame of the current picture block, and predict the pixel value of the current picture block by using the affine motion model and a scaled merged motion information unit set i, where the first prediction direction is forward or backward; or the predicting unit is specifically configured to: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, perform scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predict the pixel value of the current picture block by using the affine motion model and a scaled merged motion information unit set i.

With reference to any one of the second aspect, or the first to the eighth possible implementations of the second aspect, in a ninth possible implementation of the second aspect, the predicting unit is specifically configured to: obtain a motion vector of each pixel in the current picture block through computation by using the affine motion model and the merged motion information unit set i, and determine a predicted pixel value of each pixel in the current picture block by using the motion vector that is of each pixel in the current picture block and is obtained through computation; or the predicting unit is specifically configured to: obtain a motion vector of each pixel block in the current picture block through computation by using the affine motion model and the merged motion information unit set i, and determine a predicted pixel value of each pixel in each pixel block in the current picture block by using the motion vector that is of each pixel block in the current picture block and is obtained through computation.

With reference to any one of the second aspect, or the first to the ninth possible implementations of the second aspect, in a tenth possible implementation of the second aspect, the predicting unit is specifically configured to obtain a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i.

With reference to the tenth possible implementation of the second aspect, in an eleventh possible implementation of the second aspect, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

With reference to any one of the second aspect, or the first to the eleventh possible implementations of the second aspect, in a twelfth possible implementation of the second aspect, the affine motion model is in the following form:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where the motion vectors of the two pixel samples are $(vx_0, vy_0)$ and $(vx_1, vy_1)$ respectively, vx is a horizontal component of a motion vector of a pixel sample whose coordinates are $(x, y)$ in the current picture block, vy is a vertical component of the motion vector of the pixel sample whose coordinates are $(x, y)$ in the current picture block, and w is the length or width of the current picture block.

With reference to any one of the second aspect, or the first to the twelfth possible implementations of the second aspect, in a thirteenth possible implementation of the second aspect, the picture prediction apparatus is applied to a video coding apparatus, or the picture prediction apparatus is applied to a video decoding apparatus.

With reference to the thirteenth possible implementation of the second aspect, in a fourteenth possible implementation of the second aspect, when the picture prediction apparatus is applied to the video decoding apparatus, the second determining unit is specifically configured to determine, from the N candidate merged motion information unit sets, based on an identifier that is of the merged motion information unit set i and is obtained from a video bit stream, the merged motion information unit set i including the two motion information units.

With reference to the thirteenth possible implementation of the second aspect or the fourteenth possible implementation of the second aspect, in a fifteenth possible implementation of the second aspect, when the picture prediction apparatus is applied to the video decoding apparatus, the apparatus further includes a decoding unit, configured to: decode the video bit stream to obtain motion vector differences of the two pixel samples, obtain motion vector predictors of the two pixel samples by using motion vectors of pixel samples spatially adjacent or temporally adjacent to the two pixel samples, and obtain the motion vectors of the two pixel samples separately based on the motion vector predictors of the two pixel samples and the motion vector differences of the two pixel samples.

With reference to the thirteenth possible implementation of the second aspect, in a sixteenth possible implementation of the second aspect, when the picture prediction apparatus is applied to the video coding apparatus, the predicting unit is further configured to: obtain motion vector predictors of the two pixel samples by using motion vectors of pixel samples spatially adjacent or temporally adjacent to the two pixel samples, obtain motion vector differences of the two pixel samples according to the motion vector predictors of the two pixel samples, and write the motion vector differences of the two pixel samples into a video bit stream.

With reference to the thirteenth possible implementation of the second aspect or the sixteenth possible implementation of the second aspect, in a seventeenth possible implementation of the second aspect, when the picture prediction apparatus is applied to the video coding apparatus, the apparatus further includes an encoding unit, configured to write an identifier of the merged motion information unit set i into the video bit stream.

According to a third aspect, an embodiment of the present disclosure provides a picture prediction apparatus, including:

a processor and a memory, where the processor invokes code or an instruction stored in the memory, so that the processor is configured to: determine two pixel samples in a current picture block, and determine a candidate motion information unit set corresponding to each of the two pixel samples, where the candidate motion information unit set corresponding to each pixel sample includes at least one candidate motion information unit; determine a merged motion information unit set i including two motion information units, where each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and predict a pixel value of the current picture block by using an affine motion model and the merged motion information unit set i.

With reference to the third aspect, in a first possible implementation of the third aspect, in an aspect of determining the merged motion information unit set i including the two motion information units, the processor is configured to determine, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

With reference to the first possible implementation of the third aspect, in a second possible implementation of the third aspect, the N candidate merged motion information unit sets meet at least one of a first condition, a second condition, a third condition, a fourth condition, or a fifth condition, where the first condition includes that a motion mode of the current picture block indicated by a motion information unit in any one of the N candidate merged motion information unit sets is non-translational motion;

the second condition includes that prediction directions corresponding to two motion information units in any one of the N candidate merged motion information unit sets are the same;

the third condition includes that reference frame indexes corresponding to two motion information units in any one of the N candidate merged motion information unit sets are the same;

the fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples; and the fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of any motion information unit in one of the N candidate merged motion information unit sets and a vertical component of a motion vector of a pixel sample Z is less than or equal to a horizontal component threshold, where the pixel sample Z in the current picture block is different from either of the two pixel samples.

With reference to any one of the third aspect, or the first to the second possible implementations of the third aspect, in a third possible implementation of the third aspect, the two pixel samples include two pixel samples in an upper left pixel sample, an upper right pixel sample, a lower left pixel sample, and a central pixel sample a1 of the current picture block, where the upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

With reference to the third possible implementation of the third aspect, in a fourth possible implementation of the third aspect, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer, where the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

With reference to the third or the fourth possible implementation of the third aspect, in a fifth possible implementation of the third aspect, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer, where the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

With reference to any one of the third to the fifth possible implementations of the third aspect, in a sixth possible implementation of the third aspect, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer, where the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

With reference to any one of the third to the sixth possible implementations of the third aspect, in a seventh possible implementation of the third aspect, a candidate motion information unit set corresponding to the central pixel sample a1 of the current picture block includes motion information units of x5 pixel samples, and one of the x5 pixel samples is a pixel sample a2, where a location of the central pixel sample a1 in the video frame to which the current picture block belongs is the same as a location of the pixel sample a2 in a video frame adjacent to the video frame to which the current picture block belongs, and x5 is a positive integer.

With reference to any one of the third aspect, or the first to the seventh possible implementations of the third aspect, in an eighth possible implementation of the third aspect, in an aspect of predicting the pixel value of the current picture block by using the affine motion model and the merged motion information unit set i, the processor is configured to: when a reference frame index corresponding to a motion vector whose prediction direction is a first prediction direction in the merged motion information unit set i is different from a reference frame index of the current picture block, perform scaling processing on the merged motion information unit set i, so that the motion vector whose prediction direction is the first prediction direction in the merged motion information unit set i is scaled down to a reference frame of the current picture block, and predict the pixel value of the current picture block by using the affine motion model and a scaled merged motion information unit set i, where the first prediction direction is forward or backward; or in an aspect of predicting the pixel value of the current picture block by using the affine motion model and the merged motion information unit set i, the processor is configured to: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, perform scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predict the pixel value of the current picture block by using the affine motion model and a scaled merged motion information unit set i.

With reference to any one of the third aspect, or the first to the eighth possible implementations of the third aspect, in a ninth possible implementation of the third aspect, in the aspect of predicting the pixel value of the current picture block by using the affine motion model and the merged motion information unit set i, the processor is configured to: obtain a motion vector of each pixel in the current picture block through computation by using the affine motion model and the merged motion information unit set i, and determine a predicted pixel value of each pixel in the current picture block by using the motion vector that is of each pixel in the current picture block and is obtained through computation; or in the aspect of predicting the pixel value of the current picture block by using the affine motion model and the merged motion information unit set i, the processor is configured to: obtain a motion vector of each pixel block in the current picture block through computation by using the affine motion model and the merged motion information unit set i, and determine a predicted pixel value of each pixel in each pixel block in the current picture block by using the motion vector that is of each pixel block in the current picture block and is obtained through computation.

With reference to any one of the third aspect, or the first to the ninth possible implementations of the third aspect, in a tenth possible implementation of the third aspect, in the aspect of predicting the pixel value of the current picture block by using the affine motion model and the merged motion information unit set i, the processor is configured to obtain a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i.

With reference to the tenth possible implementation of the third aspect, in an eleventh possible implementation of the third aspect, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

With reference to any one of the third aspect, or the first to the eleventh possible implementations of the third aspect, in a twelfth possible implementation of the third aspect, the affine motion model is in the following form:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where the motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is the length or width of the current picture block.

With reference to any one of the third aspect, or the first to the twelfth possible implementations of the third aspect, in a thirteenth possible implementation of the third aspect, the picture prediction apparatus is applied to a video coding apparatus, or the picture prediction apparatus is applied to a video decoding apparatus.

With reference to the thirteenth possible implementation of the third aspect, in a fourteenth possible implementation of the third aspect, when the picture prediction apparatus is applied to the video decoding apparatus, in the aspect of determining the merged motion information unit set i including the two motion information units, the processor is configured to determine, from the N candidate merged motion information unit sets, based on an identifier that is of the merged motion information unit set i and is obtained from a video bit stream, the merged motion information unit set i including the two motion information units.

With reference to the thirteenth possible implementation of the third aspect or the fourteenth possible implementation of the third aspect, in a fifteenth possible implementation of the third aspect, when the picture prediction apparatus is applied to the video decoding apparatus, the processor is further configured to: decode the video bit stream to obtain motion vector differences of the two pixel samples, obtain motion vector predictors of the two pixel samples by using motion vectors of pixel samples spatially adjacent or temporally adjacent to the two pixel samples, and obtain the motion vectors of the two pixel samples separately based on the motion vector predictors of the two pixel samples and the motion vector differences of the two pixel samples.

With reference to the thirteenth possible implementation of the third aspect, in a sixteenth possible implementation of the third aspect, when the picture prediction apparatus is applied to the video coding apparatus, the processor is further configured to: obtain motion vector predictors of the two pixel samples by using motion vectors of pixel samples spatially adjacent or temporally adjacent to the two pixel samples, obtain motion vector differences of the two pixel samples according to the motion vector predictors of the two pixel samples, and write the motion vector differences of the two pixel samples into a video bit stream.

With reference to the thirteenth possible implementation of the third aspect or the sixteenth possible implementation of the third aspect, in a seventeenth possible implementation of the third aspect, when the picture prediction apparatus is applied to the video coding apparatus, the processor is further configured to write an identifier of the merged motion information unit set i into the video bit stream.

According to a fourth aspect, an embodiment of the present disclosure provides a picture processing method, including:

obtaining a motion vector 2-tuple of a current picture block, where the motion vector 2-tuple includes motion vectors of two pixel samples in a video frame to which the current picture block belongs; and obtaining a motion vector of any pixel sample in the current picture block through computation by using an affine motion model and the motion vector 2-tuple; where the affine motion model is in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

With reference to the fourth aspect, in a first possible implementation of the fourth aspect, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

With reference to the fourth aspect or the first possible implementation of the fourth aspect, in a second possible implementation of the fourth aspect, the obtaining a motion vector of any pixel sample in the current picture block through computation by using an affine motion model and the motion vector 2-tuple includes:

obtaining values of the coefficients of the affine motion model by using the motion vectors of the two pixel samples and locations of the two pixel samples; and obtaining the motion vector of the any pixel sample in the current picture block by using the affine motion model and the values of the coefficients of the affine motion model.

With reference to the fourth aspect, or the first or the second possible implementation of the fourth aspect, in a third possible implementation of the fourth aspect, the obtaining a motion vector of any pixel sample in the current picture block through computation by using an affine motion model and the motion vector 2-tuple includes: obtaining the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtaining the motion vector of the any pixel sample in the current picture block by using the affine motion model and the values of the coefficients of the affine motion model.

With reference to the fourth aspect, or the first or the second possible implementation of the fourth aspect, in a fourth possible implementation of the fourth aspect, the obtaining a motion vector of any pixel sample in the current picture block through computation by using an affine motion model and the motion vector 2-tuple includes:

obtaining the values of the coefficients of the affine motion model by using a ratio of a weighted sum of components of the motion vectors of the two pixel samples to a distance between the two pixel samples or to a square of a distance between the two pixel samples; and obtaining the motion vector of the any pixel sample in the current picture block by using the affine motion model and the values of the coefficients of the affine motion model.

With reference to any one of the fourth aspect, or the first to the third possible implementations of the fourth aspect, in a fifth possible implementation of the fourth aspect, when the two pixel samples include an upper left pixel sample of the current picture block and a pixel sample in a right region on a right side of the upper left pixel sample, the affine motion model is specifically:

$$\begin{cases} vx = \frac{vx_1 - vx_0}{w} x - \frac{vy_1 - vy_0}{w} y + vx_0 \\ vy = \frac{vy_1 - vy_0}{w} x + \frac{vx_1 - vx_0}{w} y + vy_0 \end{cases},$$

where $(vx_0, vy_0)$ are a motion vector of the upper left pixel sample, $(vx_1, vy_1)$ are a motion vector of the pixel sample in the right region, and w is a distance between the two pixel samples.

With reference to any one of the fourth aspect, or the first to the third possible implementations of the fourth aspect, in a sixth possible implementation of the fourth aspect, when the two pixel samples include an upper left pixel sample of the current picture block and a pixel sample in a lower region below the upper left pixel sample, the affine motion model is specifically:

$$\begin{cases} vx = \frac{vy_2 - vy_0}{h} x + \frac{vx_2 - vx_0}{h} y + vx_0 \\ vy = -\frac{vx_2 - vx_0}{h} x + \frac{vy_2 - vy_0}{h} y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples.

With reference to any one of the fourth aspect, or the first, the second, or the fourth possible implementation of the fourth aspect, in a seventh possible implementation of the fourth aspect, when the two pixel samples include an upper left pixel sample of the current picture block and a pixel sample in a lower right region on a lower right side of the upper left pixel sample, the affine motion model is specifically:

$$\begin{cases} vx = \frac{(vx_3 w_1 + vy_3 h_1) - (vx_0 w_1 + vy_0 h_1)}{w_1^2 + h_1^2} x + \frac{(vx_3 h_1 - vy_3 w_1) - (vx_0 h_1 - vy_0 w_1)}{w_1^2 + h_1^2} y + vx_0 \\ vy = -\frac{(vx_3 h_1 - vy_3 w_1) - (vx_0 h_1 - vy_0 w_1)}{w_1^2 + h_1^2} x + \frac{(vx_3 w_1 + vy_3 h_1) - (vx_0 w_1 + vy_0 h_1)}{w_1^2 + h_1^2} y + vy_0 \end{cases},$$

where $(vx_0, vy_0)$ are a motion vector of the upper left pixel sample, $(vx_3, vy_3)$ are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

With reference to any one of the fourth aspect, or the first to the seventh possible implementations of the fourth aspect, in an eighth possible implementation of the fourth aspect, after the obtaining a motion vector of any pixel sample in the current picture block through computation by using an affine motion model and the motion vector 2-tuple, the method further includes:

performing motion compensation predictive coding on the any pixel sample in the current picture block by using the motion vector that is of the any pixel sample in the current picture block and is obtained through computation.

With reference to any one of the fourth aspect, or the first to the seventh possible implementations of the fourth aspect, in a ninth possible implementation of the fourth aspect, after the determining a predicted pixel value of a pixel of the any pixel sample in the current picture block, the method further includes:

performing motion compensation decoding on the any pixel sample by using the motion vector that is of the any pixel sample in the current picture block and is obtained through computation, and obtaining a pixel reconstruction value of the any pixel sample.

According to a fifth aspect, an embodiment of the present disclosure provides a picture processing apparatus, including:

an obtaining unit, configured to obtain a motion vector 2-tuple of a current picture block, where the motion vector 2-tuple includes motion vectors of two pixel samples in a video frame to which the current picture block belongs; and a computation unit, configured to obtain a motion vector of any pixel sample in the current picture block through computation by using an affine motion model and the motion vector 2-tuple obtained by the obtaining unit; where the affine motion model is in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

With reference to the fifth aspect, in a first possible implementation of the fifth aspect, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

With reference to the fifth aspect or the first possible implementation of the fifth aspect, in a second possible implementation of the fifth aspect, the computation unit is specifically configured to:

obtain values of the coefficients of the affine motion model by using the motion vectors of the two pixel samples and locations of the two pixel samples; and obtain the motion vector of the any pixel sample in the current picture block by using the affine motion model and the values of the coefficients of the affine motion model.

With reference to the fifth aspect, or the first or the second possible implementation of the fifth aspect, in a third possible implementation of the fifth aspect, the computation unit is specifically configured to:

obtain the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtain the motion vector of the any pixel sample in the current picture block by using the affine motion model and the values of the coefficients of the affine motion model.

With reference to the fifth aspect, or the first or the second possible implementation of the fifth aspect, in a fourth possible implementation of the fifth aspect, the computation unit is specifically configured to:

obtain the values of the coefficients of the affine motion model by using a ratio of a weighted sum of components of the motion vectors of the two pixel samples to a distance between the two pixel samples or to a square of a distance between the two pixel samples; and obtain the motion vector of the any pixel sample in the current picture block by using the affine motion model and the values of the coefficients of the affine motion model.

With reference to any one of the fifth aspect, or the first to the third possible implementations of the fifth aspect, in a fifth possible implementation of the fifth aspect, when the two pixel samples include an upper left pixel sample of the current picture block and a pixel sample in a right region on a right side of the upper left pixel sample, the affine motion model is specifically:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

$(vx_0, vy_0)$ are a motion vector of the upper left pixel sample, $(vx_1, vy_1)$ are a motion vector of the pixel sample in the right region, and w is a distance between the two pixel samples.

With reference to any one of the fifth aspect, or the first to the third possible implementations of the fifth aspect, in a sixth possible implementation of the fifth aspect, when the two pixel samples include an upper left pixel sample of the current picture block and a pixel sample in a lower region below the upper left pixel sample, the affine motion model is specifically:

$$\begin{cases} vx = \dfrac{vy_2 - vy_0}{h}x + \dfrac{vx_2 - vx_0}{h}y + vx_0 \\ vy = -\dfrac{vx_2 - vx_0}{h}x + \dfrac{vy_2 - vy_0}{h}y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples.

With reference to any one of the fifth aspect, or the first, the second, or the fourth possible implementation of the fifth aspect, in a seventh possible implementation of the fifth aspect, when the two pixel samples include an upper left pixel sample of the current picture block and a pixel sample in a lower right region on a lower right side of the upper left pixel sample, the affine motion model is specifically:

$$\begin{cases} vx = \dfrac{(vx_3 w_1 + vy_3 h_1) - (vx_0 w_1 + vy_0 h_1)}{w_1^2 + h_1^2} x + \dfrac{(vx_3 h_1 - vy_3 w_1) - (vx_0 h_1 - vy_0 w_1)}{w_1^2 + h_1^2} y + vx_0 \\ vy = -\dfrac{(vx_3 h_1 - vy_3 w_1) - (vx_0 h_1 - vy_0 w_1)}{w_1^2 + h_1^2} x + \dfrac{(vx_3 w_1 + vy_3 h_1) - (vx_0 w_1 + vy_0 h_1)}{w_1^2 + h_1^2} y + vy_0 \end{cases},$$

$(vx_0, vy_0)$ are a motion vector of the upper left pixel sample, $(vx_3, vy_3)$ are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

With reference to any one of the fifth aspect, or the first to the seventh possible implementations of the fifth aspect, in an eighth possible implementation of the fifth aspect, when the picture processing apparatus is applied to a video coding apparatus, the apparatus further includes an encoding unit, configured to perform motion compensation predictive coding on the any pixel sample in the current picture block by using the motion vector that is of the any pixel sample in the current picture block and is obtained by the computation unit through computation.

With reference to any one of the fifth aspect, or the first to the seventh possible implementations of the fifth aspect, in a ninth possible implementation of the fifth aspect, when the picture processing apparatus is applied to a video coding apparatus, the apparatus further includes a decoding unit, configured to perform motion compensation decoding on the any pixel sample by using the motion vector that is of the any pixel sample in the current picture block and is obtained by the computation unit through computation, and obtain a pixel reconstruction value of the any pixel sample.

According to a sixth aspect, an embodiment of the present disclosure provides a picture processing apparatus, including:

a processor and a memory, where the processor invokes code or an instruction stored in the memory, so that the processor is configured to: obtain a motion vector 2-tuple of a current picture block, where the motion vector 2-tuple includes motion vectors of two pixel samples in a video frame to which the current picture block belongs; and obtain a motion vector of any pixel sample in the current picture block through computation by using an affine motion model and the motion vector 2-tuple; where the affine motion model is in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

With reference to the sixth aspect, in a first possible implementation of the sixth aspect, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

With reference to the sixth aspect or the first possible implementation of the sixth aspect, in a second possible implementation of the sixth aspect, in an aspect of obtaining the motion vector of the any pixel sample in the current picture block through computation by using the affine motion model and the motion vector 2-tuple, the processor is configured to: obtain values of the coefficients of the affine motion model by using the motion vectors of the two pixel samples and locations of the two pixel samples; and obtain the motion vector of the any pixel sample in the current picture block by using the affine motion model and the values of the coefficients of the affine motion model.

With reference to the sixth aspect, or the first or the second possible implementation of the sixth aspect, in a third possible implementation of the sixth aspect, in the aspect of obtaining the motion vector of the any pixel sample in the current picture block through computation by using the affine motion model and the motion vector 2-tuple, the processor is configured to: obtain the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtain the motion vector of the any pixel sample in the current picture block by using the affine motion model and the values of the coefficients of the affine motion model.

With reference to the sixth aspect, or the first or the second possible implementation of the sixth aspect, in a fourth possible implementation of the sixth aspect, in the aspect of obtaining the motion vector of the any pixel sample in the current picture block through computation by using the affine motion model and the motion vector 2-tuple, the processor is configured to: obtain the values of the coefficients of the affine motion model by using a ratio of a weighted sum of components of the motion vectors of the two pixel samples to a distance between the two pixel samples or to a square of a distance between the two pixel samples; and obtain the motion vector of the any pixel sample in the current picture block by using the affine motion model and the values of the coefficients of the affine motion model.

With reference to any one of the sixth aspect, or the first to the third possible implementations of the sixth aspect, in a fifth possible implementation of the sixth aspect, when the two pixel samples include an upper left pixel sample of the current picture block and a pixel sample in a right region on a right side of the upper left pixel sample, the affine motion model is specifically:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where ($vx_0$, $vy_0$) are a motion vector of the upper left pixel sample, ($vx_1$, $vy_1$) are a motion vector of the pixel sample in the right region, and w is a distance between the two pixel samples.

With reference to any one of the sixth aspect, or the first to the third possible implementations of the sixth aspect, in a sixth possible implementation of the sixth aspect, when the two pixel samples include an upper left pixel sample of the current picture block and a pixel sample in a lower region below the upper left pixel sample, the affine motion model is specifically:

$$\begin{cases} vx = \dfrac{vy_2 - vy_0}{h}x + \dfrac{vx_2 - vx_0}{h}y + vx_0 \\ vy = -\dfrac{vx_2 - vx_0}{h}x + \dfrac{vy_2 - vy_0}{h}y + vy_0 \end{cases},$$

where ($vx_0$, $vy_0$) are a motion vector of the upper left pixel sample, ($vx_2$, $vy_2$) are a motion vector of the pixel sample in the lower region, and h is a distance between the two pixel samples.

With reference to any one of the sixth aspect, or the first, the second, or the fourth possible implementation of the sixth aspect, in a seventh possible implementation of the sixth aspect, when the two pixel samples include an upper left pixel sample of the current picture block and a pixel sample in a lower right region on a lower right side of the upper left pixel sample, the affine motion model is specifically:

$$\begin{cases} vx = \dfrac{(vx_3w_1 + vy_3h_1) - (vx_0w_1 + vy_0h_1)}{w_1^2 + h_1^2}x + \dfrac{(vx_3h_1 - vy_3w_1) - (vx_0h_1 - vy_0w_1)}{w_1^2 + h_1^2}y + vx_0 \\ vy = -\dfrac{(vx_3h_1 - vy_3w_1) - (vx_0h_1 - vy_0w_1)}{w_1^2 + h_1^2}x + \dfrac{(vx_3w_1 + vy_3h_1) - (vx_0w_1 + vy_0h_1)}{w_1^2 + h_1^2}y + vy_0 \end{cases},$$

where ($vx_0$, $vy_0$) are a motion vector of the upper left pixel sample, ($vx_3$, $vy_3$) are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

With reference to any one of the sixth aspect, or the first to the seventh possible implementations of the sixth aspect, in an eighth possible implementation of the sixth aspect, when the picture processing apparatus is applied to a video coding apparatus, the processor is further configured to: after obtaining the motion vector of the any pixel sample in the current picture block through computation by using the affine motion model and the motion vector 2-tuple, perform motion compensation predictive coding on the any pixel sample in the current picture block by using the motion vector that is of the any pixel sample in the current picture block and is obtained through computation.

With reference to any one of the sixth aspect, or the first to the seventh possible implementations of the sixth aspect, in a ninth possible implementation of the sixth aspect, the processor is further configured to: after determining a predicted pixel value of a pixel of the any pixel sample in the current picture block, perform motion compensation decoding on the any pixel sample by using the motion vector that is of the any pixel sample in the current picture block and is obtained through computation, and obtain a pixel reconstruction value of the any pixel sample.

According to a seventh aspect, an embodiment of the present disclosure provides a picture processing method, including:

obtaining coefficients of an affine motion model, and obtaining a motion vector of any pixel sample in the current picture block through computation by using the coefficients of the affine motion model and the affine motion model; and determining a predicted pixel value of a pixel of the any pixel sample by using the motion vector that is of the any pixel sample and is obtained through computation; where the affine motion model is in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample;

in the equation vx=ax+by, a is a horizontal coordinate coefficient of the horizontal component of the affine motion model, and b is a vertical coordinate coefficient of the horizontal component of the affine motion model; and in the equation vy=−bx+ay a is a vertical coordinate coefficient of the vertical component of the affine motion model, −b is a horizontal coordinate coefficient of the vertical component of the affine motion model, and the coefficients of the affine motion model include a and b; and the coefficients of the affine motion model further include a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

According to an eighth aspect, an embodiment of the present disclosure provides a picture processing apparatus, including:

an obtaining unit, configured to obtain coefficients of an affine motion model;

a computation unit, configured to obtain a motion vector of any pixel sample in the current picture block through computation by using the coefficients of the affine motion model that are obtained by the obtaining unit and the affine motion model; and a predicting unit, configured to determine a predicted pixel value of a pixel of the any pixel sample by using the motion vector that is of the any pixel sample and is obtained by the computation unit through computation; where the affine motion model is in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample;

in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, −b is a horizontal coordinate coefficient of the vertical component of the affine motion model, and the coefficients of the affine motion model include a and b; and the coefficients of the affine motion model further include a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

It can be learned that, in technical solutions provided by some embodiments of the present disclosure, a pixel value of a current picture block is predicted by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets corresponding to the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. In addition, because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

BRIEF DESCRIPTION OF DRAWINGS

To describe technical solutions in embodiments of the present disclosure more clearly, the following briefly describes the accompanying drawings for describing the embodiments. The accompanying drawings in the following description show merely some embodiments of the present disclosure, and persons of ordinary skill in the art may still derive other drawings from these accompanying drawings without creative efforts.

FIG. 1-a and FIG. 1-b are schematic diagrams of several picture block partitioning modes according to an embodiment of the present disclosure;

FIG. 1-c is a schematic flowchart of a picture prediction method according to an embodiment of the present disclosure;

FIG. 1-d is a schematic diagram of a picture block according to an embodiment of the present disclosure;

FIG. 2-a is a schematic flowchart of another picture prediction method according to an embodiment of the present disclosure;

FIG. 2-b to FIG. 2-d are schematic diagrams of several methods for determining candidate motion information unit sets corresponding to pixel samples according to an embodiment of the present disclosure;

FIG. 2-e is a schematic diagram of vertex coordinates of a picture block x according to an embodiment of the present disclosure;

FIG. 2-f and FIG. 2-g are schematic diagrams of affine motion of a pixel according to an embodiment of the present disclosure;

FIG. 2-h and FIG. 2-i are schematic diagrams of rotational motion of a pixel according to an embodiment of the present disclosure;

DESCRIPTION OF EMBODIMENTS

Figure 3:
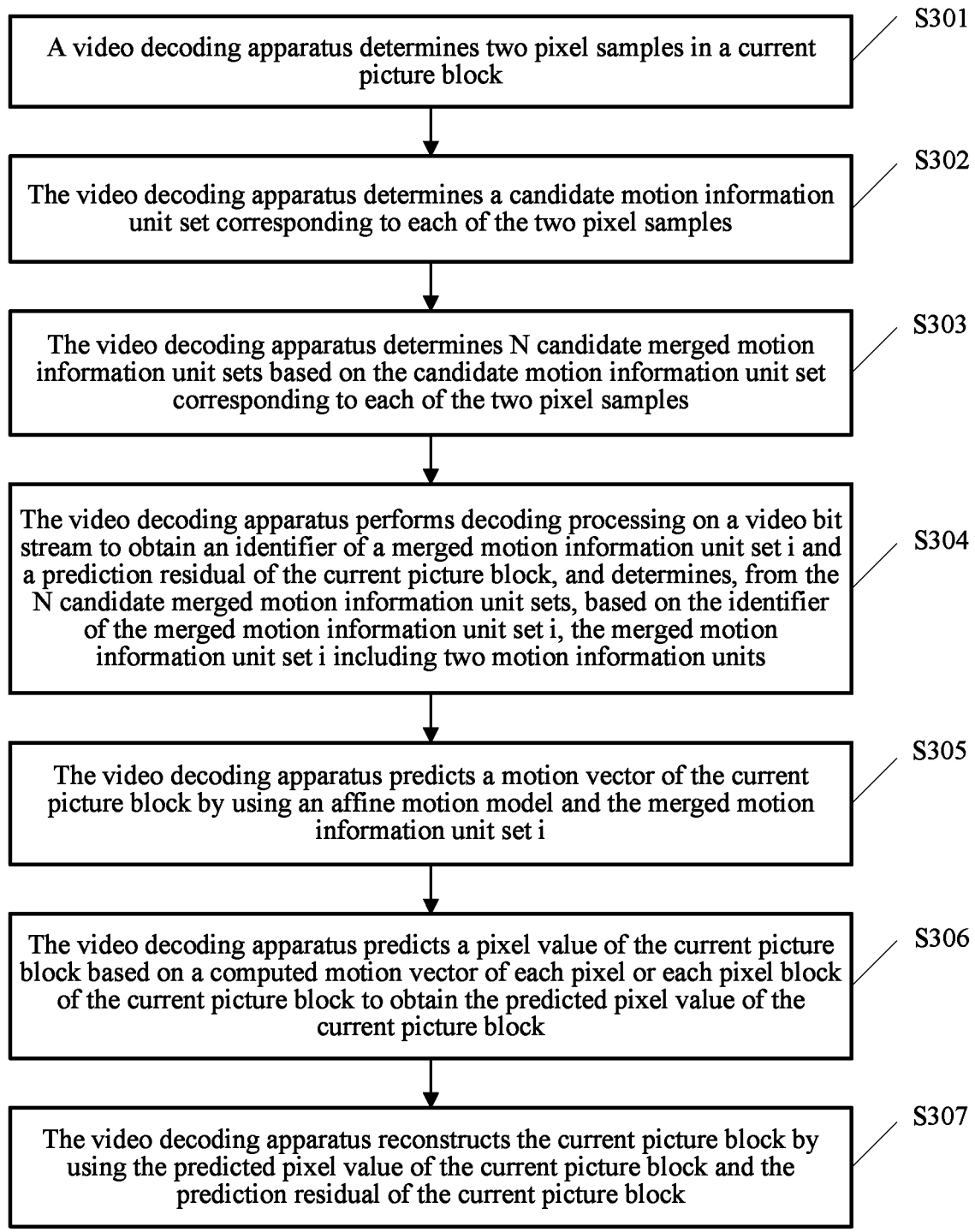
FIG. 3 is a schematic flowchart of another picture prediction method according to an embodiment of the present disclosure.

To make objectives, features, and advantages of the present disclosure clearer and more comprehensible, the following clearly describes technical solutions in embodiments of the present disclosure with reference to the accompanying. The embodiments described in the following are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first describes some concepts that may be used in embodiments of the present disclosure.

In most coding frameworks, a video sequence includes a series of pictures, the pictures are further divided into slices, and the slices are further divided into blocks. Video coding is to perform coding processing from left to right and from top to bottom row by row starting from an upper left corner location of a picture by using a block as a unit. In some new video coding standards, the concept of a block is further extended. A macroblock (MB) is defined in the H.264 standard, and the macroblock may be further divided into multiple prediction blocks (partition) that can be used for predictive coding. In the HEVC standard, basic concepts such as a coding unit (CU), a prediction unit (PU), and a transform unit (TU) are used, multiple units are classified according to functions, and a new tree-based structure is used for description. For example, the coding unit may be divided into smaller coding units according to a quadtree, and the smaller coding units may be further divided to form a quadtree structure. The prediction unit and the transform unit also have similar tree structures. Regardless of whether a unit is a coding unit, a prediction unit, or a transform unit, the unit belongs to the concept of a block block in essence. The coding unit is similar to a macroblock MB or a coding block, and is a basic unit for partitioning and encoding a coding picture. The prediction unit may correspond to a prediction block, and is a basic unit for predictive coding. The coding unit is further divided into multiple prediction units according to a partitioning mode. The transform unit may correspond to a transform block, and is a basic unit for transforming a prediction residual. In the high efficiency video coding (HEVC) standard, they may be collectively referred to as coding tree blocks (CTB), or the like.

In the HEVC standard, a size of a coding unit may include four levels: 64×64, 32×32, 16×16, and 8×8. Coding units at each level may be divided into prediction units of different sizes according to intra-frame prediction and inter-frame prediction. For example, as shown in FIG. 1-a and FIG. 1-b, FIG. 1-a illustrates by way of example a prediction unit partitioning mode corresponding to intra-frame prediction. FIG. 1-b illustrates by way of example several prediction unit partitioning modes corresponding to inter-frame prediction.

In a development and evolution process of a video coding technology, video coding experts figure out various methods to use temporal and spatial correlation between adjacent coding/decoding blocks to try to improve coding efficiency. In the H264 or advanced video coding (AVC) standard, a skip mode and a direct mode become effective tools for improving coding efficiency. Blocks of the two coding modes used when a bit rate is low can occupy more than a half of an entire coding sequence. When the skip mode is used, a motion vector of a current picture block can be derived by using adjacent motion vectors only by adding a skip mode flag to a bit stream, and a value of a reference block is directly copied according to the motion vector as a reconstruction value of the current picture block. In addition, when the direct mode is used, an encoder may derive the motion vector of the current picture block by using the adjacent motion vectors, and directly copy the value of the reference block according to the motion vector as a predicted value of the current picture block, and perform predictive coding on the current picture block by using the predicted value in the encoder. In the current latest high efficiency video coding (HEVC) standard, some new coding tools are introduced to further improve video coding efficiency. A merge coding (merge) mode and an advanced motion vector prediction (AMVP) mode are two important inter-frame prediction tools. In merge coding (merge), motion information (which may include a motion vector (MV), a prediction direction, a reference frame index, and the like) of coded blocks near a current coding block is used to construct a candidate motion information set; through comparison, candidate motion information with highest coding efficiency may be selected as motion information of the current coding block, a predicted value of the current coding block is found from the reference frame, and predictive coding is performed on the current coding block; and at a same time, an index value indicating from which adjacent coded block the motion information is selected may be written into a bit stream. When the advanced motion vector prediction mode is used, a motion vector of an adjacent coded block is used as a motion vector predictor of the current coding block. A motion vector with highest coding efficiency may be selected and used to predict a motion vector of the current coding block, and an index value indicating which adjacent motion vector is selected may be written a video bit stream.

The following continues to discuss technical solutions of embodiments of the present disclosure.

The following first describes a picture prediction method provided by an embodiment of the present disclosure. The picture prediction method provided by this embodiment of the present disclosure is performed by a video coding apparatus or a video decoding apparatus. The video coding apparatus or the video decoding apparatus may be any apparatus that needs to output or store a video, for example, a device such as a notebook computer, a tablet computer, a personal computer, a mobile phone, or a video server.

In an embodiment of a picture prediction method according to the present disclosure, the picture prediction method includes: determining two pixel samples in a current picture block, and determining a candidate motion information unit set corresponding to each of the two pixel samples, where the candidate motion information unit set corresponding to each pixel sample includes at least one candidate motion information unit; determining a merged motion information unit set i including two motion information units, where each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and predicting a pixel value of the current picture block by using an affine motion model and the merged motion information unit set i.

Referring to FIG. 1-c, FIG. 1-c is a schematic flowchart of a picture prediction method according to an embodiment of the present disclosure. As shown by way of example in FIG. 1-c, a picture prediction method provided by an embodiment of the present disclosure may include the following steps.

S101. Determine two pixel samples in a current picture block, and determine a candidate motion information unit set corresponding to each of the two pixel samples.

The candidate motion information unit set corresponding to each pixel sample includes at least one candidate motion information unit.

The pixel sample mentioned in each embodiment of the present disclosure may be a pixel or a pixel block including at least two pixels.

The motion information unit mentioned in each embodiment of the present disclosure may include a motion vector whose prediction direction is forward and/or a motion vector whose prediction direction is backward. That is, one motion information unit may include one motion vector or may include two motion vectors with different prediction directions.

If a prediction direction corresponding to a motion information unit is forward, it indicates that the motion information unit includes a motion vector whose prediction direction is forward but does not include a motion vector whose prediction direction is backward. If a prediction direction corresponding to a motion information unit is backward, it indicates that the motion information unit includes a motion vector whose prediction direction is backward but does not include a motion vector whose prediction direction is forward. If a prediction direction corresponding to a motion information unit is unidirectional, it indicates that the motion information unit includes a motion vector whose prediction direction is forward but does not include a motion vector whose prediction direction is backward, or it indicates that the motion information unit includes a motion vector whose prediction direction is backward but does not include a motion vector whose prediction direction is forward. If a prediction direction corresponding to a motion information unit is bidirectional, it indicates that the motion information unit includes a motion vector whose prediction direction is forward and a motion vector whose prediction direction is backward.

Optionally, in some possible implementations of the present disclosure, the two pixel samples include two pixel samples in an upper left pixel sample, an upper right pixel sample, a lower left pixel sample, and a central pixel sample a1 of the current picture block. The upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

If a pixel sample is a pixel block, a size of the pixel block is, for example, 2*2, 1*2, 4*2, 4*4, or another size. The picture block may include multiple pixel blocks.

It should be noted that, for a picture block of a w*w size, when w is an odd number (for example, w is equal to 3, 5, 7, or 11), a central pixel of the picture block is unique; when w is an even number (for example, w is equal to 4, 6, 8, or 16), there may be multiple central pixels in the picture block, and a central pixel sample of the picture block may be any central pixel or a specified central pixel in the picture block, or a central pixel sample of the picture block may be a pixel block that is in the picture block and includes any central pixel, or a central pixel sample of the picture block may be a pixel block that is in the picture block and includes a specified central pixel. For example, FIG. 1-d shows by way of example a picture block of a 4*4 size, and central pixels of the picture block include four pixels: A1, A2, A3, and A4. In this case, a specified central pixel may be the pixel A1 (upper left central pixel), the pixel A2 (lower left central pixel), the pixel A3 (upper right central pixel), or the pixel A4 (lower right central pixel). Other cases may be deduced in the same way.

S102. Determine a merged motion information unit set i including two motion information units.

Each motion information unit in the merged motion information unit set i is selected from at least some of motion information units in the candidate motion information unit set corresponding to each of the two pixel samples. The motion information unit includes a motion vector whose prediction direction is forward and/or a motion vector whose prediction direction is backward.

For example, it is assumed that the two pixel samples include a pixel sample 001 and a pixel sample 002. A candidate motion information unit set corresponding to the pixel sample 001 is a candidate motion information unit set 011. A candidate motion information unit set corresponding to the pixel sample 002 is a candidate motion information unit set 022. The merged motion information unit set i includes a motion information unit C01 and a motion information unit C02. The motion information unit C01 may be selected from the candidate motion information unit set 011, the motion information unit C02 may be selected from the candidate motion information unit set 022, and so on.

It may be understood that, assuming that the merged motion information unit set i includes the motion information unit C01 and the motion information unit C02, where either of the motion information unit C01 and the motion information unit C02 may include a motion vector whose prediction direction is forward and/or a motion vector whose prediction direction is backward, the merged motion information unit set i may include two motion vectors (prediction directions corresponding to the two motion vectors may be forward or backward, or the two motion vectors may include one motion vector whose prediction direction is forward and one motion vector whose prediction direction is backward, or may include four motion vectors (the four motion vectors may include two motion vectors whose prediction directions are forward and two motion vectors whose prediction directions are backward), or may include three motion vectors (the three motion vectors may also include one motion vector whose prediction direction is forward and two motion vectors whose prediction directions are backward, or may include two motion vectors whose prediction directions are forward and one motion vector whose prediction direction is backward).

S103. Predict a pixel value of the current picture block by using an affine motion model and the merged motion information unit set i.

The current picture block may be a current coding block or a current decoding block.

It can be learned that, in the technical solution of this embodiment, a pixel value of a current picture block is predicted by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets of the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. In addition, because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

The picture prediction method provided by this embodiment may be applied to a video coding process or may be applied to a video decoding process.

In an actual application, the merged motion information unit set i including the two motion information units may be determined in various manners.

Optionally, in some possible implementations of the present disclosure, the determining a merged motion information unit set i including two motion information units includes: determining, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

That two candidate merged motion information unit sets are different may mean that motion information units included in the candidate merged motion information unit sets are not completely the same.

That two motion information units are different may mean that motion vectors included in the two motion information units are different, or that prediction directions corresponding to motion vectors included in the two motion information units are different, or that reference frame indexes corresponding to motion vectors included in the two motion information units are different. That two motion information units are the same may mean that motion vectors included in the two motion information units are the same, and that prediction directions corresponding to the motion vectors included in the two motion information units are the same, and that reference frame indexes corresponding to the motion vectors included in the two motion information units are the same.

Optionally, in some possible implementations of the present disclosure, when the picture prediction method is applied to the video decoding process, the determining, from N candidate merged motion information unit sets, the merged motion information unit set i including the two motion information units may include: determining, from the N candidate merged motion information unit sets, based on an identifier that is of the merged motion information unit set i and is obtained from a video bit stream, the merged motion information unit set i including the two motion information units.

Optionally, in some possible implementations of the present disclosure, when the picture prediction method is applied to the video coding process, the method may further include: writing an identifier of the merged motion information unit set i into a video bit stream. The identifier of the merged motion information unit set i may be any information that can identify the merged motion information unit set i. For example, the identifier of the merged motion information unit set i may be an index of the merged motion information unit set i in a merged motion information unit set list.

Optionally, in some possible implementations of the present disclosure, when the picture prediction method is applied to the video coding process, the method further includes: obtaining motion vector predictors of the two pixel samples by using motion vectors of pixel samples spatially adjacent or temporally adjacent to the two pixel samples, obtaining motion vector differences of the two pixel samples according to the motion vector predictors of the two pixel samples, and writing the motion vector differences of the two pixel samples into a video bit stream.

Optionally, in some possible implementations of the present disclosure, when the picture prediction method is applied to the video decoding process, the method further includes: decoding the video bit stream to obtain motion vector differences of the two pixel samples, obtaining motion vector predictors of the two pixel samples by using motion vectors of pixel samples spatially adjacent or temporally adjacent to the two pixel samples, and obtaining the motion vectors of the two pixel samples separately based on the motion vector predictors of the two pixel samples and the motion vector differences of the two pixel samples.

Optionally, in some possible implementations of the present disclosure, the determining, from N candidate merged motion information unit sets, the merged motion information unit set i including the two motion information units may include: determining, from the N candidate merged motion information unit sets, based on distortion or a rate distortion cost, the merged motion information unit set i including the two motion information units.

Optionally, a rate distortion cost corresponding to the merged motion information unit set i is lower than or equal to a rate distortion cost corresponding to any one of the N candidate merged motion information unit sets except the merged motion information unit set i.

Optionally, distortion corresponding to the merged motion information unit set i is less than or equal to distortion corresponding to any one of the N candidate merged motion information unit sets except the merged motion information unit set i.

A rate distortion cost corresponding to a candidate merged motion information unit set in the N candidate merged motion information unit sets (for example, the merged motion information unit set i in the N candidate merged motion information unit sets) may be, for example, a rate distortion cost corresponding to a predicted pixel value of a picture block (for example, the current picture block) obtained by predicting the pixel value of the picture block by using the candidate merged motion information unit set (for example, the merged motion information unit set i).

Distortion corresponding to a candidate merged motion information unit set in the N candidate merged motion information unit sets (for example, the merged motion information unit set i in the N candidate merged motion information unit sets) may be, for example, distortion between an original pixel value of a picture block (for example, the current picture block) and a predicted pixel value of the picture block obtained by predicting the pixel value of the picture block by using the candidate merged motion information unit set (for example, the merged motion information unit set i) (namely, the distortion between the original pixel value and the predicted pixel value of the picture block).

In some possible implementations of the present disclosure, distortion between an original pixel value of a picture block (for example, the current picture block) and a predicted pixel value of the picture block obtained by predicting the pixel value of the picture block by using the candidate merged motion information unit set (for example, the merged motion information unit set i) may be specifically, for example, a sum of quadratic differences (SSD) or a sum of absolute differences (SAD) or a sum of differences between the original pixel value of the picture block (for example, the current picture block) and the predicted pixel value of the picture block obtained by predicting the pixel value of the picture block by using the candidate merged motion information unit set (for example, the merged motion information unit set i), or another distortion parameter that can measure the distortion.

N is a positive integer. For example, N may be, for example, equal to 1, 2, 3, 4, 5, 6, 8, or another value.

Optionally, in some possible implementations of the present disclosure, motion information units in any one of the N candidate merged motion information unit sets may be different from each other.

Optionally, in some possible implementations of the present disclosure, the N candidate merged motion information unit sets meet at least one of a first condition, a second condition, a third condition, a fourth condition, or a fifth condition.

The first condition includes that a motion mode of the current picture block indicated by a motion information unit in any one of the N candidate merged motion information unit sets is non-translational motion. For example, if all motion vectors corresponding to a first prediction direction in a candidate merged motion information unit set are equal, it may be considered that the motion mode of the current picture block indicated by a motion information unit in the candidate merged motion information unit set is translational motion; otherwise, it may be considered that the motion mode of the current picture block indicated by a motion information unit in the candidate merged motion information unit set is non-translational motion, where the first prediction direction is forward or backward. For another example, if all motion vectors corresponding to a forward prediction direction in a candidate merged motion information unit set are equal, and all motion vectors corresponding to a backward prediction directions in the candidate merged motion information unit set are equal, it may be considered that the motion mode of the current picture block indicated by a motion information unit in the candidate merged motion information unit set is translational motion; otherwise, it may be considered that the motion mode of the current picture block indicated by a motion information unit in the candidate merged motion information unit set is non-translational motion.

The second condition includes that prediction directions corresponding to two motion information units in any one of the N candidate merged motion information unit sets are the same.

For example, when two motion information units both include a motion vector whose prediction direction is forward and a motion vector whose prediction direction is backward, it indicates that the prediction directions corresponding to the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it may indicate that the prediction directions corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that the prediction directions corresponding to the two motion information units are different. For another example, when two motion information units both include a motion vector whose prediction direction is forward, but neither of the two motion information units includes a motion vector whose prediction direction is backward, it indicates that the prediction directions corresponding to the two motion information units are the same. For another example, when two motion information units both include a motion vector whose prediction direction is backward, but neither of the two motion information units includes a motion vector whose prediction direction is forward, it indicates that the prediction directions corresponding to the two motion information units are the same.

The third condition includes that reference frame indexes corresponding to two motion information units in any one of the N candidate merged motion information unit sets are the same.

For example, when two motion information units both include a motion vector whose prediction direction is forward and a motion vector whose prediction direction is backward, and reference frame indexes corresponding to the motion vectors whose prediction directions are forward in the two motion information units are the same, and reference frame indexes corresponding to the motion vectors whose prediction directions are backward in the two motion information units are the same, it may indicate that the reference frame indexes corresponding to the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it indicates that the prediction directions corresponding to the two motion information units are different, and may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is forward but does not include a motion vector whose prediction direction is backward, and reference frame indexes corresponding to the motion vectors whose prediction directions are forward in the two motion information units are the same, it may indicate that reference frame indexes corresponding to the two motion information units are different. For another example, when one motion information unit in two motion information units includes a motion vector whose prediction direction is backward but does not include a motion vector whose prediction direction is forward, and the other motion information unit includes a motion vector whose prediction direction is backward but does not include a motion vector whose prediction direction is forward, and reference frame indexes corresponding to the motion vectors whose prediction directions are backward in the two motion information units are the same, it may indicate that reference frame indexes corresponding to the two motion information units are different.

The fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples. The horizontal component threshold may be, for example, equal to ⅓ of a width of the current picture block, ½ of a width of the current picture block, ⅔ of a width of the current picture block, ¾ of a width of the current picture block, or another value.

The fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of any motion information unit in one of the N candidate merged motion information unit sets and a vertical component of a motion vector of a pixel sample Z is less than or equal to a horizontal component threshold, where the pixel sample Z in the current picture block is different from either of the two pixel samples. The vertical component threshold may be, for example, equal to ⅓ of a height of the current picture block, ½ of a height of the current picture block, ⅔ of a height of the current picture block, ¾ of a height of the current picture block, or another value.

Assuming that the two pixel samples are the upper left pixel sample and the upper right pixel sample of the current picture block, the pixel sample Z may be the lower left pixel sample, or the central pixel sample, or any other pixel sample of the current picture block. Other cases may be deduced in the same way.

Optionally, in some possible implementations of the present disclosure, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer. For example, the x1 pixel samples include only at least one pixel sample spatially adjacent to the upper left pixel sample of the current picture block and/or at least one pixel sample temporally adjacent to the upper left pixel sample of the current picture block.

For example, x1 may be, for example, equal to 1, 2, 3, 4, 5, 6, or another value.

For example, the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

Optionally, in some possible implementations of the present disclosure, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer.

For example, x2 may be, for example, equal to 1, 2, 3, 4, 5, 6, or another value.

For example, the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

Optionally, in some possible implementations of the present disclosure, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer. For example, the x3 pixel samples include only at least one pixel sample spatially adjacent to the lower left pixel sample of the current picture block and/or at least one pixel sample temporally adjacent to the lower left pixel sample of the current picture block.

For example, x3 may be, for example, equal to 1, 2, 3, 4, 5, 6, or another value.

For example, the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

Optionally, in some possible implementations of the present disclosure, a candidate motion information unit set corresponding to the central pixel sample a1 of the current picture block includes motion information units of x5 pixel samples, and one of the x5 pixel samples is a pixel sample a2. For example, the x5 pixel samples include only the pixel sample a2. A location of the central pixel sample a1 in the video frame to which the current picture block belongs is the same as a location of the pixel sample a2 in a video frame adjacent to the video frame to which the current picture block belongs, and x5 is a positive integer.

Optionally, in some possible implementations of the present disclosure, the predicting a pixel value of the current picture block by using an affine motion model and the merged motion information unit set i may include: when a reference frame index corresponding to a motion vector whose prediction direction is a first prediction direction in the merged motion information unit set i is different from a reference frame index of the current picture block, performing scaling processing on the merged motion information unit set i, so that the motion vector whose prediction direction is the first prediction direction in the merged motion information unit set i is scaled down to a reference frame of the current picture block, and predicting the pixel value of the current picture block by using the affine motion model and a scaled merged motion information unit set i, where the first prediction direction is forward or backward; or the predicting a pixel value of the current picture block by using an affine motion model and the merged motion information unit set i may include: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, performing scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predicting the pixel value of the current picture block by using the affine motion model and a scaled merged motion information unit set i.

Optionally, in some possible implementations of the present disclosure, the predicting the pixel value of the current picture block by using the non-translational motion model and a scaled merged motion information unit set i may, for example, include: performing motion estimation processing on a motion vector in the scaled merged motion information unit set i to obtain a motion-estimated merged motion information unit set i, and predicting the pixel value of the current picture block by using the non-translational motion model and the motion-estimated merged motion information unit set i.

Optionally, in some possible implementations of the present disclosure, the predicting a pixel value of the current picture block by using an affine motion model and the merged motion information unit set i includes: obtaining a motion vector of each pixel in the current picture block through computation by using the affine motion model and the merged motion information unit set i, and determining a predicted pixel value of each pixel in the current picture block by using the motion vector that is of each pixel in the current picture block and is obtained through computation; or obtaining a motion vector of each pixel block in the current picture block through computation by using the affine motion model and the merged motion information unit set i, and determining a predicted pixel value of each pixel in each pixel block in the current picture block by using the motion vector that is of each pixel block in the current picture block and is obtained through computation.

During a test, it is found that performing motion vector computation by using a pixel block in the current picture block as a granularity helps reduce computational complexity greatly if the motion vector of each pixel block in the current picture block is obtained through computation by using the affine motion model and the merged motion information unit set i and then the predicted pixel value of each pixel in each pixel block in the current picture block is determined by using the motion vector that is of each pixel block in the current picture block and is obtained through computation.

Optionally, in some possible implementations of the present disclosure, the predicting a pixel value of the current picture block by using an affine motion model and the merged motion information unit set i may include: performing motion estimation processing on a motion vector in the merged motion information unit set i to obtain a motion-estimated merged motion information unit set i, and predicting the pixel value of the current picture block by using the affine motion model and the motion-estimated merged motion information unit set i.

Optionally, in some possible implementations of the present disclosure, the predicting a pixel value of the current picture block by using an affine motion model and the merged motion information unit set i includes: obtaining a motion vector of any pixel sample in the current picture block by using a ratio of a difference between horizontal components of motion vectors of the two motion information units in the merged motion information unit set i to a length or width of the current picture block and a ratio of a difference between vertical components of the motion vectors of the two motion information units in the merged motion information unit set i to the length or width of the current picture block.

Alternatively, the predicting a pixel value of the current picture block by using an affine motion model and the merged motion information unit set i may include: obtaining a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i (for example, the motion vectors of the two pixel samples are the motion vectors of the two motion information units in the merged motion information unit set i, or the motion vectors of the two pixel samples are obtained based on the motion vectors of the two motion information units in the merged motion information unit set i and a prediction residual).

Optionally, in some possible implementations of the present disclosure, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

Optionally, in some possible implementations of the present disclosure, the affine motion model, for example, may be an affine motion model in the following form:

$$\begin{cases} vx = \dfrac{vx_1 - vx_0}{w} x - \dfrac{vy_1 - vy_0}{w} y + vx_0 \\ vy = \dfrac{vy_1 - vy_0}{w} x + \dfrac{vx_1 - vx_0}{w} y + vy_0 \end{cases},$$

where the motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is the length or width of the current picture block; and $$\begin{cases} \dfrac{vx_2 - vx_0}{h} = -\dfrac{vy_1 - vy_0}{w} \\ \dfrac{vy_2 - vy_0}{h} = \dfrac{vx_1 - vx_0}{w} \end{cases}.$$

$(vx_2, vy_2)$ are a motion vector of another pixel sample different from the two pixel samples in the current picture block. For example, assuming that the two pixel samples are the upper left pixel sample and the upper right pixel sample of the current picture block, $(vx_2, vy_2)$ may be the lower left pixel sample or the central pixel sample of the current picture block. For another example, assuming that the two pixel samples are the upper left pixel sample and the lower left pixel sample of the current picture block, $(vx_2, vy_2)$ may be the upper right pixel sample or the central pixel sample of the current picture block.

When a pixel sample is a pixel block including multiple pixels, coordinates of the pixel sample may be coordinates of any pixel in the pixel sample, or coordinates of the pixel sample may be coordinates of a specified pixel in the pixel sample (for example, the coordinates of the pixel sample may be coordinates of an upper left pixel, or a lower left pixel, or an upper right pixel, or a central pixel in the pixel sample).

It may be understood that, for each picture block in a current video frame, a pixel value may be predicted in a mode similar to a pixel value prediction mode corresponding to the current picture block. Certainly, for some picture blocks in the current video frame, a pixel value may also be predicted in a mode different from the pixel value prediction mode corresponding to the current picture block.

For better understanding and implementing the foregoing solution of the embodiment of the present disclosure, the following uses specific application scenarios for further description.

Referring to FIG. 2-a, FIG. 2-a is a schematic flowchart of another picture prediction method according to another embodiment of the present disclosure. This embodiment is described mainly by using a picture prediction method implemented in a video coding apparatus as an example. As shown by way of example in FIG. 2-a, another picture prediction method provided by another embodiment of the present disclosure may include the following steps.

S201. A video coding apparatus determines two pixel samples in a current picture block.

In this embodiment, the following example is mainly used: The two pixel samples include two pixel samples in an upper left pixel sample, an upper right pixel sample, a lower left pixel sample, and a central pixel sample a1 of the current picture block. For example, the two pixel samples include the upper left pixel sample and the upper right pixel sample of the current picture block. Scenarios in which the two pixel samples are other pixel samples of the current picture block may be deduced in the same way.

The upper left pixel sample of the current picture block may be an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

If a pixel sample is a pixel block, a size of the pixel block is, for example, 2*2, 1*2, 4*2, 4*4, or another size.

S202. The video coding apparatus determines a candidate motion information unit set corresponding to each of the two pixel samples.

The candidate motion information unit set corresponding to each pixel sample includes at least one candidate motion information unit.

The pixel sample mentioned in each embodiment of the present disclosure may be a pixel or a pixel block including at least two pixels.

For example, as shown in FIG. 2-*b* and FIG. 2-*c*, a candidate motion information unit set S1 corresponding to the upper left pixel sample of the current picture block may include motion information units of x1 pixel samples. The x1 pixel samples include at least one of a pixel sample Col-LT that has a same location as the upper left pixel sample LT of the current picture block, a picture block C spatially adjacent to a left edge of the current picture block, a picture block A spatially adjacent to an upper left of the current picture block, or a picture block B spatially adjacent to an upper edge of the current picture block, in a video frame temporally adjacent to a video frame to which the current picture block belongs. For example, a motion information unit of the picture block C spatially adjacent to the left edge of the current picture block, a motion information unit of the picture block A spatially adjacent to the upper left of the current picture block, and a motion information unit of the picture block B spatially adjacent to the upper edge of the current picture block may be obtained first, and the obtained motion information unit of the picture block C spatially adjacent to the left edge of the current picture block, motion information unit of the picture block A spatially adjacent to the upper left of the current picture block, and motion information unit of the picture block B spatially adjacent to the upper edge of the current picture block are added to the candidate motion information unit set corresponding to the upper left pixel sample of the current picture block. If some or all of the motion information unit of the picture block C spatially adjacent to the left edge of the current picture block, the motion information unit of the picture block A spatially adjacent to the upper left of the current picture block, and the motion information unit of the picture block B spatially adjacent to the upper edge of the current picture block are the same, deduplication processing is further performed on the candidate motion information unit set S1 (in this case, a quantity of motion information units in the candidate motion information unit set S1 after the deduplication processing may be 1 or 2). If a motion information unit of the pixel sample Col-LT that has the same location as the upper left pixel sample LT of the current picture block, in the video frame temporally adjacent to the video frame to which the current picture block belongs, is the same as a motion information unit in the candidate motion information unit set S1 after the deduplication processing, a zero motion information unit may be added to the candidate motion information unit set S1 until the quantity of motion information units in the candidate motion information unit set S1 is equal to 3. In addition, if a motion information unit of the pixel sample Col-LT that has the same location as the upper left pixel sample LT of the current picture block, in the video frame temporally adjacent to the video frame to which the current picture block belongs, is different from any motion information unit in the candidate motion information unit set S1 after the deduplication processing, the motion information unit of the pixel sample Col-LT that has the same location as the upper left pixel sample LT of the current picture block, in the video frame temporally adjacent to the video frame to which the current picture block belongs, is added to the candidate motion information unit set S1 after the deduplication processing. If the quantity of motion information units in the candidate motion information unit set S1 is still less than 3 in this case, a zero motion information unit may be added to the candidate motion information unit set S1 until the quantity of motion information units in the candidate motion information unit set S1 is equal to 3.

If the video frame to which the current picture block belongs is a forward prediction frame, the zero motion information unit added to the candidate motion information unit set S1 includes a zero motion vector whose prediction direction is forward but may not include a zero motion vector whose prediction direction is backward. If the video frame to which the current picture block belongs is a backward prediction frame, the zero motion information unit added to the candidate motion information unit set S1 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S1 includes a zero motion vector whose prediction direction is forward and a zero motion vector whose prediction direction is backward. Reference frame indexes corresponding to motion vectors in different zero motion information units added to the candidate motion information unit set S1 may be different, and the corresponding reference frame indexes may be, for example, 0, 1, 2, 3, or another value.

Similarly, for example, as shown in FIG. 2-*b* and FIG. 2-*c*, a candidate motion information unit set S2 corresponding to the upper right pixel sample of the current picture block may include motion information units of x2 picture blocks. The x2 picture blocks may include at least one of a pixel sample Col-RT that has a same location as the upper right pixel sample RT of the current picture block, a picture block E spatially adjacent to an upper right of the current picture block, or a picture block D spatially adjacent to the upper edge of the current picture block, in a video frame temporally adjacent to the video frame to which the current picture block belongs. For example, a motion information unit of the picture block E spatially adjacent to the upper right of the current picture block and a motion information unit of the picture block D spatially adjacent to the upper edge of the current picture block may be obtained first, and the obtained motion information unit of the picture block E spatially adjacent to the upper right of the current picture block and motion information unit of the picture block D spatially adjacent to the upper edge of the current picture block are added to the candidate motion information unit set S2 corresponding to the upper right pixel sample of the current picture block. If the motion information unit of the picture block E spatially adjacent to the upper right of the current picture block is the same as the motion information unit of the picture block D spatially adjacent to the upper edge of the current picture block, deduplication processing may be performed on the candidate motion information unit set S2 (in this case, a quantity of motion information units in the candidate motion information unit set S2 after the deduplication processing is 1). If a motion information unit of the pixel sample Col-RT that has the same location as the upper right pixel sample RT of the current picture block, in the video frame temporally adjacent to the video frame to which the current picture block belongs, is the same as a motion information unit in the candidate motion information unit set S2 after the deduplication processing, a zero motion information unit may be further added to the candidate motion information unit set S2 until the quantity of motion information units in the candidate motion information unit set S2 is equal to 2. In addition, if a motion information unit of the pixel sample Col-RT that has the same location as the upper right pixel sample RT of the current picture block, in the video frame temporally adjacent to the video frame to which the current picture block belongs, is different from any motion information unit in the candidate motion information unit set S2 after the deduplication processing, the motion information unit of the pixel sample Col-RT that has the same location as the upper right pixel sample RT of the current picture block, in the video frame temporally adjacent to the video frame to which the current picture block belongs, may be added to the candidate motion information unit set S2 after the deduplication processing. If the quantity of motion information units in the candidate motion information unit set S2 is still less than 2 in this case, a zero motion information unit is further added to the candidate motion information unit set S2 until the quantity of motion information units in the candidate motion information unit set S2 is equal to 2.

If the video frame to which the current picture block belongs is a forward prediction frame, the zero motion information unit added to the candidate motion information unit set S2 includes a zero motion vector whose prediction direction is forward but may not include a zero motion vector whose prediction direction is backward. If the video frame to which the current picture block belongs is a backward prediction frame, the zero motion information unit added to the candidate motion information unit set S2 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S2 includes a zero motion vector whose prediction direction is forward and a zero motion vector whose prediction direction is backward. Reference frame indexes corresponding to motion vectors in different zero motion information units added to the candidate motion information unit set S2 may be different, and the corresponding reference frame indexes may be, for example, 0, 1, 2, 3, or another value.

Similarly, for example, as shown in FIG. 2-*b* and FIG. 2-*c*, a candidate motion information unit set S3 corresponding to the lower left pixel sample of the current picture block may include motion information units of x3 picture blocks. The x3 picture blocks may include at least one of a pixel sample Col-LB that has a same location as the lower left pixel sample LB of the current picture block, a picture block G spatially adjacent to a lower left of the current picture block, or a picture block F spatially adjacent to the left edge of the current picture block, in a video frame temporally adjacent to the video frame to which the current picture block belongs. For example, a motion information unit of the picture block G spatially adjacent to the lower left of the current picture block and a motion information unit of the picture block F spatially adjacent to the left edge of the current picture block are obtained first, and the obtained motion information unit of the picture block G spatially adjacent to the lower left of the current picture block and motion information unit of the picture block F spatially adjacent to the left edge of the current picture block may be added to the candidate motion information unit set S3 corresponding to the lower left pixel sample of the current picture block. If the motion information unit of the picture block G spatially adjacent to the lower left of the current picture block is the same as the motion information unit of the picture block F spatially adjacent to the left edge of the current picture block, deduplication processing is performed on the candidate motion information unit set S3 (in this case, a quantity of motion information units in the candidate motion information unit set S3 after the deduplication processing is 1). If a motion information unit of the pixel sample Col-LB that has the same location as the lower left pixel sample LB of the current picture block, in the video frame temporally adjacent to the video frame to which the current picture block belongs, is the same as a motion information unit in the candidate motion information unit set S3 after the deduplication processing, a zero motion information unit may be further added to the candidate motion information unit set S3 until the quantity of motion information units in the candidate motion information unit set S3 is equal to 2. In addition, if a motion information unit of the pixel sample Col-LB that has the same location as the lower left pixel sample LB of the current picture block, in the video frame temporally adjacent to the video frame to which the current picture block belongs, is different from any motion information unit in the candidate motion information unit set S3 after the deduplication processing, the motion information unit of the pixel sample Col-LB that has the same location as the lower left pixel sample LB of the current picture block, in the video frame temporally adjacent to the video frame to which the current picture block belongs, may be added to the candidate motion information unit set S3 after the deduplication processing. If the quantity of motion information units in the candidate motion information unit set S3 is still less than 2 in this case, a zero motion information unit is further added to the candidate motion information unit set S3 until the quantity of motion information units in the candidate motion information unit set S3 is equal to 2.

If the video frame to which the current picture block belongs is a forward prediction frame, the zero motion information unit added to the candidate motion information unit set S3 includes a zero motion vector whose prediction direction is forward but may not include a zero motion vector whose prediction direction is backward. If the video frame to which the current picture block belongs is a backward prediction frame, the zero motion information unit added to the candidate motion information unit set S3 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S3 includes a zero motion vector whose prediction direction is forward and a zero motion vector whose prediction direction is backward. Reference frame indexes corresponding to motion vectors in different zero motion information units added to the candidate motion information unit set S3 may be different, and the corresponding reference frame indexes may be, for example, 0, 1, 2, 3, or another value.

That two motion information units are different may mean that motion vectors included in the two motion information units are different, or that prediction directions corresponding to motion vectors included in the two motion information units are different, or that reference frame indexes corresponding to motion vectors included in the two motion information units are different. That two motion information units are the same may mean that motion vectors included in the two motion information units are the same, and that prediction directions corresponding to the motion vectors included in the two motion information units are the same, and that reference frame indexes corresponding to the motion vectors included in the two motion information units are the same.

It may be understood that, for a scenario in which more pixel samples exist, a candidate motion information unit set corresponding to a pixel sample may be obtained in a similar manner.

For example, as shown in FIG. 2-d, the two pixel samples may include two pixel samples in an upper left pixel sample, an upper right pixel sample, a lower left pixel sample, and a central pixel sample a1 of the current picture block. The upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

S203. The video coding apparatus determines N candidate merged motion information unit sets based on the candidate motion information unit set corresponding to each of the two pixel samples. Each motion information unit included in each of the N candidate merged motion information unit sets is selected from at least some of constraint-compliant motion information units in the candidate motion information unit set corresponding to each of the two pixel samples. The N candidate merged motion information unit sets are different from each other, and each of the N candidate merged motion information unit sets includes two motion information units.

It may be understood that, assuming that a candidate merged motion information unit set is determined based on the candidate motion information unit set S1 (assuming that three motion information units are included) and the candidate motion information unit set S2 (assuming that two motion information units are included), in theory, 3*2=6 initial candidate merged motion information unit sets may be determined. However, to improve availability, for example, at least one of a first condition, a second condition, a third condition, a fourth condition, or a fifth condition may be used to screen out the N candidate merged motion information unit sets from the six initial candidate merged motion information unit sets. If quantities of motion information units included in the candidate motion information unit set S1 and the candidate motion information unit set S2 are not limited to the foregoing examples, a quantity of initial candidate merged motion information unit sets is not necessarily six.

For details of constraints of the first condition, the second condition, the third condition, the fourth condition, and the fifth condition, refer to the descriptions of examples in the foregoing embodiment. Details are not described again herein. Certainly, the N candidate merged motion information unit sets, for example, may further meet other conditions that are not illustrated.

In a specific implementation process, for example, at least one of the first condition, the second condition, or the third condition may be first used to perform screening on the initial candidate merged motion information unit sets, and N01 candidate merged motion information unit sets are screened out from the initial candidate merged motion information unit sets, then scaling processing is performed on the N01 candidate merged motion information unit sets, and then at least one of the fourth condition or the fifth condition is used to screen out the N candidate merged motion information unit sets from the N01 candidate merged motion information unit sets. Certainly, screening may be performed on the initial candidate merged motion information unit sets by directly using at least one of the first condition, the second condition, or the third condition, without making reference to the fourth condition and the fifth condition, and the N candidate merged motion information unit sets are screened out from the initial candidate merged motion information unit sets.

It may be understood that, a motion vector in video coding or decoding reflects a value of an offset of an object in one direction (a prediction direction) relative to a same time (the same time corresponds to a same reference frame). Therefore, when motion information units of different pixel samples correspond to different prediction directions and/or correspond to different reference frame indexes, a motion offset of each pixel or pixel block of the current picture block relative to a reference frame cannot be directly obtained. However, when the pixel samples correspond to a same prediction direction and correspond to a same reference frame index, a motion vector of each pixel or pixel block in the picture block may be obtained by using a combination of the merged motion vectors.

Therefore, when motion information units of different pixel samples in a candidate merged motion information unit set correspond to different prediction directions and/or correspond to different reference frame indexes, scaling processing may be performed on the candidate merged motion information unit set. The scaling processing performed on the candidate merged motion information unit set may relate to modification, addition, and/or deletion or the like of a motion vector in one or more motion information units in the candidate merged motion information unit set.

For example, in some possible implementations of the present disclosure, the predicting a pixel value of the current picture block by using an affine motion model and the merged motion information unit set i may include: when a reference frame index corresponding to a motion vector whose prediction direction is a first prediction direction in the merged motion information unit set i is different from a reference frame index of the current picture block, performing scaling processing on the merged motion information unit set i, so that the motion vector whose prediction direction is the first prediction direction in the merged motion information unit set i is scaled down to a reference frame of the current picture block, and predicting the pixel value of the current picture block by using the affine motion model and a scaled merged motion information unit set i, where the first prediction direction is forward or backward; or the predicting a pixel value of the current picture block by using an affine motion model and the merged motion information unit set i may include: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, performing scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predicting the pixel value of the current picture block by using the affine motion model and a scaled merged motion information unit set i.

S204. The video coding apparatus determines, from the N candidate merged motion information unit sets, a merged motion information unit set i including two motion information units.

Optionally, in some possible implementations of the present disclosure, the video coding apparatus may further write an identifier of the merged motion information unit set i into a video bit stream. Correspondingly, a video decoding apparatus determines, from the N candidate merged motion information unit sets, based on the identifier that is of the merged motion information unit set i and is obtained from the video bit stream, the merged motion information unit set i including the two motion information units.

Optionally, in some possible implementations of the present disclosure, that the video coding apparatus determines, from the N candidate merged motion information unit sets, a merged motion information unit set i including two motion information units may include: determining, from the N candidate merged motion information unit sets, based on distortion or a rate distortion cost, the merged motion information unit set i including two motion information units.

Optionally, a rate distortion cost corresponding to the merged motion information unit set i is lower than or equal to a rate distortion cost corresponding to any one of the N candidate merged motion information unit sets except the merged motion information unit set 1.

Optionally, distortion corresponding to the merged motion information unit set i is less than or equal to distortion corresponding to any one of the N candidate merged motion information unit sets except the merged motion information unit set i.

A rate distortion cost corresponding to a candidate merged motion information unit set in the N candidate merged motion information unit sets (for example, the merged motion information unit set i in the N candidate merged motion information unit sets) may be, for example, a rate distortion cost corresponding to a predicted pixel value of a picture block (for example, the current picture block) obtained by predicting the pixel value of the picture block by using the candidate merged motion information unit set (for example, the merged motion information unit set i).

Distortion corresponding to a candidate merged motion information unit set in the N candidate merged motion information unit sets (for example, the merged motion information unit set i in the N candidate merged motion information unit sets) may be, for example, distortion between an original pixel value of a picture block (for example, the current picture block) and a predicted pixel value of the picture block obtained by predicting the pixel value of the picture block by using the candidate merged motion information unit set (for example, the merged motion information unit set i) (namely, the distortion between the original pixel value and the predicted pixel value of the picture block).

In some possible implementations of the present disclosure, distortion between an original pixel value of a picture block (for example, the current picture block) and a predicted pixel value of the picture block obtained by predicting the pixel value of the picture block by using the candidate merged motion information unit set (for example, the merged motion information unit set i) may be specifically, for example, a sum of quadratic differences (SSD) or a sum of absolute differences (SAD) or a sum of differences between the original pixel value of the picture block (for example, the current picture block) and the predicted pixel value of the picture block obtained by predicting the pixel value of the picture block by using the candidate merged motion information unit set (for example, the merged motion information unit set i), or another distortion parameter that can measure the distortion.

Further, to further reduce computational complexity, when N is greater than n1, n1 candidate merged motion information unit sets may be screened out from the N candidate merged motion information unit sets, and the merged motion information unit set i including the two motion information units is determined from the n1 candidate merged motion information unit sets based on the distortion or the rate distortion cost. D(V) corresponding to any one of the n1 candidate merged motion information unit sets is less than or equal to D(V) corresponding to any one of the N candidate merged motion information unit sets except the n1 candidate merged motion information unit sets, where n1 is, for example, equal to 3, 4, 5, 6, or another value.

Further, the n1 candidate merged motion information unit sets or identifiers of the n1 candidate merged motion information unit sets may be added to a candidate merged motion information unit set list. If N is less than or equal to n1, the N candidate merged motion information unit sets or identifiers of the N candidate merged motion information unit sets may be added to the candidate merged motion information unit set queue. Candidate merged motion information unit sets in the candidate merged motion information unit set queue may be arranged in ascending order or descending order, for example, according to a value of D(V).

For example, a Euclidean distance parameter D(V) of any one (for example, the merged motion information unit set i) of the N candidate merged motion information unit sets may be computed in the following manner:

$$D(V)=\text{abs}((v_{1,x}-v_{0,x})\times h-(v_{2,y}-v_{0,y})\times w)+\text{abs}((v_{1,y}-v_{0,y})\times h+(v_{2,x}-v_{0,x})\times w), \text{ where}$$

$v_{p,x}$ indicates a horizontal component of a motion vector $\vec{v}_p$, $v_{p,y}$ indicates a vertical component of the motion vector $\vec{v}_p$, $\vec{v}_1$ and $\vec{v}_0$ are two motion vectors of two pixel samples included in a candidate merged motion information unit set in the N candidate merged motion information unit sets, a motion vector $\vec{v}_2$ indicates a motion vector of another pixel sample of the current picture block, and the another pixel sample is different from the two pixel samples. For example, as shown in FIG. 2-e, $\vec{v}_1$ and $\vec{v}_0$ indicate motion vectors of the upper left pixel sample and the upper right pixel sample of the current picture block, and the motion vector $\vec{v}_2$ indicates a motion vector of the lower left pixel sample of the current picture block. Certainly, the motion vector $\vec{v}_2$ may also indicate a motion vector of the central pixel sample or any other pixel sample of the current picture block.

Optionally, $|v_{1,x}-v_{0,x}| \leq w/2$, or $|v_{1,y}-v_{0,y}| \leq h/2$, or $|v_{2,x}-v_{0,x}| \leq w/2$, or $|v_{2,y}-v_{0,y}| \leq h/2$.

Further, the candidate merged motion information unit set queue may be obtained by sorting D)(V) values of the N candidate merged motion information unit sets in ascending order or descending order. The merged motion information unit sets in the candidate merged motion information unit set queue are different from each other, and an index may be used to indicate a merged motion information unit set in the candidate merged motion information unit set queue.

S205. The video coding apparatus predicts a motion vector of the current picture block by using an affine motion model and the merged motion information unit set i.

It is assumed that a size of the current picture block is w×h, and that w is equal or not equal to h.

It is assumed that coordinates of the two pixel samples are (0, 0) and (w, 0). Herein, for example, coordinates of a pixel in an upper left corner of a pixel sample participate in computation. Referring to FIG. 2-e, FIG. 2-e shows coordinates of four vertices of the current picture block. Referring to FIG. 2-f and FIG. 2-g, FIG. 2-f and FIG. 2-g show schematic diagrams of affine motion.

Motion vectors of the two pixel samples are $(vx_0, vy_0)$ and $(vx_1, vy_1)$ respectively. For example, the coordinates and motion vectors of the two pixel samples are substituted into the following affine motion model, and a motion vector of any pixel in the current picture block x may be computed:

$$\begin{cases} vx = \frac{vx_1 - vx_0}{w}x - \frac{vy_1 - vy_0}{w}y + vx_0 \\ vy = \frac{vy_1 - vy_0}{w}x + \frac{vx_1 - vx_0}{w}y + vy_0 \end{cases} \quad \text{(formula 1)}$$

The motion vectors of the two pixel samples are $(vx_0, vy_0)$ and $(vx_1, vy_1)$ respectively, vx and vy are respectively a horizontal component (vx) and a vertical component (vy) of a motion vector of a pixel sample whose coordinates are (x, y) in the current picture block, and w is a length or width of the current picture block.

Further, the video coding apparatus may predict a pixel value of the current picture block based on a computed motion vector of each pixel or each pixel block of the current picture block. The video coding apparatus may obtain a prediction residual of the current picture block by using an original pixel value of the current picture block and the predicted pixel value of the current picture block that is obtained by predicting the pixel value of the current picture block. The video coding apparatus may write the prediction residual of the current picture block into the video bit stream.

It can be learned that, in the technical solution of this embodiment, a video coding apparatus predicts a pixel value of a current picture block by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets of the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. Because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

The following illustrates a process of deriving the affine motion model shown in the formula 1. For example, a rotational motion model may be used to derive the affine motion model.

For example, rotational motion is shown by way of example in FIG. 2-h or FIG. 2-i.

The rotational motion model is shown in a formula 2, where (x', y'') are coordinates corresponding to a pixel whose coordinates are (x, y), in a reference frame, θ is an angle of rotation, and $(a_0, a_1)$ are translational components. If a transform coefficient is known, a motion vector (vx, vy) of a pixel (x, y) may be obtained:

$$\begin{cases} x' = \cos\theta \cdot x + \sin\theta \cdot y + a_0 \\ y' = -\sin\theta \cdot x + \cos\theta \cdot y + a_1 \\ vx = x - x' \\ vy = y - y' \end{cases} \quad \text{(formula 2)}$$

A used rotational matrix is $$\begin{bmatrix} \cos\theta & \sin\theta \\ -\sin\theta & \cos\theta \end{bmatrix}.$$

Based on rotation, if zooming is performed by using a coefficient ρ, the following simplified affine motion model is obtained, so as to avoid triangular computation in rotational motion:

$$\begin{bmatrix} \cos\theta & \sin\theta \\ -\sin\theta & \cos\theta \end{bmatrix}\begin{bmatrix} \rho & 0 \\ 0 & \rho \end{bmatrix} = \begin{bmatrix} \rho\cos\theta & \rho\sin\theta \\ -\rho\sin\theta & \rho\cos\theta \end{bmatrix} = \begin{bmatrix} a_2 & a_3 \\ -a_3 & a_2 \end{bmatrix}.$$

This helps reduce computational complexity, and may simplify a process of computing the motion vector of each pixel. In addition, like a general affine motion model, this model may be applied to complex motion scenarios such as rotation and scaling. The simplified affine motion model may be described in a formula 3. In comparison with the general affine motion model, only four parameters may be required for expressing the simplified affine motion model:

$$\begin{cases} x' = a_2 \cdot x + a_3 \cdot y + a_0 \\ y' = -a_3 \cdot x + a_2 \cdot y + a_1 \\ vx = x - x' \\ vy = y - y' \end{cases} \quad \text{(formula 3)}$$

For a picture block (for example,) whose size is w×h, a right edge and a lower edge of the picture block are separately extended by one row to obtain vertices whose coordinates are (0, 0) and (w, 0), and motion vectors $(vx_0, vy_0)$ and $(vx_1, vy_1)$ of vertices whose coordinates are (0, 0) and (w, 0) are obtained. The two vertices are used as pixel samples (certainly, another pixel may also be used as a reference pixel sample, for example, a central pixel sample), the coordinates and motion vectors of the pixel samples are substituted into the formula 3, and the formula 1 may be derived:

$$\begin{cases} vx = \dfrac{vx_1 - vx_0}{w} x - \dfrac{vy_1 - vy_0}{w} y + vx_0 \\ vy = \dfrac{vy_1 - vy_0}{w} x + \dfrac{vx_1 - vx_0}{w} y + vy_0 \end{cases} \quad \text{(formula 1)}$$

where $$\begin{cases} \dfrac{vx_2 - vx_0}{h} = -\dfrac{vy_1 - vy_0}{w} \\ \dfrac{vy_2 - vy_0}{h} = \dfrac{vx_1 - vx_0}{w} \end{cases}.$$

The motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is a length or width of the current picture block.

It may be understood that, the foregoing derivation process shows that the formula 1 has relatively high availability. During practice, it is found that, because a quantity of reference pixel samples may be two, this helps further reduce the computational complexity of picture prediction performed based on the affine motion model after the affine motion model is introduced, and reduce affine parameter information or a quantity of motion vector differences transferred during coding.

Referring to FIG. 3, FIG. 3 is a schematic flowchart of another picture prediction method according to another embodiment of the present disclosure. This embodiment is described mainly by using a picture prediction method implemented in a video decoding apparatus as an example. As shown by way of example in FIG. 3, another picture prediction method provided by another embodiment of the present disclosure may include the following steps.

S301. A video decoding apparatus determines two pixel samples in a current picture block.

In this embodiment, the following example is mainly used: The two pixel samples include two pixel samples in an upper left pixel sample, an upper right pixel sample, a lower left pixel sample, and a central pixel sample a1 of the current picture block. For example, the two pixel samples include the upper left pixel sample and the upper right pixel sample of the current picture block. Scenarios in which the two pixel samples are other pixel samples of the current picture block may be deduced in the same way.

The upper left pixel sample of the current picture block may be an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

If a pixel sample is a pixel block, a size of the pixel block is, for example, 2*2, 1*2, 4*2, 4*4, or another size.

S302. The video decoding apparatus determines a candidate motion information unit set corresponding to each of the two pixel samples.

The candidate motion information unit set corresponding to each pixel sample includes at least one candidate motion information unit.

The pixel sample mentioned in each embodiment of the present disclosure may be a pixel or a pixel block including at least two pixels.

For example, as shown in FIG. 2-b and FIG. 2-c, a candidate motion information unit set S1 corresponding to the upper left pixel sample of the current picture block may include motion information units of x1 pixel samples. The x1 pixel samples include at least one of a pixel sample Col-LT that has a same location as the upper left pixel sample LT of the current picture block, a picture block C spatially adjacent to a left edge of the current picture block, a picture block A spatially adjacent to an upper left of the current picture block, or a picture block B spatially adjacent to an upper edge of the current picture block, in a video frame temporally adjacent to a video frame to which the current picture block belongs. For example, a motion information unit of the picture block C spatially adjacent to the left edge of the current picture block, a motion information unit of the picture block A spatially adjacent to the upper left of the current picture block, and a motion information unit of the picture block B spatially adjacent to the upper edge of the current picture block may be obtained first, and the obtained motion information unit of the picture block C spatially adjacent to the left edge of the current picture block, motion information unit of the picture block A spatially adjacent to the upper left of the current picture block, and motion information unit of the picture block B spatially adjacent to the upper edge of the current picture block are added to the candidate motion information unit set corresponding to the upper left pixel sample of the current picture block. If some or all of the motion information unit of the picture block C spatially adjacent to the left edge of the current picture block, the motion information unit of the picture block A spatially adjacent to the upper left of the current picture block, and the motion information unit of the picture block B spatially adjacent to the upper edge of the current picture block are the same, deduplication processing is further performed on the candidate motion information unit set S1 (in this case, a quantity of motion information units in the candidate motion information unit set S1 after the deduplication processing may be 1 or 2). If a motion information unit of the pixel sample Col-LT that has the same location as the upper left pixel sample LT of the current picture block, in the video frame temporally adjacent to the video frame to which the current picture block belongs, is the same as a motion information unit in the candidate motion information unit set S1 after the deduplication processing, a zero motion information unit may be added to the candidate motion information unit set S1 until the quantity of motion information units in the candidate motion information unit set S1 is equal to 3. In addition, if a motion information unit of the pixel sample Col-LT that has the same location as the upper left pixel sample LT of the current picture block, in the video frame temporally adjacent to the video frame to which the current picture block belongs, is different from any motion information unit in the candidate motion information unit set S1 after the deduplication processing, the motion information unit of the pixel sample Col-LT that has the same location as the upper left pixel sample LT of the current picture block, in the video frame temporally adjacent to the video frame to which the current picture block belongs, is added to the candidate motion information unit set S1 after the deduplication processing. If the quantity of motion information units in the candidate motion information unit set S1 is still less than 3 in this case, a zero motion information unit may be added to the candidate motion information unit set S1 until the quantity of motion information units in the candidate motion information unit set S1 is equal to 3.

If the video frame to which the current picture block belongs is a forward prediction frame, the zero motion information unit added to the candidate motion information unit set S1 includes a zero motion vector whose prediction direction is forward but may not include a zero motion vector whose prediction direction is backward. If the video frame to which the current picture block belongs is a backward prediction frame, the zero motion information unit added to the candidate motion information unit set S1 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S1 includes a zero motion vector whose prediction direction is forward and a zero motion vector whose prediction direction is backward. Reference frame indexes corresponding to motion vectors in different zero motion information units added to the candidate motion information unit set S1 may be different, and the corresponding reference frame indexes may be, for example, 0, 1, 2, 3, or another value.

Similarly, for example, as shown in FIG. 2-*b* and FIG. 2-*c*, a candidate motion information unit set S2 corresponding to the upper right pixel sample of the current picture block may include motion information units of x2 picture blocks. The x2 picture blocks may include at least one of a pixel sample Col-RT that has a same location as the upper right pixel sample RT of the current picture block, a picture block E spatially adjacent to an upper right of the current picture block, or a picture block D spatially adjacent to the upper edge of the current picture block, in a video frame temporally adjacent to the video frame to which the current picture block belongs. For example, a motion information unit of the picture block E spatially adjacent to the upper right of the current picture block and a motion information unit of the picture block D spatially adjacent to the upper edge of the current picture block may be obtained first, and the obtained motion information unit of the picture block E spatially adjacent to the upper right of the current picture block and motion information unit of the picture block D spatially adjacent to the upper edge of the current picture block are added to the candidate motion information unit set S2 corresponding to the upper right pixel sample of the current picture block. If the motion information unit of the picture block E spatially adjacent to the upper right of the current picture block is the same as the motion information unit of the picture block D spatially adjacent to the upper edge of the current picture block, deduplication processing may be performed on the candidate motion information unit set S2 (in this case, a quantity of motion information units in the candidate motion information unit set S2 after the deduplication processing is 1). If a motion information unit of the pixel sample Col-RT that has the same location as the upper right pixel sample RT of the current picture block, in the video frame temporally adjacent to the video frame to which the current picture block belongs, is the same as a motion information unit in the candidate motion information unit set S2 after the deduplication processing, a zero motion information unit may be further added to the candidate motion information unit set S2 until the quantity of motion information units in the candidate motion information unit set S2 is equal to 2. In addition, if a motion information unit of the pixel sample Col-RT that has the same location as the upper right pixel sample RT of the current picture block, in the video frame temporally adjacent to the video frame to which the current picture block belongs, is different from any motion information unit in the candidate motion information unit set S2 after the deduplication processing, the motion information unit of the pixel sample Col-RT that has the same location as the upper right pixel sample RT of the current picture block, in the video frame temporally adjacent to the video frame to which the current picture block belongs, may be added to the candidate motion information unit set S2 after the deduplication processing. If the quantity of motion information units in the candidate motion information unit set S2 is still less than 2 in this case, a zero motion information unit is further added to the candidate motion information unit set S2 until the quantity of motion information units in the candidate motion information unit set S2 is equal to 2.

If the video frame to which the current picture block belongs is a forward prediction frame, the zero motion information unit added to the candidate motion information unit set S2 includes a zero motion vector whose prediction direction is forward but may not include a zero motion vector whose prediction direction is backward. If the video frame to which the current picture block belongs is a backward prediction frame, the zero motion information unit added to the candidate motion information unit set S2 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S2 includes a zero motion vector whose prediction direction is forward and a zero motion vector whose prediction direction is backward. Reference frame indexes corresponding to motion vectors in different zero motion information units added to the candidate motion information unit set S2 may be different, and the corresponding reference frame indexes may be, for example, 0, 1, 2, 3, or another value.

Similarly, for example, as shown in FIG. 2-*b* and FIG. 2-*c*, a candidate motion information unit set S3 corresponding to the lower left pixel sample of the current picture block may include motion information units of x3 picture blocks. The x3 picture blocks may include at least one of a pixel sample Col-LB that has a same location as the lower left pixel sample LB of the current picture block, a picture block G spatially adjacent to a lower left of the current picture block, or a picture block F spatially adjacent to the left edge of the current picture block, in a video frame temporally adjacent to the video frame to which the current picture block belongs. For example, a motion information unit of the picture block G spatially adjacent to the lower left of the current picture block and a motion information unit of the picture block F spatially adjacent to the left edge of the current picture block are obtained first, and the obtained motion information unit of the picture block G spatially adjacent to the lower left of the current picture block and motion information unit of the picture block F spatially adjacent to the left edge of the current picture block may be added to the candidate motion information unit set S3 corresponding to the lower left pixel sample of the current picture block. If the motion information unit of the picture block G spatially adjacent to the lower left of the current picture block is the same as the motion information unit of the picture block F spatially adjacent to the left edge of the current picture block, deduplication processing is performed on the candidate motion information unit set S3 (in this case, a quantity of motion information units in the candidate motion information unit set S3 after the deduplication processing is 1). If a motion information unit of the pixel sample Col-LB that has the same location as the lower left pixel sample LB of the current picture block, in the video frame temporally adjacent to the video frame to which the current picture block belongs, is the same as a motion information unit in the candidate motion information unit set S3 after the deduplication processing, a zero motion information unit may be further added to the candidate motion information unit set S3 until the quantity of motion information units in the candidate motion information unit set S3 is equal to 2. In addition, if a motion information unit of the pixel sample Col-LB that has the same location as the lower left pixel sample LB of the current picture block, in the video frame temporally adjacent to the video frame to which the current picture block belongs, is different from any motion information unit in the candidate motion information unit set S3 after the deduplication processing, the motion information unit of the pixel sample Col-LB that has the same location as the lower left pixel sample LB of the current picture block, in the video frame temporally adjacent to the video frame to which the current picture block belongs, may be added to the candidate motion information unit set S3 after the deduplication processing. If the quantity of motion information units in the candidate motion information unit set S3 is still less than 2 in this case, a zero motion information unit is further added to the candidate motion information unit set S3 until the quantity of motion information units in the candidate motion information unit set S3 is equal to 2.

If the video frame to which the current picture block belongs is a forward prediction frame, the zero motion information unit added to the candidate motion information unit set S3 includes a zero motion vector whose prediction direction is forward but may not include a zero motion vector whose prediction direction is backward. If the video frame to which the current picture block belongs is a backward prediction frame, the zero motion information unit added to the candidate motion information unit set S3 includes a zero motion vector whose prediction direction is backward but may not include a zero motion vector whose prediction direction is forward. In addition, if the video frame to which the current picture block belongs is a bidirectional prediction frame, the zero motion information unit added to the candidate motion information unit set S3 includes a zero motion vector whose prediction direction is forward and a zero motion vector whose prediction direction is backward. Reference frame indexes corresponding to motion vectors in different zero motion information units added to the candidate motion information unit set S3 may be different, and the corresponding reference frame indexes may be, for example, 0, 1, 2, 3, or another value.

That two motion information units are different may mean that motion vectors included in the two motion information units are different, or that prediction directions corresponding to motion vectors included in the two motion information units are different, or that reference frame indexes corresponding to motion vectors included in the two motion information units are different. That two motion information units are the same may mean that motion vectors included in the two motion information units are the same, and that prediction directions corresponding to the motion vectors included in the two motion information units are the same, and that reference frame indexes corresponding to the motion vectors included in the two motion information units are the same.

It may be understood that, for a scenario in which more pixel samples exist, a candidate motion information unit set corresponding to a pixel sample may be obtained in a similar manner.

For example, as shown in FIG. 2-d, the two pixel samples may include two pixel samples in an upper left pixel sample, an upper right pixel sample, a lower left pixel sample, and a central pixel sample a1 of the current picture block. The upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

S303. The video decoding apparatus determines N candidate merged motion information unit sets based on the candidate motion information unit set corresponding to each of the two pixel samples. Each motion information unit included in each of the N candidate merged motion information unit sets is selected from at least some of constraint-compliant motion information units in the candidate motion information unit set corresponding to each of the two pixel samples. The N candidate merged motion information unit sets are different from each other, and each of the N candidate merged motion information unit sets includes two motion information units.

It may be understood that, assuming that a candidate merged motion information unit set is determined based on the candidate motion information unit set S1 (assuming that three motion information units are included) and the candidate motion information unit set S2 (assuming that two motion information units are included), in theory, 3*2=6 initial candidate merged motion information unit sets may be determined. However, to improve availability, for example, at least one of a first condition, a second condition, a third condition, a fourth condition, or a fifth condition may be used to screen out the N candidate merged motion information unit sets from the six initial candidate merged motion information unit sets. If quantities of motion information units included in the candidate motion information unit set S1 and the candidate motion information unit set S2 are not limited to the foregoing examples, a quantity of initial candidate merged motion information unit sets is not necessarily six.

For details of constraints of the first condition, the second condition, the third condition, the fourth condition, and the fifth condition, refer to the descriptions of examples in the foregoing embodiment. Details are not described again herein. Certainly, the N candidate merged motion information unit sets, for example, may further meet other conditions that are not illustrated.

In a specific implementation process, for example, at least one of the first condition, the second condition, or the third condition may be first used to perform screening on the initial candidate merged motion information unit sets, and N01 candidate merged motion information unit sets are screened out from the initial candidate merged motion information unit sets, then scaling processing is performed on the N01 candidate merged motion information unit sets, and then at least one of the fourth condition or the fifth condition is used to screen out the N candidate merged motion information unit sets from the N01 candidate merged motion information unit sets. Certainly, screening may be performed on the initial candidate merged motion information unit sets by directly using at least one of the first condition, the second condition, or the third condition, without making reference to the fourth condition and the fifth condition, and the N candidate merged motion information unit sets are screened out from the initial candidate merged motion information unit sets.

It may be understood that, a motion vector in video coding or decoding reflects a value of an offset of an object in one direction (a prediction direction) relative to a same time (the same time corresponds to a same reference frame). Therefore, when motion information units of different pixel samples correspond to different prediction directions and/or correspond to different reference frame indexes, a motion offset of each pixel or pixel block of the current picture block relative to a reference frame cannot be directly obtained. However, when the pixel samples correspond to a same prediction direction and correspond to a same reference frame index, a motion vector of each pixel or pixel block in the picture block may be obtained by using a combination of the merged motion vectors.

Therefore, when motion information units of different pixel samples in a candidate merged motion information unit set correspond to different prediction directions and/or correspond to different reference frame indexes, scaling processing may be performed on the candidate merged motion information unit set. The scaling processing performed on the candidate merged motion information unit set may relate to modification, addition, and/or deletion or the like of a motion vector in one or more motion information units in the candidate merged motion information unit set.

For example, in some possible implementations of the present disclosure, the predicting a pixel value of the current picture block by using an affine motion model and the merged motion information unit set i may include: when a reference frame index corresponding to a motion vector whose prediction direction is a first prediction direction in the merged motion information unit set i is different from a reference frame index of the current picture block, performing scaling processing on the merged motion information unit set i, so that the motion vector whose prediction direction is the first prediction direction in the merged motion information unit set i is scaled down to a reference frame of the current picture block, and predicting the pixel value of the current picture block by using the affine motion model and a scaled merged motion information unit set i, where the first prediction direction is forward or backward, or the predicting a pixel value of the current picture block by using an affine motion model and the merged motion information unit set i may include: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, performing scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predicting the pixel value of the current picture block by using the affine motion model and a scaled merged motion information unit set i.

S304. The video decoding apparatus performs decoding processing on a video bit stream to obtain an identifier of a merged motion information unit set i and a prediction residual of the current picture block, and determines, from the N candidate merged motion information unit sets, based on the identifier of the merged motion information unit set i, the merged motion information unit set i including two motion information units.

Correspondingly, a video coding apparatus may write the identifier of the merged motion information unit set i into the video bit stream.

S305. The video decoding apparatus predicts a motion vector of the current picture block by using an affine motion model and the merged motion information unit set i.

For example, the video decoding apparatus may first perform motion estimation processing on a motion vector in the merged motion information unit set i to obtain a motion-estimated merged motion information unit set i, and the video decoding apparatus predicts the motion vector of the current picture block by using the affine motion model and the motion-estimated merged motion information unit set i.

It is assumed that a size of the current picture block is w h, and that w is equal or not equal to h.

It is assumed that coordinates of the two pixel samples are (0, 0) and (w, 0). Herein, for example, coordinates of a pixel in an upper left corner of a pixel sample participate in computation. Referring to FIG. 2-e, FIG. 2-e shows coordinates of four vertices of the current picture block.

Motion vectors of the two pixel samples are $(vx_0, vy_0)$ and $(vx_1, vy_1)$ respectively. The coordinates and motion vectors of the two pixel samples are substituted into the following affine motion model, and a motion vector of any pixel in the current picture block x may be computed:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases} \quad \text{(formula 1)}$$

The motion vectors of the two pixel samples are $(vx_0, vy_0)$ and $(vx_1, vy_1)$ respectively, vx and vy are respectively a horizontal component (vx) and a vertical component (vy) of a motion vector of a pixel sample whose coordinates are (x, y) in the current picture block, and w in the formula 1 is a length or width of the current picture block.

S306. The video decoding apparatus predicts a pixel value of the current picture block based on a computed motion vector of each pixel or each pixel block of the current picture block to obtain the predicted pixel value of the current picture block.

S307. The video decoding apparatus reconstructs the current picture block by using the predicted pixel value of the current picture block and the prediction residual of the current picture block.

It can be learned that, in the technical solution of this embodiment, a video decoding apparatus predicts a pixel value of a current picture block by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets of the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. Because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

The following further provides related apparatuses for implementing the foregoing solutions.

Figure 4:
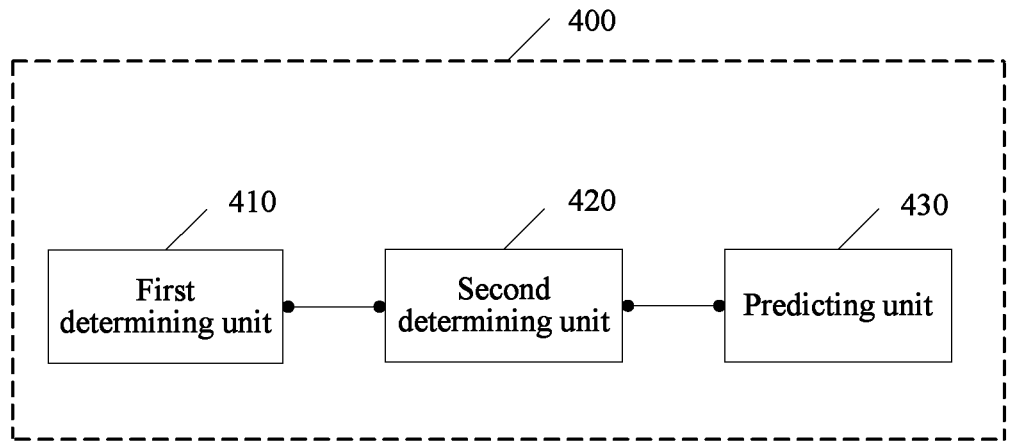
FIG. 4 is a schematic diagram of a picture prediction apparatus according to an embodiment of the present disclosure.

Referring to FIG. 4, an embodiment of the present disclosure further provides a picture prediction apparatus 400. The apparatus may include:

a first determining unit 410, configured to: determine two pixel samples in a current picture block, and determine a candidate motion information unit set corresponding to each of the two pixel samples, where the candidate motion information unit set corresponding to each pixel sample includes at least one candidate motion information unit;

a second determining unit 420, configured to determine a merged motion information unit set i including two motion information units, where each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and a predicting unit 430, configured to predict a pixel value of the current picture block by using an affine motion model and the merged motion information unit set i.

Optionally, in some possible implementations of the present disclosure, the second determining unit 420 may be specifically configured to determine, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

Optionally, in some possible implementations of the present disclosure, the N candidate merged motion information unit sets meet at least one of a first condition, a second condition, a third condition, a fourth condition, or a fifth condition, where the first condition includes that a motion mode of the current picture block indicated by a motion information unit in any one of the N candidate merged motion information unit sets is non-translational motion;

the second condition includes that prediction directions corresponding to two motion information units in any one of the N candidate merged motion information unit sets are the same;

the third condition includes that reference frame indexes corresponding to two motion information units in any one of the N candidate merged motion information unit sets are the same;

the fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples; and the fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of one motion information unit in any one of the N candidate merged motion information unit sets and a vertical component of a motion vector of a pixel sample Z is less than or equal to a vertical component threshold, where the pixel sample Z in the current picture block is different from either of the two pixel samples.

Optionally, in some possible implementations of the present disclosure, the two pixel samples include two pixel samples in an upper left pixel sample, an upper right pixel sample, a lower left pixel sample, and a central pixel sample a1 of the current picture block, where the upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block, the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

Optionally, in some possible implementations of the present disclosure, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer, where the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

Optionally, in some possible implementations of the present disclosure, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer, where the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

Optionally, in some possible implementations of the present disclosure, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer, where the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

Optionally, in some possible implementations of the present disclosure, a candidate motion information unit set corresponding to the central pixel sample a1 of the current picture block includes motion information units of x5 pixel samples, and one of the x5 pixel samples is a pixel sample a2, where a location of the central pixel sample a1 in the video frame to which the current picture block belongs is the same as a location of the pixel sample a2 in a video frame adjacent to the video frame to which the current picture block belongs, and x5 is a positive integer.

Optionally, in some possible implementations of the present disclosure, the predicting unit 430 is specifically configured to: when a reference frame index corresponding to a motion vector whose prediction direction is a first prediction direction in the merged motion information unit set i is different from a reference frame index of the current picture block, perform scaling processing on the merged motion information unit set i, so that the motion vector whose prediction direction is the first prediction direction in the merged motion information unit set i is scaled down to a reference frame of the current picture block, and predict the pixel value of the current picture block by using the affine motion model and a scaled merged motion information unit set i, where the first prediction direction is forward or backward; or the predicting unit 430 is specifically configured to: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, perform scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predict the pixel value of the current picture block by using the affine motion model and a scaled merged motion information unit set i.

Optionally, in some possible implementations of the present disclosure, the predicting unit 430 is specifically configured to: obtain a motion vector of each pixel in the current picture block through computation by using the affine motion model and the merged motion information unit set i, and determine a predicted pixel value of each pixel in the current picture block by using the motion vector that is of each pixel in the current picture block and is obtained through computation; or the predicting unit 430 is specifically configured to: obtain a motion vector of each pixel block in the current picture block through computation by using the affine motion model and the merged motion information unit set i, and determine a predicted pixel value of each pixel in each pixel block in the current picture block by using the motion vector that is of each pixel block in the current picture block and is obtained through computation.

Optionally, in some possible implementations of the present disclosure, the predicting unit 430 may be specifically configured to obtain a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i.

Optionally, in some possible implementations of the present disclosure, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

Optionally, in some possible implementations of the present disclosure, the affine motion model may be in the following form:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where the motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is the length or width of the current picture block.

Optionally, in some possible implementations of the present disclosure, the picture prediction apparatus is applied to a video coding apparatus, or the picture prediction apparatus is applied to a video decoding apparatus.

Optionally, in some possible implementations of the present disclosure, when the picture prediction apparatus is applied to the video decoding apparatus, the second determining unit 420 may be specifically configured to determine, from the N candidate merged motion information unit sets, based on an identifier that is of the merged motion information unit set i and is obtained from a video bit stream, the merged motion information unit set i including the two motion information units.

Optionally, in some possible implementations of the present disclosure, when the picture prediction apparatus is applied to the video decoding apparatus, the apparatus further includes a decoding unit, configured to: decode the video bit stream to obtain motion vector differences of the two pixel samples, obtain motion vector predictors of the two pixel samples by using motion vectors of pixel samples spatially adjacent or temporally adjacent to the two pixel samples, and obtain the motion vectors of the two pixel samples separately based on the motion vector predictors of the two pixel samples and the motion vector differences of the two pixel samples.

Optionally, in some possible implementations of the present disclosure, when the picture prediction apparatus is applied to the video coding apparatus, the predicting unit 430 is further configured to: obtain motion vector predictors of the two pixel samples by using motion vectors of pixel samples spatially adjacent or temporally adjacent to the two pixel samples, obtain motion vector differences of the two pixel samples according to the motion vector predictors of the two pixel samples, and write the motion vector differences of the two pixel samples into a video bit stream.

Optionally, in some possible implementations of the present disclosure, when the picture prediction apparatus is applied to the video coding apparatus, the apparatus further includes an encoding unit, configured to write an identifier of the merged motion information unit set i into the video bit stream.

It may be understood that, functions of functional units of the picture prediction apparatus 400 in this embodiment may be specifically implemented according to the method in the foregoing method embodiment. For a specific implementation process thereof, refer to the related description in the foregoing method embodiment. Details are not described again herein. The picture prediction apparatus 400 may be any apparatus that needs to output and play a video, for example, a device such as a notebook computer, a tablet computer, a personal computer, or a mobile phone.

It can be learned that, in the technical solution provided by this embodiment, the picture prediction apparatus 400 predicts a pixel value of a current picture block by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets of the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. In addition, because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

Figure 5:
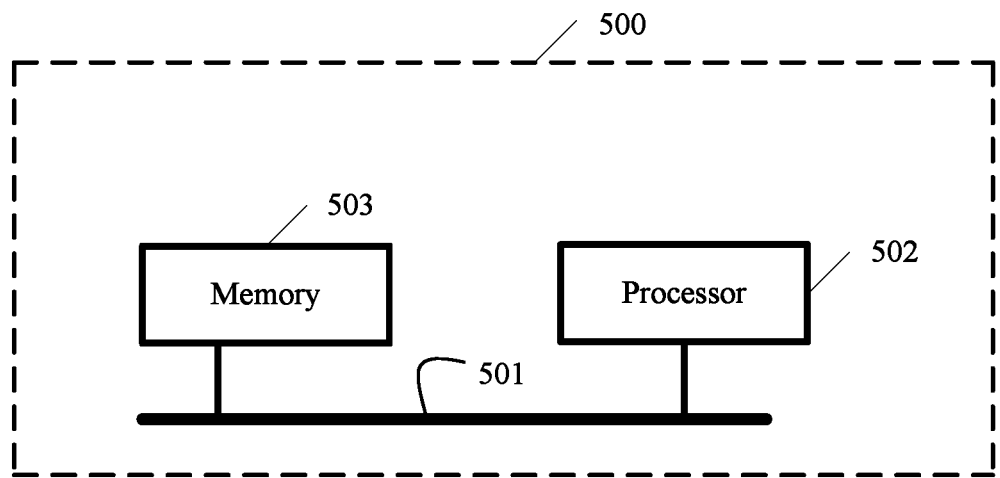
FIG. 5 is a schematic diagram of another picture prediction apparatus according to an embodiment of the present disclosure.

Referring to FIG. 5, FIG. 5 is a schematic diagram of a picture prediction apparatus 500 according to an embodiment of the present disclosure. The picture prediction apparatus 500 may include at least one bus 501, at least one processor 502 connected to the bus 501, and at least one memory 503 connected to the bus 501.

The processor 502 invokes, by using the bus 501, code or an instruction stored in the memory 503, so that the processor 502 is configured to: determine two pixel samples in a current picture block, and determine a candidate motion information unit set corresponding to each of the two pixel samples, where the candidate motion information unit set corresponding to each pixel sample includes at least one candidate motion information unit; determine a merged motion information unit set i including two motion information units, where each motion information unit in the merged motion information unit set i is selected from at least some of motion information units in the candidate motion information unit set corresponding to each of the two pixel samples, and the motion information unit includes a motion vector whose prediction direction is forward and/or a motion vector whose prediction direction is backward; and predict a pixel value of the current picture block by using an affine motion model and the merged motion information unit set i.

Optionally, in some possible implementations of the present disclosure, in an aspect of determining the merged motion information unit set i including the two motion information units, the processor is configured to determine, from N candidate merged motion information unit sets, the merged motion information unit set i including the two motion information units, where each motion information unit included in each of the N candidate merged motion information unit sets is selected from at least some of constraint-compliant motion information units in the candidate motion information unit set corresponding to each of the two pixel samples, N is a positive integer, the N candidate merged motion information unit sets are different from each other, and each of the N candidate merged motion information unit sets includes two motion information units.

Optionally, in some possible implementations of the present disclosure, the N candidate merged motion information unit sets meet at least one of a first condition, a second condition, a third condition, a fourth condition, or a fifth condition, where the first condition includes that a motion mode of the current picture block indicated by a motion information unit in any one of the N candidate merged motion information unit sets is non-translational motion;

the second condition includes that prediction directions corresponding to two motion information units in any one of the N candidate merged motion information unit sets are the same;

the third condition includes that reference frame indexes corresponding to two motion information units in any one of the N candidate merged motion information unit sets are the same;

the fourth condition includes that an absolute value of a difference between horizontal components of motion vectors of two motion information units in any one of the N candidate merged motion information unit sets is less than or equal to a horizontal component threshold, or that an absolute value of a difference between a horizontal component of a motion vector of one motion information unit in any one of the N candidate merged motion information unit sets and a horizontal component of a motion vector of a pixel sample Z is less than or equal to a horizontal component threshold, where the pixel sample Z in the current picture block is different from either of the two pixel samples; and the fifth condition includes that an absolute value of a difference between vertical components of motion vectors of two motion information units in any one of the N candidate merged motion information unit sets is less than or equal to a vertical component threshold, or that an absolute value of a difference between a vertical component of a motion vector of one motion information unit in any one of the N candidate merged motion information unit sets and a vertical component of a motion vector of a pixel sample Z is less than or equal to a vertical component threshold, where the pixel sample Z in the current picture block is different from either of the two pixel samples.

Optionally, in some possible implementations of the present disclosure, the two pixel samples include two pixel samples in an upper left pixel sample, an upper right pixel sample, a lower left pixel sample, and a central pixel sample a1 of the current picture block, where the upper left pixel sample of the current picture block is an upper left vertex of the current picture block, or a pixel block in the current picture block and including an upper left vertex of the current picture block; the lower left pixel sample of the current picture block is a lower left vertex of the current picture block, or a pixel block in the current picture block and including a lower left vertex of the current picture block; the upper right pixel sample of the current picture block is an upper right vertex of the current picture block, or a pixel block in the current picture block and including an upper right vertex of the current picture block; and the central pixel sample a1 of the current picture block is a central pixel of the current picture block, or a pixel block in the current picture block and including a central pixel of the current picture block.

Optionally, in some possible implementations of the present disclosure, a candidate motion information unit set corresponding to the upper left pixel sample of the current picture block includes motion information units of x1 pixel samples, where the x1 pixel samples include at least one pixel sample spatially adjacent to the upper left pixel sample of the current picture block and/or at least one pixel sample temporally adjacent to the upper left pixel sample of the current picture block, and x1 is a positive integer, where the x1 pixel samples include at least one of a pixel sample that has a same location as the upper left pixel sample of the current picture block, a pixel sample spatially adjacent to a left edge of the current picture block, a pixel sample spatially adjacent to an upper left of the current picture block, or a pixel sample spatially adjacent to an upper edge of the current picture block, in a video frame temporally adjacent to a video frame to which the current picture block belongs.

Optionally, in some possible implementations of the present disclosure, a candidate motion information unit set corresponding to the upper right pixel sample of the current picture block includes motion information units of x2 pixel samples, where the x2 pixel samples include at least one pixel sample spatially adjacent to the upper right pixel sample of the current picture block and/or at least one pixel sample temporally adjacent to the upper right pixel sample of the current picture block, and x2 is a positive integer, where the x2 pixel samples include at least one of a pixel sample that has a same location as the upper right pixel sample of the current picture block, a pixel sample spatially adjacent to a right edge of the current picture block, a pixel sample spatially adjacent to an upper right of the current picture block, or a pixel sample spatially adjacent to the upper edge of the current picture block, in a video frame temporally adjacent to the video frame to which the current picture block belongs.

Optionally, in some possible implementations of the present disclosure, a candidate motion information unit set corresponding to the lower left pixel sample of the current picture block includes motion information units of x3 pixel samples, where the x3 pixel samples include at least one pixel sample spatially adjacent to the lower left pixel sample of the current picture block and/or at least one pixel sample temporally adjacent to the lower left pixel sample of the current picture block, and x3 is a positive integer, where the x3 pixel samples include at least one of a pixel sample that has a same location as the lower left pixel sample of the current picture block, a pixel sample spatially adjacent to the left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

Optionally, in some possible implementations of the present disclosure, a candidate motion information unit set corresponding to the central pixel sample a1 of the current picture block includes motion information units of x5 pixel samples, and one of the x5 pixel samples is a pixel sample a2, where a location of the central pixel sample a1 in the video frame to which the current picture block belongs is the same as a location of the pixel sample a2 in a video frame adjacent to the video frame to which the current picture block belongs, and x5 is a positive integer.

Optionally, in some possible implementations of the present disclosure, in an aspect of predicting the pixel value of the current picture block by using the affine motion model and the merged motion information unit set i, the processor 502 is configured to: when a reference frame index corresponding to a motion vector whose prediction direction is a first prediction direction in the merged motion information unit set i is different from a reference frame index of the current picture block, perform scaling processing on the merged motion information unit set i, so that the motion vector whose prediction direction is the first prediction direction in the merged motion information unit set i is scaled down to a reference frame of the current picture block, and predict the pixel value of the current picture block by using the affine motion model and a scaled merged motion information unit set i, where the first prediction direction is forward or backward; or in an aspect of predicting the pixel value of the current picture block by using the affine motion model and the merged motion information unit set i, the processor 502 is configured to: when a reference frame index corresponding to a motion vector whose prediction direction is forward in the merged motion information unit set i is different from a forward reference frame index of the current picture block, and a reference frame index corresponding to a motion vector whose prediction direction is backward in the merged motion information unit set i is different from a backward reference frame index of the current picture block, perform scaling processing on the merged motion information unit set i, so that the motion vector whose prediction direction is forward in the merged motion information unit set i is scaled down to a forward reference frame of the current picture block and that the motion vector whose prediction direction is backward in the merged motion information unit set i is scaled down to a backward reference frame of the current picture block, and predict the pixel value of the current picture block by using the affine motion model and a scaled merged motion information unit set i.

Optionally, in some possible implementations of the present disclosure, in the aspect of predicting the pixel value of the current picture block by using the affine motion model and the merged motion information unit set i, the processor 502 is configured to: obtain a motion vector of each pixel in the current picture block through computation by using the affine motion model and the merged motion information unit set i, and determine a predicted pixel value of each pixel in the current picture block by using the motion vector that is of each pixel in the current picture block and is obtained through computation; or in the aspect of predicting the pixel value of the current picture block by using the affine motion model and the merged motion information unit set i, the processor 502 is configured to: obtain a motion vector of each pixel block in the current picture block through computation by using the affine motion model and the merged motion information unit set i, and determine a predicted pixel value of each pixel in each pixel block in the current picture block by using the motion vector that is of each pixel block in the current picture block and is obtained through computation.

Optionally, in some possible implementations of the present disclosure, in the aspect of predicting the pixel value of the current picture block by using the affine motion model and the merged motion information unit set i, the processor 502 is configured to obtain a motion vector of any pixel sample in the current picture block by using a ratio of a difference between horizontal components of motion vectors of the two pixel samples to a length or width of the current picture block and a ratio of a difference between vertical components of the motion vectors of the two pixel samples to the length or width of the current picture block, where the motion vectors of the two pixel samples are obtained based on motion vectors of the two motion information units in the merged motion information unit set i.

Optionally, in some possible implementations of the present disclosure, a horizontal coordinate coefficient of the horizontal components of the motion vectors of the two pixel samples is equal to a vertical coordinate coefficient of the vertical components of the motion vectors, and a vertical coordinate coefficient of the horizontal components of the motion vectors of the two pixel samples is opposite to a horizontal coordinate coefficient of the vertical components of the motion vectors.

Optionally, in some possible implementations of the present disclosure, the affine motion model may be in the following form:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where the motion vectors of the two pixel samples are $(vx_0, vy_0)$ and $(vx_1, vy_1)$ respectively, vx is a horizontal component of a motion vector of a pixel sample whose coordinates are (x, y) in the current picture block, vy is a vertical component of the motion vector of the pixel sample whose coordinates are (x, y) in the current picture block, and w is the length or width of the current picture block.

Optionally, in some possible implementations of the present disclosure, the picture prediction apparatus is applied to a video coding apparatus, or the picture prediction apparatus is applied to a video decoding apparatus.

Optionally, in some possible implementations of the present disclosure, when the picture prediction apparatus is applied to the video decoding apparatus, in the aspect of determining the merged motion information unit set i including the two motion information units, the processor 502 is configured to determine, from the N candidate merged motion information unit sets, based on an identifier that is of the merged motion information unit set i and is obtained from a video bit stream, the merged motion information unit set i including the two motion information units.

Optionally, in some possible implementations of the present disclosure, when the picture prediction apparatus is applied to the video decoding apparatus, the processor 502 is further configured to: decode the video bit stream to obtain motion vector differences of the two pixel samples, obtain motion vector predictors of the two pixel samples by using motion vectors of pixel samples spatially adjacent or temporally adjacent to the two pixel samples, and obtain the motion vectors of the two pixel samples separately based on the motion vector predictors of the two pixel samples and the motion vector differences of the two pixel samples.

Optionally, in some possible implementations of the present disclosure, when the picture prediction apparatus is applied to the video coding apparatus, the processor 502 is further configured to: obtain motion vector predictors of the two pixel samples by using motion vectors of pixel samples spatially adjacent or temporally adjacent to the two pixel samples, obtain motion vector differences of the two pixel samples according to the motion vector predictors of the two pixel samples, and write the motion vector differences of the two pixel samples into a video bit stream.

Optionally, in some possible implementations of the present disclosure, when the picture prediction apparatus is applied to the video coding apparatus, the processor 502 is further configured to write an identifier of the merged motion information unit set i into the video bit stream.

It may be understood that, functions of functional units of the picture prediction apparatus 500 in this embodiment may be specifically implemented according to the method in the foregoing method embodiment. For a specific implementation process thereof, refer to the related description in the foregoing method embodiment. Details are not described again herein. The picture prediction apparatus 500 may be any apparatus that needs to output and play a video, for example, a device such as a notebook computer, a tablet computer, a personal computer, or a mobile phone.

It can be learned that, in the technical solution provided by this embodiment, the picture prediction apparatus 500 predicts a pixel value of a current picture block by using an affine motion model and a merged motion information unit set i, where each motion information unit in the merged motion information unit set i is selected from at least some of motion information units in a candidate motion information unit set corresponding to each of two pixel samples. Because a selection range of the merged motion information unit set i becomes relatively small, a mechanism used in a conventional technology for screening out motion information units of multiple pixel samples only by performing a huge amount of computation in all possible candidate motion information unit sets of the multiple pixel samples is abandoned. This helps improve coding efficiency, also helps reduce computational complexity of picture prediction performed based on the affine motion model, further makes it possible to introduce the affine motion model into a video coding standard, and because the affine motion model is introduced, helps describe motion of an object more accurately, and therefore helps improve prediction accuracy. In addition, because a quantity of reference pixel samples may be two, this helps further reduce the computational complexity of picture prediction performed based on the affine motion model after the affine motion model is introduced, and also helps reduce affine parameter information or a quantity of motion vector differences or the like transferred by an encoder.

An embodiment of the present disclosure further provides a computer storage medium. The computer storage medium may store a program, and when the program is executed, at least some or all of the steps of any picture prediction method in the foregoing method embodiments may be performed.

Figure 6:
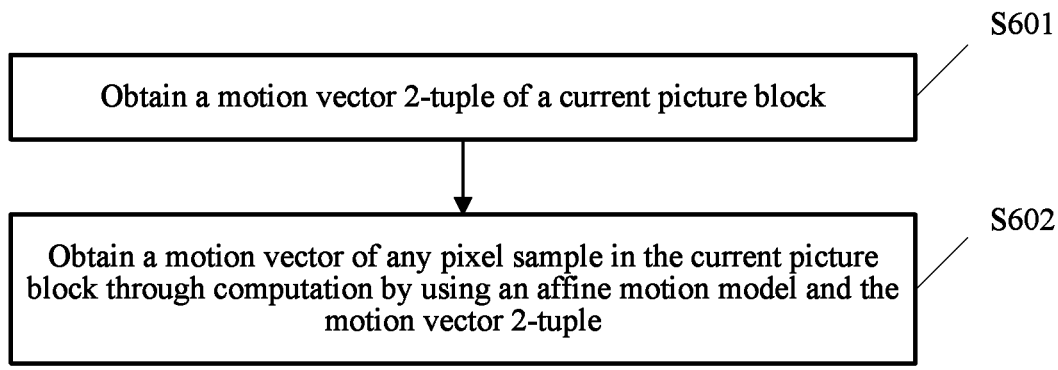
FIG. 6 is a schematic flowchart of a picture processing method according to an embodiment of the present disclosure.

Referring to FIG. 6, FIG. 6 is a schematic flowchart of a picture processing method according to an embodiment of the present disclosure. As shown by way of example in FIG. 6, a picture processing method provided by an embodiment of the present disclosure may include the following steps.

S601. Obtain a motion vector 2-tuple of a current picture block.

The motion vector 2-tuple may include motion vectors of two pixel samples in a video frame to which the current picture block belongs. The pixel sample mentioned in each embodiment of the present disclosure may be a pixel or a pixel block including at least two pixels.

The motion vector mentioned in each embodiment of the present disclosure may be a forward motion vector, or may be a backward motion vector. Directions of the motion vectors in the motion vector 2-tuple may be the same.

The current picture block may be a current coding block or a current decoding block.

The motion vector 2-tuple may include the motion vectors of the two pixel samples in the foregoing embodiment, or may include one motion vector of each motion information unit in the merged motion information unit set i in the foregoing embodiment, or may include one motion vector of each motion information unit in the scaled merged motion information unit set i in the foregoing embodiment, or may include one motion vector of each motion information unit in the motion-estimated merged motion information unit set i in the foregoing embodiment, or may be the motion vector 2-tuple obtained by performing an iterative update by using the motion vector of each motion information unit in the merged motion information unit set i in the foregoing embodiment as a predicted value. For details of the motion vectors of the two pixel samples, the merged motion information unit set i, the scaled merged motion information unit set i, and the motion-estimated merged motion information unit set i, refer to the detailed description in the foregoing embodiment. Details are not described again herein. The merged motion information unit set i in the foregoing embodiment may include motion vectors, and may also include directions of the motion vectors or reference frame indexes corresponding to the motion vectors, but the motion vector 2-tuple in this embodiment of the present disclosure includes only motion vectors.

The two pixel samples may include two pixel samples in an upper left pixel sample, a pixel sample in a right region, a pixel sample in a lower region, and a pixel sample in a lower right region of the current picture block.

The upper left pixel sample of the current picture block may be an upper left vertex of the current picture block, or a pixel block in the current picture block and including an upper left vertex of the current picture block. In video coding and decoding, coordinate values of the upper left pixel sample may be (0, 0) by default.

The pixel sample in the lower region of the current picture block may be a pixel or a pixel block below the upper left pixel sample of the current picture block. A vertical coordinate of the pixel sample in the lower region is greater than a vertical coordinate of the upper left pixel sample. The pixel sample in the lower region may include the lower left pixel sample in the foregoing embodiment. A horizontal coordinate of the pixel sample in the lower region may be the same as a horizontal coordinate of the upper left pixel sample, or a difference between a horizontal coordinate of the pixel sample in the lower region and a horizontal coordinate of the upper left pixel sample may be n pixels in height, where n is a positive integer less than 3. disclosure The pixel sample in the right region of the current picture block may be a pixel or a pixel block on a right side of the upper left pixel sample of the current picture block. A horizontal coordinate of the pixel sample in the right region is greater than the horizontal coordinate of the upper left pixel sample. The pixel sample in the right region may include the upper right pixel sample in the foregoing embodiment. A vertical coordinate of the pixel sample in the right region may be the same as the vertical coordinate of the upper left pixel sample, or a difference between a vertical coordinate of the pixel sample in the right region and the vertical coordinate of the upper left pixel sample may be n pixels in width, where n is a positive integer less than 3.

The pixel sample in the lower right region of the current picture block may be a pixel or a pixel block on a lower right side of the upper left pixel sample of the current picture block. A vertical coordinate of the pixel sample in the lower right region is greater than the vertical coordinate of the upper left pixel sample, and a horizontal coordinate of the pixel sample in the lower right region is greater than the horizontal coordinate of the upper left pixel sample. The pixel sample in the lower right region may include the central pixel sample a1 in the foregoing embodiment, and may further include a lower right pixel sample. The lower right pixel sample of the current picture block may be a lower right vertex of the current picture block, or a pixel block in the current picture block and including a lower right vertex of the current picture block.

If a pixel sample is a pixel block, a size of the pixel block is, for example, 2*2, 1*2, 4*2, 4*4, or another size.

For details of the upper left pixel sample, the upper right pixel sample, the lower left pixel sample, and the central pixel sample a1 of the current picture block, refer to the detailed description in the foregoing embodiment. Details are not described again herein.

The two pixel samples may also be the two pixel samples in the foregoing embodiment. For details of the two pixel samples, refer to the detailed description in the foregoing embodiment. Details are not described again herein.

S602. Obtain a motion vector of any pixel sample in the current picture block through computation by using an affine motion model and the motion vector 2-tuple.

The motion vector that is of any pixel sample in the current picture block and is obtained through computation may be any one of: the motion vector of each pixel in the current picture block, the motion vector of each pixel block in the current picture block, or the motion vector of any pixel sample in the current picture block in the foregoing embodiment. For details about the motion vector of each pixel in the current picture block, the motion vector of each pixel block in the current picture block, and the motion vector of any pixel sample in the current picture block in the foregoing embodiment, refer to the detailed description in the foregoing embodiment. Details are not described again herein.

The affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

Optionally, in some possible implementations of the present disclosure, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

Optionally, in some possible implementations of the present disclosure, a quadratic sum of the horizontal coordinate coefficient of the horizontal component of the affine motion model and the vertical coordinate coefficient of the horizontal component of the affine motion model is not equal to 1. Alternatively, in some possible implementations of the present disclosure, a quadratic sum of the vertical coordinate coefficient of the vertical component of the affine motion model and the horizontal coordinate coefficient of the vertical component of the affine motion model is not equal to 1.

Optionally, in some possible implementations of the present disclosure, the obtaining a motion vector of any pixel sample in the current picture block through computation by using an affine motion model and the motion vector 2-tuple may include: obtaining values of the coefficients of the affine motion model by using the motion vectors of the two pixel samples and locations of the two pixel samples; and obtaining the motion vector of the any pixel sample in the current picture block by using the affine motion model and the values of the coefficients of the affine motion model.

Optionally, in some possible implementations of the present disclosure, the obtaining a motion vector of any pixel sample in the current picture block through computation by using an affine motion model and the motion vector 2-tuple may include: obtaining the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtaining the motion vector of the any pixel sample in the current picture block by using the affine motion model and the values of the coefficients of the affine motion model.

Alternatively, the obtaining a motion vector of any pixel sample in the current picture block through computation by using an affine motion model and the motion vector 2-tuple may include: obtaining the values of the coefficients of the affine motion model by using a ratio of a weighted sum of components of the motion vectors of the two pixel samples to a distance between the two pixel samples or to a square of a distance between the two pixel samples; and obtaining the motion vector of the any pixel sample in the current picture block by using the affine motion model and the values of the coefficients of the affine motion model.

Optionally, in some possible implementations of the present disclosure, when the two pixel samples include the upper left pixel sample of the current picture block and the pixel sample in the right region on the right side of the upper left pixel sample, the affine motion model is specifically:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where $(vx_0, vy_0)$ are a motion vector of the upper left pixel sample, $(vx_1, vy_1)$ are a motion vector of the pixel sample in the right region, and w is a distance between the two pixel samples, or w may be a difference between the horizontal coordinate of the pixel sample in the right region and the horizontal coordinate of the upper left pixel sample.

Optionally, in some possible implementations of the present disclosure, when the two pixel samples include the upper left pixel sample of the current picture block and the pixel sample in the lower region below the upper left pixel sample, the affine motion model is specifically:

$$\begin{cases} vx = \dfrac{vy_2 - vy_0}{h}x + \dfrac{vx_2 - vx_0}{h}y + vx_0 \\ vy = -\dfrac{vx_2 - vx_0}{h}x + \dfrac{vy_2 - vy_0}{h}y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples, or h may be the difference between the vertical coordinate of the pixel sample in the lower region and the vertical coordinate of the upper left pixel sample.

Optionally, in some possible implementations of the present disclosure, when the two pixel samples include the upper left pixel sample of the current picture block and the pixel sample in the lower right region on the lower right side of the upper left pixel sample, the affine motion model is specifically:

$$\begin{cases} vx = \dfrac{(vx_3w_1 + vy_3h_1) - (vx_0w_1 + vy_0h_1)}{w_1^2 + h_1^2}x + \dfrac{(vx_3h_1 - vy_3w_1) - (vx_0h_1 - vy_0w_1)}{w_1^2 + h_1^2}y + vx_0 \\ vy = -\dfrac{(vx_3h_1 - vy_3w_1) - (vx_0h_1 - vy_0w_1)}{w_1^2 + h_1^2}x + \dfrac{(vx_3w_1 + vy_3h_1) - (vx_0w_1 + vy_0h_1)}{w_1^2 + h_1^2}y + vy_0 \end{cases},$$

where $(vx_0, vy_0)$ are a motion vector of the upper left pixel sample, $(vx_3, vy_3)$ are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

Optionally, in some possible implementations of the present disclosure, when the two pixel samples are any two pixel samples in the video frame to which the current picture block belongs, the affine motion model is specifically:

$$vx = \dfrac{(vx_5 - vx_4)(x_5 - x_4) + (vy_5 - vy_4)(y_5 - y_4)}{(x_5 - x_4)^2 + (y_5 - y_4)^2}x -$$
$$\dfrac{(vy_5 - vy_4)(x_5 - x_4) + (vx_5 - vx_4)(y_5 - y_4)}{(x_5 - x_4)^2 + (y_5 - y_4)^2}y -$$
$$\left[\dfrac{(vx_5 - vx_4)(x_5 - x_4) + (vy_5 - vy_4)(y_5 - y_4)}{(x_2 - x_2)^2 + (y_2 - y_1)^2}x_4 -\right.$$
$$\left.\dfrac{(vy_5 - vy_4)(x_5 - x_4) + (vx_5 - vx_4)(y_5 - y_4)}{(x_5 - x_4)^2 + (y_5 - y_4)^2}y_4 - vx_4\right]$$

$$vy = \dfrac{(vy_5 - vy_4)(x_5 - x_4) + (vx_5 - vx_4)(y_5 - y_4)}{(x_5 - x_4)^2 + (y_5 - y_4)^2}x +$$
$$\dfrac{(vx_5 - vx_4)(x_5 - x_4) + (vy_5 - vy_4)(y_5 - y_4)}{(x_5 - x_4)^2 + (y_5 - y_4)^2}y -$$
$$\left[\dfrac{(vy_5 - vy_4)(x_5 - x_4) + (vx_5 - vx_4)(y_5 - y_4)}{(x_5 - x_4)^2 + (y_5 - y_4)^2}x_4 +\right.$$
$$\left.\dfrac{(vx_5 - vx_4)(x_5 - x_4) + (vy_5 - vy_4)(y_5 - y_4)}{(x_5 - x_4)^2 + (y_5 - y_4)^2}y_4 - vy_4\right],$$

where $(x_4, y_4)$ are coordinates of one pixel sample in the two pixel samples, $(vx_4, vy_4)$ are a motion vector of the pixel sample whose coordinates are $(x_4, y_4)$, $(x_5, y_5)$ are coordinates of the other pixel sample in the two pixel samples, and $(vx_5, vy_5)$ are a motion vector of the other pixel sample whose coordinates are $(x_5, y_5)$.

Optionally, in some possible implementations of the present disclosure, when the picture processing method is applied to picture tracing, after the motion vector of the any pixel sample in the current picture block is obtained through computation, a corresponding location, corresponding to the any pixel sample, in a frame corresponding to the motion vector of the any pixel sample may be further determined by using the location of the any pixel sample in the current picture block and the motion vector of the any pixel sample.

Further, a picture block, corresponding to the current picture block, in the corresponding frame is obtained according to the corresponding location, the corresponding picture block is compared with the current picture block, a sum of quadratic differences or a sum of absolute differences between the two picture blocks is computed, and a matching error between the two picture blocks is measured for evaluating accuracy of picture tracing of the current picture block.

Optionally, in some possible implementations of the present disclosure, when the picture processing method is applied to picture prediction, after the motion vector of the any pixel sample in the current picture block is obtained through computation, a predicted pixel value of a pixel of the any pixel sample in the current picture block may be further determined by using the motion vector that is of the any pixel sample in the current picture block and is obtained through computation. The motion vector of the any pixel sample in the current picture block may be a motion vector of any pixel in the current picture block, and the process may be: determining a predicted pixel value of each pixel in the current picture block by using the motion vector that is of each pixel in the current picture block and is obtained through computation. The motion vector of the any pixel sample in the current picture block may also be a motion vector of any pixel block in the current picture block, and the process may be: determining a predicted pixel value of each pixel in each pixel block in the current picture block by using the motion vector that is of each pixel block in the current picture block and is obtained through computation.

During a test, it is found that performing motion vector computation by using a pixel block in the current picture block as a granularity helps reduce computational complexity greatly if the motion vector of each pixel block in the current picture block is obtained through computation by using the affine motion model and the merged motion information unit set i and then the predicted pixel value of each pixel in each pixel block in the current picture block is determined by using the motion vector that is of each pixel block in the current picture block and is obtained through computation.

Optionally, in some possible implementations of the present disclosure, when the picture processing method is applied to a video coding process, the method may further include: performing motion compensation predictive coding on the any pixel sample in the current picture block by using the motion vector that is of the any pixel sample in the current picture block and is obtained through computation.

Specifically, the process may be: determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, so as to obtain a pixel reconstruction value of the any pixel sample.

Alternatively, the process may be: determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, obtaining a prediction residual of the any pixel sample by using the pixel value of the pixel of the any pixel sample obtained by performing motion compensation prediction and an actual pixel value of the pixel of the any pixel sample, and encoding the prediction residual of the any pixel sample into a bit stream.

Alternatively, after the prediction residual of the any pixel sample is obtained, a similar method is used to obtain prediction residuals of other pixel samples required by a prediction residual of the current picture block, so that the prediction residual of the current picture block is obtained. Then the prediction residual of the current picture block is encoded into the bit stream. The actual pixel value may also be referred to as an original pixel value.

Optionally, in some possible implementations of the present disclosure, when the picture processing method is applied to a video decoding process, the method further includes: performing motion compensation decoding on the any pixel sample by using the motion vector that is of the any pixel sample in the current picture block and is obtained through computation, and obtaining a pixel reconstruction value of the any pixel sample.

Specifically, the process may be: determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, so as to obtain a pixel reconstruction value of the any pixel sample.

Alternatively, the process may be: determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, and decoding a bit stream to obtain a prediction residual of the any pixel sample, or decoding a bit stream to obtain a prediction residual of the current picture block, so as to obtain a prediction residual of the any pixel sample, and obtaining a pixel reconstruction value of the any pixel sample with reference to the pixel value that is of the pixel of the any pixel sample and is obtained by performing motion compensation prediction.

It may be understood that, picture processing may be performed on each picture block in a current video frame in a mode similar to a picture processing mode corresponding to the current picture block. Certainly, picture processing may be performed on some picture blocks in the current video frame in a mode different from the picture processing mode corresponding to the current picture block.

In the technical solution provided by this embodiment of the present disclosure, an affine motion model based on rotation and scaling motion is constructed by using only two parameters. This not only reduces computational complexity, but also improves motion vector estimation accuracy. After two displacement coefficients are introduced into the technical solution, motion vector estimation may be performed based on mixed motion of rotation, scaling, and translational motion according to the technical solution, so that motion vector estimation is more accurate.

For better understanding and implementing the foregoing solution of embodiments of the present disclosure, the following uses specific application scenarios for further description.

Figure 7:
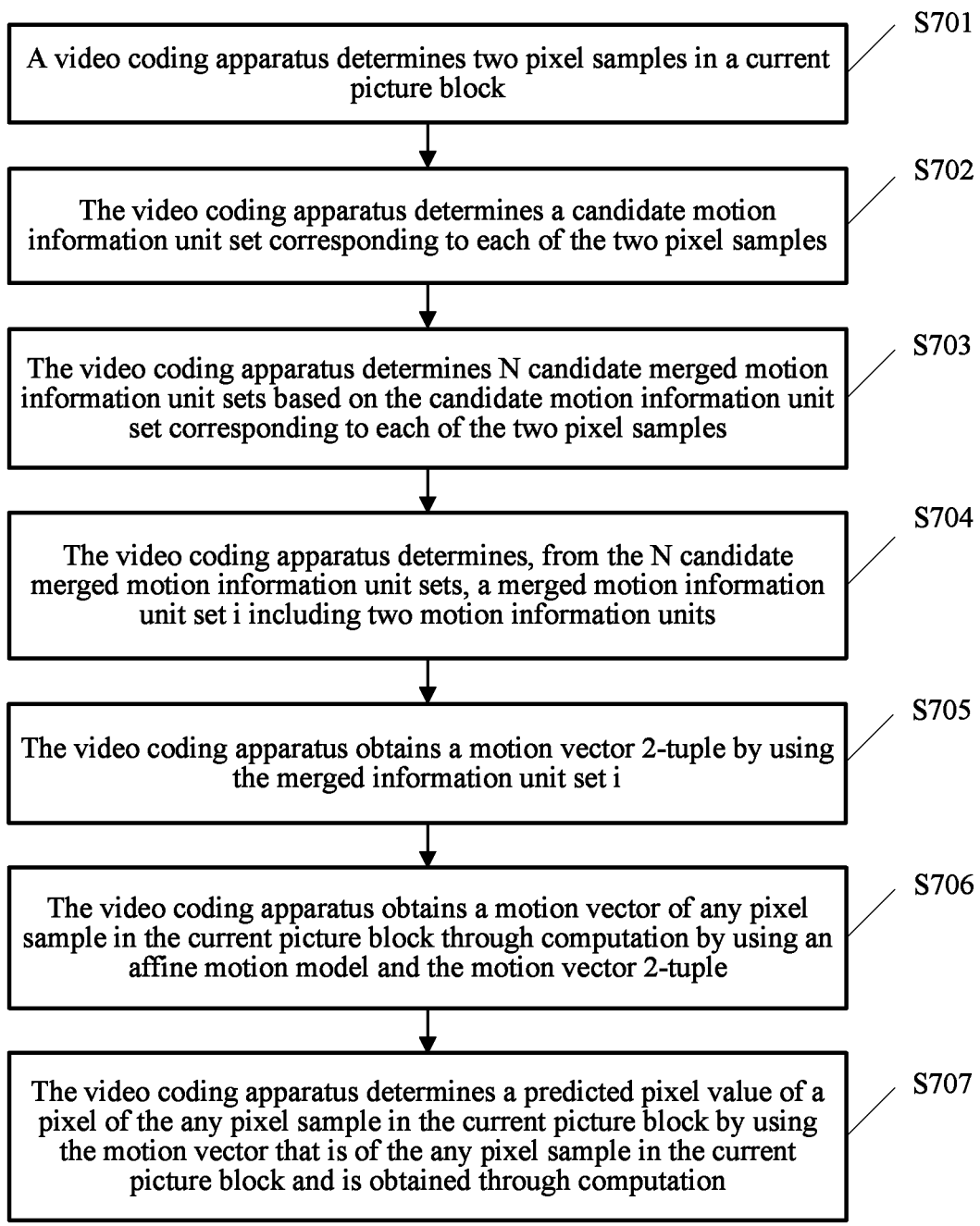
FIG. 7 is a schematic flowchart of another picture processing method according to an embodiment of the present disclosure.

Referring to FIG. 7, FIG. 7 is a schematic flowchart of another picture processing method according to another embodiment of the present disclosure. This embodiment is described mainly by using a picture processing method implemented in a video coding apparatus as an example. As shown by way of example in FIG. 7, another picture processing method provided by another embodiment of the present disclosure may include the following steps.

S701. A video coding apparatus determines two pixel samples in a current picture block.

The two pixel samples may include two pixel samples in an upper left pixel sample, a pixel sample in a right region, a pixel sample in a lower region, and a pixel sample in a lower right region of the current picture block. For substantive content of the upper left pixel sample, the pixel sample in the right region, the pixel sample in the lower region, and the pixel sample in the lower right region of the current picture block, refer to the detailed description in the foregoing embodiment. Details are not described again herein.

S702. The video coding apparatus determines a candidate motion information unit set corresponding to each of the two pixel samples.

The candidate motion information unit set corresponding to each pixel sample includes at least one candidate motion information unit.

The pixel sample mentioned in each embodiment of the present disclosure may be a pixel or a pixel block including at least two pixels.

Optionally, in some possible implementations of the present disclosure, for details of a candidate motion information unit set corresponding to the upper left pixel sample of the current picture block and a method for generating the corresponding candidate motion information unit set, refer to the detailed description in the foregoing embodiment. Details are not described again herein.

Optionally, in some possible implementations of the present disclosure, a candidate motion information unit set corresponding to the pixel sample in the right region of the current picture block includes motion information units of x6 pixel samples. The x6 pixel samples include at least one pixel sample spatially adjacent to the pixel sample in the right region of the current picture block and/or at least one pixel sample temporally adjacent to the pixel sample in the right region of the current picture block, and x6 is a positive integer.

For example, x6 may be, for example, equal to 1, 2, 3, 4, 5, 6, or another value.

For example, the x6 pixel samples include at least one of a pixel sample that has a same location as the pixel sample in the right region of the current picture block, a pixel sample spatially adjacent to a right edge of the current picture block, a pixel sample spatially adjacent to an upper right of the current picture block, or a pixel sample spatially adjacent to an upper edge of the current picture block, in a video frame temporally adjacent to a video frame to which the current picture block belongs.

Optionally, in some possible implementations of the present disclosure, a candidate motion information unit set corresponding to the pixel sample in the lower region of the current picture block includes motion information units of x7 pixel samples. The x7 pixel samples include at least one pixel sample spatially adjacent to the pixel sample in the lower region of the current picture block and/or at least one pixel sample temporally adjacent to the pixel sample in the lower region of the current picture block, and x7 is a positive integer.

For example, x7 may be, for example, equal to 1, 2, 3, 4, 5, 6, or another value.

For example, the x7 pixel samples include at least one of a pixel sample that has a same location as the pixel sample in the lower region of the current picture block, a pixel sample spatially adjacent to a left edge of the current picture block, a pixel sample spatially adjacent to a lower left of the current picture block, or a pixel sample spatially adjacent to a lower edge of the current picture block, in a video frame temporally adjacent to the video frame to which the current picture block belongs.

Optionally, in some possible implementations of the present disclosure, a candidate motion information unit set corresponding to the pixel sample in the lower right region of the current picture block includes motion information units of x8 pixel samples. The x8 pixel samples include at least one pixel sample spatially adjacent to the pixel sample in the lower right region of the current picture block and/or at least one pixel sample temporally adjacent to the pixel sample in the lower right region of the current picture block, and x8 is a positive integer.

For example, x8 may be, for example, equal to 1, 2, 3, 4, 5, 6, or another value.

For example, the x8 pixel samples include at least one of a pixel sample that has a same location as the pixel sample in the lower right region of the current picture block, a pixel sample spatially adjacent to the right edge of the current picture block, a pixel sample spatially adjacent to a lower right of the current picture block, or a pixel sample spatially adjacent to the lower edge of the current picture block, in a video frame temporally adjacent to the video frame to which the current picture block belongs.

A candidate motion information unit set corresponding to a lower right pixel sample included in the pixel sample in the lower right region includes at least one pixel sample spatially adjacent to the lower right pixel sample of the current picture block and/or at least one pixel sample temporally adjacent to the lower right pixel sample of the current picture block, for example, may include at least one of a pixel sample that has a same location as the lower right pixel sample of the current picture block, a pixel sample spatially adjacent to the right edge of the current picture block, a pixel sample spatially adjacent to the lower right of the current picture block, or a pixel sample spatially adjacent to the lower edge of the current picture block, in a video frame temporally adjacent to the video frame to which the current picture block belongs.

For candidate motion information unit sets corresponding to a lower left pixel sample, an upper right pixel sample, and a central pixel sample a1 that are included in the pixel samples and methods for generating the corresponding candidate motion information unit sets, refer to the detailed description in the foregoing embodiment. Details are not described again herein.

Similarly, for methods for generating the candidate motion information unit sets corresponding to the pixel sample in the right region, the pixel sample in the lower region, the pixel sample in the lower right region, and the lower right pixel sample included in the pixel sample in the lower right region, refer to the method for generating the candidate motion information unit set corresponding to the lower left pixel sample, the upper right pixel sample, or the central pixel sample a1. Details are not described again herein.

S703. The video coding apparatus determines N candidate merged motion information unit sets based on the candidate motion information unit set corresponding to each of the two pixel samples.

For details of S703, refer to the detailed description in S203 in the foregoing embodiment. Details are not described again herein.

S704. The video coding apparatus determines, from the N candidate merged motion information unit sets, a merged motion information unit set i including two motion information units.

Optionally, in some possible implementations of the present disclosure, the video coding apparatus may further write an identifier of the merged motion information unit set i into a video bit stream. Correspondingly, a video decoding apparatus determines, from the N candidate merged motion information unit sets, based on the identifier that is of the merged motion information unit set i and is obtained from the video bit stream, the merged motion information unit set i including the two motion information units. The identifier of the merged motion information unit set i may be any information that can identify the merged motion information unit set i. For example, the identifier of the merged motion information unit set i may be an index of the merged motion information unit set i in a merged motion information unit set list.

In addition, for details of S704, refer to the detailed description in S204 in the foregoing embodiment. Details are not described again herein.

S705. The video coding apparatus obtains a motion vector 2-tuple by using the merged motion information unit set i.

Optionally, in some possible implementations of the present disclosure, the video coding apparatus may use two motion vectors in the merged information unit set i of the current picture block as motion vector predictors and as initial values to search for two motion vectors in the motion vector 2-tuple to perform a simplified affine motion search. The search process is described briefly as follows: using the motion vector predictors as initial values and performing an iterative update; and when a quantity of iterative updates reaches a specified quantity, or a matching error between a predicted value of the current picture block that is obtained according to two motion vectors obtained by performing an iterative update and an original value of the current picture block is less than a specified threshold, using the two motion vectors obtained by performing the iterative update as the motion vector 2-tuple.

Optionally, in some possible implementations of the present disclosure, the video coding apparatus may further obtain motion vector prediction residuals of the two pixel samples by using the two motion vectors in the merged information unit set i of the current picture block and the two motion vectors in the motion vector 2-tuple, namely, a difference between a motion vector corresponding to each motion vector in the merged information unit set i of the current picture block, in the motion vector 2-tuple and each motion vector in the merged information unit set i of the current picture block, and encode the motion vector prediction differences of the two pixel samples.

S706. The video coding apparatus obtains a motion vector of any pixel sample in the current picture block through computation by using an affine motion model and the motion vector 2-tuple.

The motion vector that is of any pixel sample in the current picture block and is obtained through computation may be any one of: the motion vector of each pixel in the current picture block, the motion vector of each pixel block in the current picture block, or the motion vector of any pixel sample in the current picture block in the foregoing embodiment. For details about the motion vector of each pixel in the current picture block, the motion vector of each pixel block in the current picture block, and the motion vector of any pixel sample in the current picture block in the foregoing embodiment, refer to the detailed description in the foregoing embodiment. Details are not described again herein.

The affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample, and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

Optionally, in some possible implementations of the present disclosure, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

Optionally, in some possible implementations of the present disclosure, a quadratic sum of the horizontal coordinate coefficient of the horizontal component of the affine motion model and the vertical coordinate coefficient of the horizontal component of the affine motion model is not equal to 1. Alternatively, in some possible implementations of the present disclosure, a quadratic sum of the vertical coordinate coefficient of the vertical component of the affine motion model and the horizontal coordinate coefficient of the vertical component of the affine motion model is not equal to 1.

Optionally, in some possible implementations of the present disclosure, the obtaining a motion vector of any pixel sample in the current picture block through computation by using an affine motion model and the motion vector 2-tuple may include: obtaining values of the coefficients of the affine motion model by using the motion vectors of the two pixel samples and locations of the two pixel samples; and obtaining the motion vector of the any pixel sample in the current picture block by using the affine motion model and the values of the coefficients of the affine motion model.

Optionally, in some possible implementations of the present disclosure, the obtaining a motion vector of any pixel sample in the current picture block through computation by using an affine motion model and the motion vector 2-tuple may include: obtaining the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtaining the motion vector of the any pixel sample in the current picture block by using the affine motion model and the values of the coefficients of the affine motion model.

Alternatively, the obtaining a motion vector of any pixel sample in the current picture block through computation by using an affine motion model and the motion vector 2-tuple may include: obtaining the values of the coefficients of the affine motion model by using a ratio of a weighted sum of components of the motion vectors of the two pixel samples to a distance between the two pixel samples or to a square of a distance between the two pixel samples; and obtaining the motion vector of the any pixel sample in the current picture block by using the affine motion model and the values of the coefficients of the affine motion model.

Optionally, in some possible implementations of the present disclosure, when the two pixel samples include the upper left pixel sample of the current picture block and the pixel sample in the right region on the right side of the upper left pixel sample, the affine motion model is specifically:

$$\begin{cases} vx = \dfrac{vx_1 - vx_0}{w} x - \dfrac{vy_1 - vy_0}{w} y + vx_0 \\ vy = \dfrac{vy_1 - vy_0}{w} x + \dfrac{vx_1 - vx_0}{w} y + vy_0 \end{cases},$$

where $(vx_0, vy_0)$ are a motion vector of the upper left pixel sample, $(vx_1, vy_1)$ are a motion vector of the pixel sample in the right region, and w is a distance between the two pixel samples, or w may be a difference between the horizontal coordinate of the pixel sample in the right region and the horizontal coordinate of the upper left pixel sample.

Optionally, in some possible implementations of the present disclosure, when the two pixel samples include the upper left pixel sample of the current picture block and the pixel sample in the lower region below the upper left pixel sample, the affine motion model is specifically:

$$\begin{cases} vx = \dfrac{vy_2 - vy_0}{h} x + \dfrac{vx_2 - vx_0}{h} y + vx_0 \\ vy = \dfrac{vx_2 - vx_0}{h} x + \dfrac{vy_2 - vy_0}{h} y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples, or h may be the difference between the vertical coordinate of the pixel sample in the lower region and the vertical coordinate of the upper left pixel sample.

Optionally, in some possible implementations of the present disclosure, when the two pixel samples include the upper left pixel sample of the current picture block and the pixel sample in the lower right region on the lower right side of the upper left pixel sample, the affine motion model is specifically:

$$\begin{cases} vx = \dfrac{(vx_3w_1 + vy_3h_1) - (vx_0w_1 + vy_0h_1)}{w_1^2 + h_2^2}x + \dfrac{(vx_2h_1 - vy_3w_1) - (vx_0h_1 - vy_0w_1)}{w_2^2 + h_1^2}y + vx_0 \\ vy = -\dfrac{(vx_3h_1 - vy_3w_1) - (vx_0h_1 - vy_0w_1)}{w_2^2 + h_1^2}x + \dfrac{(vx_3w_1 - vy_3h_1) - (vx_0w_1 + vy_0h_1)}{w_1^2 + h_2^2}y + vy_0 \end{cases},$$

where $(vx_0, vy_0)$ are a motion vector of the upper left pixel sample, $(vx_3, vy_3)$ are a motion vector of the pixel sample in the lower right region, $h_1$ is a distance in a vertical direction between the two pixel samples, $w_1$ is a distance in a horizontal direction between the two pixel samples, and $w_1^2+h_1^2$ is a square of the distance between the two pixel samples.

Optionally, in some possible implementations of the present disclosure, when the two pixel samples are any two pixel samples in the video frame to which the current picture block belongs, the affine motion model is specifically:

$$vx = \dfrac{(vx_5 - vx_4)(x_5 - x_4) + (vy_5 - vy_4)(y_5 - y_4)}{(x_5 - x_4)^2 + (y_5 - y_4)^2}x -$$

$$\dfrac{(vy_5 - vy_4)(x_5 - x_4) + (vx_5 - vx_4)(y_5 - y_4)}{(x_5 - x_4)^2 + (y_5 - y_4)^2}y -$$

$$\left[\dfrac{(vx_5 - vx_4)(x_5 - x_4) + (vy_5 - vy_4)(y_5 - y_4)}{(x_2 - x_1)^2 + (y_2 - y_2)^2}x_4 - \right.$$

$$\left.\dfrac{(vy_5 - vy_4)(x_5 - x_4) + (vx_5 - vx_4)(y_5 - y_4)}{(x_5 - x_4)^2 + (y_5 - y_4)^3}y_4 - vx_4\right]$$

$$vy = \dfrac{(vy_5 - vy_4)(x_5 - x_4) + (vx_5 - vx_4)(y_5 - y_4)}{(x_5 - x_4)^2 + (y_5 - y_4)^2}x +$$

$$\dfrac{(vx_5 - vx_4)(x_5 - x_4) + (vy_5 - vy_4)(y_5 - y_4)}{(x_5 - x_4)^2 + (y_5 - y_4)^2} -$$

$$\left[\dfrac{(vy_5 - vy_4)(x_5 - x_4) + (vx_5 - vx_4)(y_5 - y_4)}{(x_5 - x_4)^2 + (y_5 - y_4)^2}x_4 + \right.$$

$$\left.\dfrac{(vx_5 - vx_4)(x_5 - x_4) + (vy_5 - vy_4)(y_5 - y_4)}{(x_5 - x_4)^2 + (y_5 - y_4)^2}y_4 - vy_4\right],$$

where $(x_4, y_4)$ are coordinates of one pixel sample in the two pixel samples, $(vx_4, vy_4)$ are a motion vector of the pixel sample whose coordinates are $(x_4, y_4)$, $(x_5, y_5)$ are coordinates of the other pixel sample in the two pixel samples, and $(vx_5, vy_5)$ are a motion vector of the other pixel sample whose coordinates are $(x_5, y_5)$.

It may be understood that, picture processing may be performed on each picture block in a current video frame in a mode similar to a picture processing mode corresponding to the current picture block. Certainly, picture processing may be performed on some picture blocks in the current video frame in a mode different from the picture processing mode corresponding to the current picture block.

S707. The video coding apparatus determines a predicted pixel value of a pixel of the any pixel sample in the current picture block by using the motion vector that is of the any pixel sample in the current picture block and is obtained through computation.

In a prediction process, reference frame indexes corresponding to motion vectors of any different pixel samples in the current picture block may be the same, and may be reference frame indexes corresponding to the motion vectors in the merged information unit set i.

Optionally, in some possible implementations of the present disclosure, the motion vector of the any pixel sample in the current picture block may be a motion vector of any pixel in the current picture block, and the process may be: determining a predicted pixel value of each pixel in the current picture block by using the motion vector that is of each pixel in the current picture block and is obtained through computation.

Optionally, in some possible implementations of the present disclosure, the motion vector of the any pixel sample in the current picture block may also be a motion vector of any pixel block in the current picture block, and the process may be: determining a predicted pixel value of each pixel in each pixel block in the current picture block by using the motion vector that is of each pixel block in the current picture block and is obtained through computation.

During a test, it is found that performing motion vector computation by using a pixel block in the current picture block as a granularity helps reduce computational complexity greatly if the motion vector of each pixel block in the current picture block is obtained through computation by using the affine motion model and the merged motion information unit set i and then the predicted pixel value of each pixel in each pixel block in the current picture block is determined by using the motion vector that is of each pixel block in the current picture block and is obtained through computation.

Optionally, in some possible implementations of the present disclosure, when the picture processing method is applied to a video coding process, the method may further include: performing motion compensation predictive coding on the any pixel sample in the current picture block by using the motion vector that is of the any pixel sample in the current picture block and is obtained through computation.

Specifically, the process may be: determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, so as to obtain a pixel reconstruction value of the any pixel sample; or determining the predicted pixel value of the pixel of the any pixel sample in the current picture block by using the motion vector that is of the any pixel sample in the current picture block and is obtained through computation; and performing motion compensation prediction on the any pixel sample by using the predicted pixel value of the pixel of the any pixel sample, obtaining a prediction residual of the any pixel sample by using the pixel value of the pixel of the any pixel sample obtained by performing motion compensation prediction and an actual pixel value of the pixel of the any pixel sample, and encoding the prediction residual into a bit stream, where the actual pixel value may also be referred to as an original pixel value.

It may be understood that, picture processing may be performed on each picture block in a current video frame in a mode similar to a picture processing mode corresponding to the current picture block. Certainly, picture processing may be performed on some picture blocks in the current video frame in a mode different from the picture processing mode corresponding to the current picture block.

In the technical solution provided by this embodiment of the present disclosure, an affine motion model based on rotation and scaling motion is constructed by using only two parameters. This not only reduces computational complexity, but also improves motion vector estimation accuracy.

After two displacement coefficients are introduced into the technical solution, motion vector estimation may be performed based on mixed motion of rotation, scaling, and translational motion according to the technical solution, so that motion vector estimation is more accurate.

Figure 8:
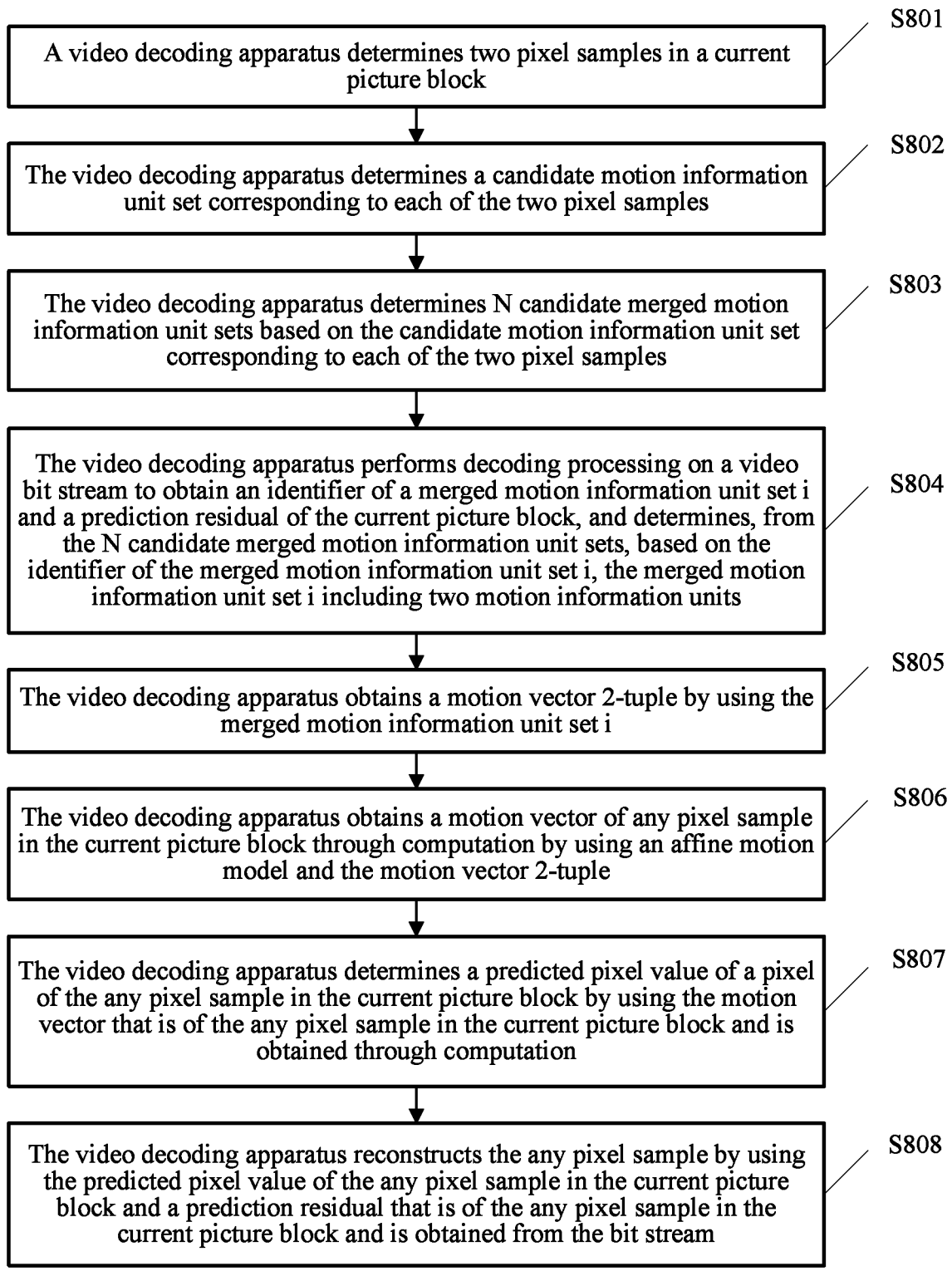
FIG. 8 is a schematic flowchart of another picture processing method according to an embodiment of the present disclosure.

Referring to FIG. 8, FIG. 8 is a schematic flowchart of another picture processing method according to another embodiment of the present disclosure. This embodiment is described mainly by using a picture processing method implemented in a video decoding apparatus as an example. As shown by way of example in FIG. 8, another picture processing method provided by another embodiment of the present disclosure may include the following steps.

S801. A video decoding apparatus determines two pixel samples in a current picture block.

The two pixel samples include two pixel samples in an upper left pixel sample, a pixel sample in a right region, a pixel sample in a lower region, and a pixel sample in a lower right region of the current picture block. For substantive content of the upper left pixel sample, the pixel sample in the right region, the pixel sample in the lower region, and the pixel sample in the lower right region of the current picture block, refer to the detailed description in the foregoing embodiment. Details are not described again herein.

S802. The video decoding apparatus determines a candidate motion information unit set corresponding to each of the two pixel samples.

For a specific process in which the video decoding apparatus determines the candidate motion information unit set corresponding to each of the two pixel samples in S802, refer to the specific process in which the video coding apparatus determines the candidate motion information unit set corresponding to each of the two pixel samples in S702. Details are not described again herein.

S803. The video decoding apparatus determines N candidate merged motion information unit sets based on the candidate motion information unit set corresponding to each of the two pixel samples.

For a specific process in which the video decoding apparatus determines the N candidate merged motion information unit sets based on the candidate motion information unit set corresponding to each of the two pixel samples in S803, refer to the specific process in which the video coding apparatus determines the N candidate merged motion information unit sets based on the candidate motion information unit set corresponding to each of the two pixel samples in S703. Details are not described again herein.

S804. The video decoding apparatus performs decoding processing on a video bit stream to obtain an identifier of a merged motion information unit set i and a prediction residual of the current picture block, and determines, from the N candidate merged motion information unit sets, based on the identifier of the merged motion information unit set i, the merged motion information unit set i including two motion information units.

Correspondingly, the video coding apparatus may write the identifier of the merged motion information unit set i into the video bit stream.

S805. The video decoding apparatus obtains a motion vector 2-tuple by using the merged motion information unit set i.

Optionally, in some possible implementations of the present disclosure, the video decoding apparatus may use a motion vector of each motion information unit in the merged information unit set i of the current picture block as a predicted value of the motion vector, decode the bit stream to obtain motion vector prediction differences of the two pixel samples in the current picture block, and add a motion vector prediction difference corresponding to each motion vector in a motion vector predictor to the motion vector in the motion vector predictor, so as to obtain the motion vector 2-tuple including the motion vectors of the two pixel samples in the current picture block.

S806. The video decoding apparatus obtains a motion vector of any pixel sample in the current picture block through computation by using an affine motion model and the motion vector 2-tuple.

For a specific process in which the video decoding apparatus obtains the motion vector of the any pixel sample in the current picture block through computation by using the affine motion model and the motion vector 2-tuple in S806, refer to the specific process in which the video coding apparatus obtains the motion vector of the any pixel sample in the current picture block through computation by using the affine motion model and the motion vector 2-tuple in S706. Details are not described again herein.

S807. The video decoding apparatus determines a predicted pixel value of a pixel of the any pixel sample in the current picture block by using the motion vector that is of the any pixel sample in the current picture block and is obtained through computation.

In a prediction process, reference frame indexes corresponding to motion vectors of any different pixel samples in the current picture block may be the same, and may be reference frame indexes corresponding to the motion vectors in the merged information unit set i.

For a specific process in which the video decoding apparatus determines the predicted pixel value of the pixel of the any pixel sample in the current picture block by using the motion vector that is of the any pixel sample in the current picture block and is obtained through computation in S807, refer to the specific process in which the video coding apparatus determines the predicted pixel value of the pixel of the any pixel sample in the current picture block by using the motion vector that is of the any pixel sample in the current picture block and is obtained through computation in S707. Details are not described again herein.

S808. The video decoding apparatus reconstructs the any pixel sample by using the predicted pixel value of the any pixel sample in the current picture block and a prediction residual that is of the any pixel sample in the current picture block and is obtained from the bit stream.

Specifically, the process may be: performing motion compensation prediction on the any pixel sample by using the predicted pixel value of the pixel of the any pixel sample, so as to obtain a pixel reconstruction value of the any pixel sample; or performing motion compensation prediction on the any pixel sample by using the predicted pixel value of the pixel of the any pixel sample, decoding the bit stream to obtain a prediction residual of the any pixel sample, and obtaining a pixel reconstruction value of the any pixel sample with reference to the pixel value that is of the pixel of the any pixel sample and is obtained by performing motion compensation prediction.

It may be understood that, picture processing may be performed on each picture block in a current video frame in a mode similar to a picture processing mode corresponding to the current picture block. Certainly, picture processing may be performed on some picture blocks in the current video frame in a mode different from the picture processing mode corresponding to the current picture block.

In the technical solution provided by this embodiment of the present disclosure, an affine motion model based on rotation and scaling motion is constructed by using only two parameters. This not only reduces computational complexity, but also improves motion vector estimation accuracy. After two displacement coefficients are introduced into the technical solution, motion vector estimation may be performed based on mixed motion of rotation, scaling, and translational motion according to the technical solution, so that motion vector estimation is more accurate.

The following further provides related apparatuses for implementing the foregoing solutions.

Figure 9:
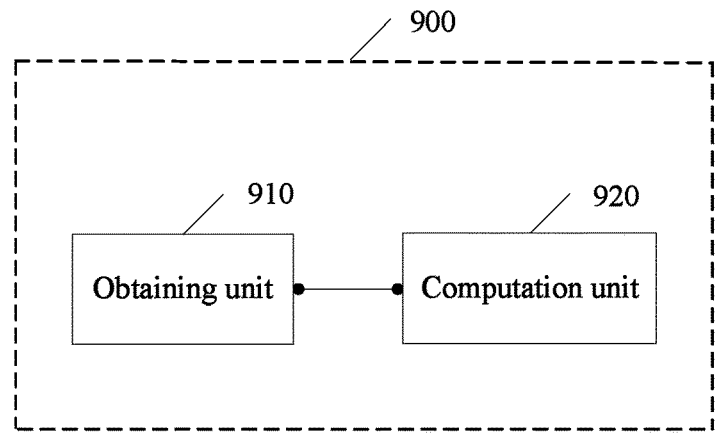
FIG. 9 is a schematic diagram of a picture processing apparatus according to an embodiment of the present disclosure.

Referring to FIG. 9, an embodiment of the present disclosure further provides a picture processing apparatus 900. The apparatus may include:

an obtaining unit 910, configured to obtain a motion vector 2-tuple of a current picture block, where the motion vector 2-tuple includes motion vectors of two pixel samples in a video frame to which the current picture block belongs; and a computation unit 920, configured to obtain a motion vector of any pixel sample in the current picture block through computation by using an affine motion model and the motion vector 2-tuple obtained by the obtaining unit 910; where the affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

Optionally, in some possible implementations of the present disclosure, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

Optionally, in some possible implementations of the present disclosure, the computation unit 920 may be specifically configured to: obtain values of the coefficients of the affine motion model by using the motion vectors of the two pixel samples and locations of the two pixel samples; and obtain the motion vector of the any pixel sample in the current picture block by using the affine motion model and the values of the coefficients of the affine motion model.

Optionally, in some possible implementations of the present disclosure, the computation unit 920 may be specifically configured to: obtain the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtain the motion vector of the any pixel sample in the current picture block by using the affine motion model and the values of the coefficients of the affine motion model.

Optionally, in some possible implementations of the present disclosure, the computation unit 920 may be specifically configured to: obtain the values of the coefficients of the affine motion model by using a ratio of a weighted sum of components of the motion vectors of the two pixel samples to a distance between the two pixel samples or to a square of a distance between the two pixel samples; and obtain the motion vector of the any pixel sample in the current picture block by using the affine motion model and the values of the coefficients of the affine motion model.

Optionally, in some possible implementations of the present disclosure, when the two pixel samples include an upper left pixel sample of the current picture block and a pixel sample in a right region on a right side of the upper left pixel sample, the affine motion model is specifically:

$$\begin{cases} vx = \dfrac{vx_1 - vx_0}{w} x - \dfrac{vy_1 - vy_0}{w} y + vx_0 \\ vy = \dfrac{vy_1 - vy_0}{w} x + \dfrac{vx_1 - vx_0}{w} y + vy_0 \end{cases},$$

where $(vx_0, vy_0)$ are a motion vector of the upper left pixel sample, $(vx_1, vy_1)$ are a motion vector of the pixel sample in the right region, and w is a distance between the two pixel samples.

Optionally, in some possible implementations of the present disclosure, when the two pixel samples include an upper left pixel sample of the current picture block and a pixel sample in a lower region below the upper left pixel sample, the affine motion model is specifically:

$$\begin{cases} vx = \dfrac{vy_2 - vy_0}{h} x + \dfrac{vx_2 - vx_0}{h} y + vx_0 \\ vy = -\dfrac{vx_2 - vx_0}{h} x + \dfrac{vy_2 - vy_0}{h} y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples.

Optionally, in some possible implementations of the present disclosure, when the two pixel samples include an upper left pixel sample of the current picture block and a pixel sample in a lower right region on a lower right side of the upper left pixel sample, the affine motion model is specifically:

$$\begin{cases} vx = \dfrac{(vx_2 w_1 + vy_3 h_1) - (vx_0 w_1 + vy_0 h_1)}{w_1^2 + h_2^2} x + \dfrac{(vx_2 h_1 - vy_2 w_1) - (vx_0 h_1 - vy_0 w_1)}{w_1^2 + h_1^2} y + vx_0 \\ vy = -\dfrac{(vx_3 h_1 - vy_3 w_1) - (vx_0 h_1 - vy_0 w_1)}{w_2^2 + h_1^2} x + \dfrac{(vx_3 w_1 + vy_3 h_1) - (vx_0 w_1 - vy_0 h_1)}{w_2^2 + h_1^2} y + vy_0 \end{cases},$$

where ($vx_0$, $vy_0$) are a motion vector of the upper left pixel sample, ($vx_3$, $vy_3$) are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

Optionally, in some possible implementations of the present disclosure, the picture processing apparatus 900 is applied to a video coding apparatus or the picture prediction apparatus is applied to a video decoding apparatus.

Optionally, in some possible implementations of the present disclosure, when the picture processing apparatus 900 is applied to the video coding apparatus, the apparatus further includes an encoding unit, configured to perform motion compensation predictive coding on the any pixel sample in the current picture block by using the motion vector that is of the any pixel sample in the current picture block and is obtained by the computation unit 920 through computation.

Optionally, in some possible implementations of the present disclosure, when the picture processing apparatus 900 is applied to the video coding apparatus, the apparatus further includes a decoding unit, configured to perform motion compensation decoding on the any pixel sample by using the motion vector that is of the any pixel sample in the current picture block and is obtained by the computation unit 920 through computation, and obtain a pixel reconstruction value of the any pixel sample.

It should be noted that, the picture processing apparatus 900 in this embodiment may further include functional units in the picture prediction apparatus 400; the obtaining unit 910 and the computation unit 920 in the picture processing apparatus 900 in this embodiment may be applied to the predicting unit 430, so that functions required by the predicting unit 430 are implemented. For the detailed description of each functional unit in the picture prediction apparatus 400, refer to the detailed description in the foregoing embodiment. Details are not described again herein.

It may be understood that, functions of functional units of the picture processing apparatus 900 in this embodiment may be specifically implemented according to the method in the foregoing method embodiment. For a specific implementation process thereof, refer to the related description in the foregoing method embodiment. Details are not described again herein. The picture processing apparatus 900 may be any apparatus that needs to output and play a video, for example, a device such as a notebook computer, a tablet computer, a personal computer, or a mobile phone.

In the technical solution provided by this embodiment of the present disclosure, the picture processing apparatus 900 constructs an affine motion model based on rotation and scaling motion by using only two parameters. This not only reduces computational complexity, but also improves motion vector estimation accuracy. After two displacement coefficients are introduced into the picture processing apparatus 900, the picture processing apparatus 900 may perform motion vector estimation based on mixed motion of rotation, scaling, and translational motion, so that motion vector estimation is more accurate.

Figure 10:
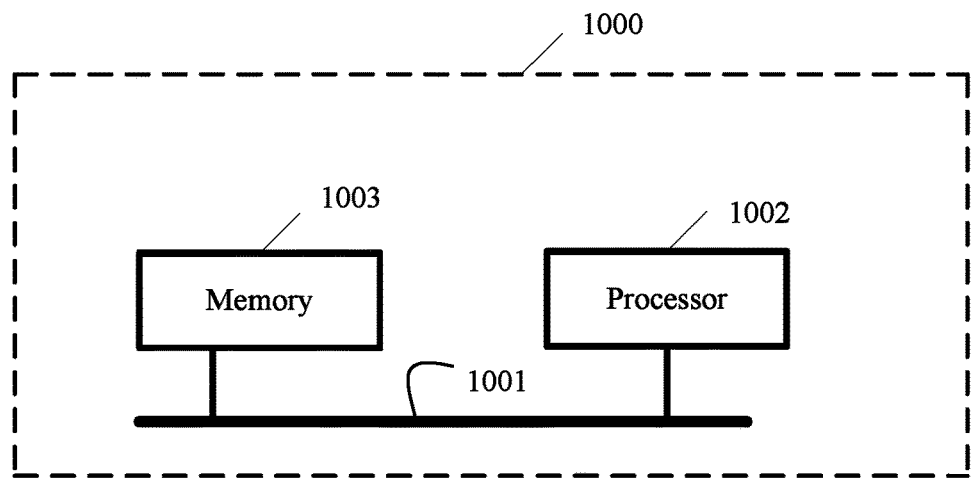
FIG. 10 is a schematic diagram of another picture processing apparatus according to an embodiment of the present disclosure.

Referring to FIG. 10, FIG. 10 is a schematic diagram of a picture processing apparatus 1000 according to an embodiment of the present disclosure. The picture processing apparatus 1000 may include at least one bus 1001, at least one processor 1002 connected to the bus 1001, and at least one memory 1003 connected to the bus 1001.

The processor 1002 invokes, by using the bus 1001, code or an instruction stored in the memory 1003, so that the processor 1002 is configured to: obtain a motion vector 2-tuple of a current picture block, where the motion vector 2-tuple includes motion vectors of two pixel samples in a video frame to which the current picture block belongs; and obtain a motion vector of any pixel sample in the current picture block through computation by using an affine motion model and the motion vector 2-tuple.

Optionally, in some possible implementations of the present disclosure, the affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, and −b is a horizontal coordinate coefficient of the vertical component of the affine motion model.

Optionally, in some possible implementations of the present disclosure, the affine motion model further includes a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

Optionally, in some possible implementations of the present disclosure, in an aspect of obtaining the motion vector of the any pixel sample in the current picture block through computation by using the affine motion model and the motion vector 2-tuple, the processor 1002 may be configured to: obtain values of the coefficients of the affine motion model by using the motion vectors of the two pixel samples and locations of the two pixel samples; and obtain the motion vector of the any pixel sample in the current picture block by using the affine motion model and the values of the coefficients of the affine motion model.

Optionally, in some possible implementations of the present disclosure, in the aspect of obtaining the motion vector of the any pixel sample in the current picture block through computation by using the affine motion model and the motion vector 2-tuple, the processor 1002 may be configured to: obtain the values of the coefficients of the affine motion model by using a ratio of a difference between horizontal components of the motion vectors of the two pixel samples to a distance between the two pixel samples and a ratio of a difference between vertical components of the motion vectors of the two pixel samples to the distance between the two pixel samples; and obtain the motion vector of the any pixel sample in the current picture block by using the affine motion model and the values of the coefficients of the affine motion model.

Optionally, in some possible implementations of the present disclosure, in the aspect of obtaining the motion vector of the any pixel sample in the current picture block through computation by using the affine motion model and the motion vector 2-tuple, the processor 1002 may be configured to: obtain the values of the coefficients of the affine motion model by using a ratio of a weighted sum of components of the motion vectors of the two pixel samples to a distance between the two pixel samples or to a square of a distance between the two pixel samples; and obtain the motion vector of the any pixel sample in the current picture block by using the affine motion model and the values of the coefficients of the affine motion model.

Optionally, in some possible implementations of the present disclosure, when the two pixel samples include an upper left pixel sample of the current picture block and a pixel sample in a right region on a right side of the upper left pixel sample, the affine motion model may be specifically:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

where $(vx_0, vy_0)$ are a motion vector of the upper left pixel sample, $(vx_1, vy_1)$ are a motion vector of the pixel sample in the right region, and w is a distance between the two pixel samples.

Optionally, in some possible implementations of the present disclosure, when the two pixel samples include an upper left pixel sample of the current picture block and a pixel sample in a lower region below the upper left pixel sample, the affine motion model may be specifically:

$$\begin{cases} vx = \dfrac{vy_2 - vy_0}{h}x + \dfrac{vx_2 - vx_0}{h}y + vx_0 \\ vy = -\dfrac{vx_2 - vx_0}{h}x + \dfrac{vy_2 - vy_0}{h}y + vy_0 \end{cases},$$

where $(vx_0, vy_0)$ are a motion vector of the upper left pixel sample, $(vx_2, vy_2)$ are a motion vector of the pixel sample in the lower region, and h is a distance between the two pixel samples.

Optionally, in some possible implementations of the present disclosure, when the two pixel samples include an upper left pixel sample of the current picture block and a pixel sample in a lower right region on a lower right side of the upper left pixel sample, the affine motion model may be specifically:

$$\begin{cases} vx = \dfrac{(vx_3 w_1 + vy_3 h_1) - (vx_0 w_1 + vy_0 h_1)}{w_1^2 + h_1^2}x + \dfrac{(vx_3 h_1 - vy_3 w_1) - (vx_0 h_1 - vy_0 w_1)}{w_1^2 + h_1^2}y + vx_0 \\ vy = -\dfrac{(vx_3 h_1 - vy_3 w_1) - (vx_0 h_1 - vy_0 w_1)}{w_2^2 + h_1^2}x + \dfrac{(vx_3 w_1 + vy_3 h_1) - (vx_0 w_1 + vy_0 h_1)}{w_1^2 + h_1^2}y + vy_0 \end{cases},$$

where $(vx_0, vy_0)$ are a motion vector of the upper left pixel sample, $(vx_3, vy_3)$ are a motion vector of the pixel sample in the lower right region, $h_1$ is a distance in a vertical direction between the two pixel samples, $w_1$ is a distance in a horizontal direction between the two pixel samples, and $w_1^2 + h_1^2$ is a square of the distance between the two pixel samples.

Optionally, in some possible implementations of the present disclosure, the picture processing apparatus 1000 is applied to a video coding apparatus or the picture prediction apparatus is applied to a video decoding apparatus.

Optionally, in some possible implementations of the present disclosure, when the picture processing apparatus is applied to the video coding apparatus, the processor 1002 is further configured to: after obtaining the motion vector of the any pixel sample in the current picture block through computation by using the affine motion model and the motion vector 2-tuple, perform motion compensation predictive coding on the any pixel sample in the current picture block by using the motion vector that is of the any pixel sample in the current picture block and is obtained through computation.

Optionally, in some possible implementations of the present disclosure, when the picture processing apparatus is applied to the video decoding apparatus, the processor 1002 is further configured to: after determining a predicted pixel value of a pixel of the any pixel sample in the current picture block, perform motion compensation decoding on the any pixel sample by using the motion vector that is of the any pixel sample in the current picture block and is obtained through computation, and obtain a pixel reconstruction value of the any pixel sample.

It may be understood that, functions of functional units of the picture processing apparatus 1000 in this embodiment may be specifically implemented according to the method in the foregoing method embodiment. For a specific implementation process thereof, refer to the related description in the foregoing method embodiment. Details are not described again herein. The picture processing apparatus 1000 may be any apparatus that needs to output and play a video, for example, a device such as a notebook computer, a tablet computer, a personal computer, or a mobile phone.

In the technical solution provided by this embodiment of the present disclosure, a picture processing apparatus 1000 constructs an affine motion model based on rotation and scaling motion by using only two parameters. This not only reduces computational complexity, but also improves motion vector estimation accuracy. After two displacement coefficients are introduced into the picture processing apparatus 1000, the picture processing apparatus 1000 may perform motion vector estimation based on mixed motion of rotation, scaling, and translational motion, so that motion vector estimation is more accurate.

An embodiment of the present disclosure further provides a computer storage medium. The computer storage medium may store a program, and when the program is executed, at least some or all of the steps of any picture processing method in the foregoing method embodiments may be performed.

In the foregoing embodiments, the description of each embodiment has respective focuses. For a part that is not described in detail in an embodiment, refer to related descriptions in other embodiments.

Figure 11:
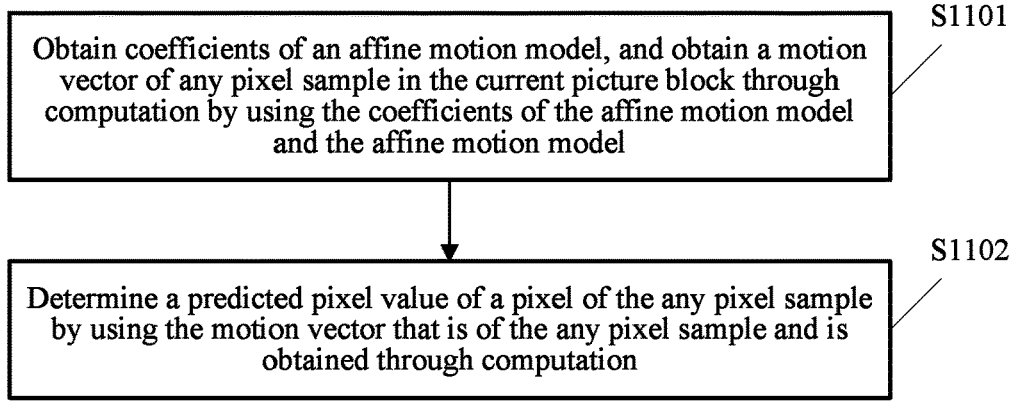
FIG. 11 is a schematic flowchart of another picture processing method according to an embodiment of the present disclosure.

Referring to FIG. 11, FIG. 11 is a schematic flowchart of another picture processing method according to another embodiment of the present disclosure. As shown by way of example in FIG. 11, another picture processing method provided by another embodiment of the present disclosure may include the following steps.

S1101. Obtain coefficients of an affine motion model, and obtain a motion vector of any pixel sample in a current picture block through computation by using the coefficients of the affine motion model and the affine motion model.

Optionally, in some possible implementations of the present disclosure, the affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, −b is a horizontal coordinate coefficient of the vertical component of the affine motion model, and the coefficients of the affine motion model may include a and b.

Optionally, in some possible implementations of the present disclosure, the coefficients of the affine motion model may further include a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

S1102. Determine a predicted pixel value of a pixel of the any pixel sample by using the motion vector that is of the any pixel sample and is obtained through computation.

For the detailed description in this embodiment, refer to the related description in the foregoing embodiment.

In the technical solution provided by this embodiment of the present disclosure, an affine motion model based on rotation and scaling motion is constructed by using only two parameters. This not only reduces computational complexity, but also improves motion vector estimation accuracy. After two displacement coefficients are introduced into the technical solution, motion vector estimation may be performed based on mixed motion of rotation, scaling, and translational motion according to the technical solution, so that motion vector estimation is more accurate.

Figure 12:
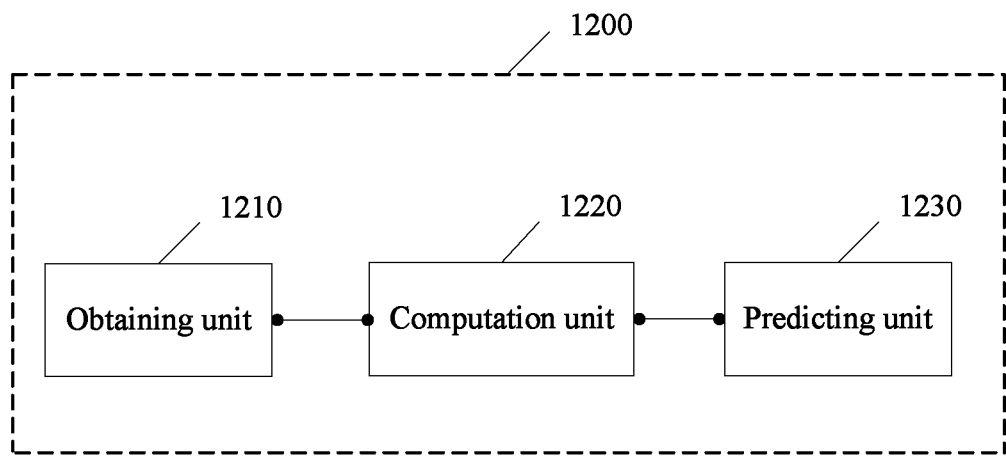
FIG. 12 is a schematic diagram of a picture processing apparatus according to an embodiment of the present disclosure.

Referring to FIG. 12, an embodiment of the present disclosure further provides a picture processing apparatus 1200. The apparatus may include:

an obtaining unit 1210, configured to obtain coefficients of an affine motion model;

a computation unit 1220, configured to obtain a motion vector of any pixel sample in the current picture block through computation by using the coefficients of the affine motion model that are obtained by the obtaining unit 1210 and the affine motion model; and a predicting unit 1230, configured to determine a predicted pixel value of a pixel of the any pixel sample by using the motion vector that is of the any pixel sample and is obtained by the computation unit 1220 through computation.

Optionally, in some possible implementations of the present disclosure, the affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, −b is a horizontal coordinate coefficient of the vertical component of the affine motion model, and the coefficients of the affine motion model may include a and b.

Optionally, in some possible implementations of the present disclosure, the coefficients of the affine motion model may further include a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

For the detailed description in this embodiment, refer to the related description in the foregoing embodiment.

It may be understood that, functions of functional units of the picture processing apparatus 1200 in this embodiment may be specifically implemented according to the method in the foregoing method embodiment. For a specific implementation process thereof, refer to the related description in the foregoing method embodiment. Details are not described again herein. The picture processing apparatus 1200 may be any apparatus that needs to output and play a video, for example, a device such as a notebook computer, a tablet computer, a personal computer, or a mobile phone.

In the technical solution provided by this embodiment of the present disclosure, the picture processing apparatus 1200 constructs an affine motion model based on rotation and scaling motion by using only two parameters. This not only reduces computational complexity, but also improves motion vector estimation accuracy. After two displacement coefficients are introduced into the picture processing apparatus 1200, the picture processing apparatus 1200 may perform motion vector estimation based on mixed motion of rotation, scaling, and translational motion, so that motion vector estimation is more accurate.

Figure 13:
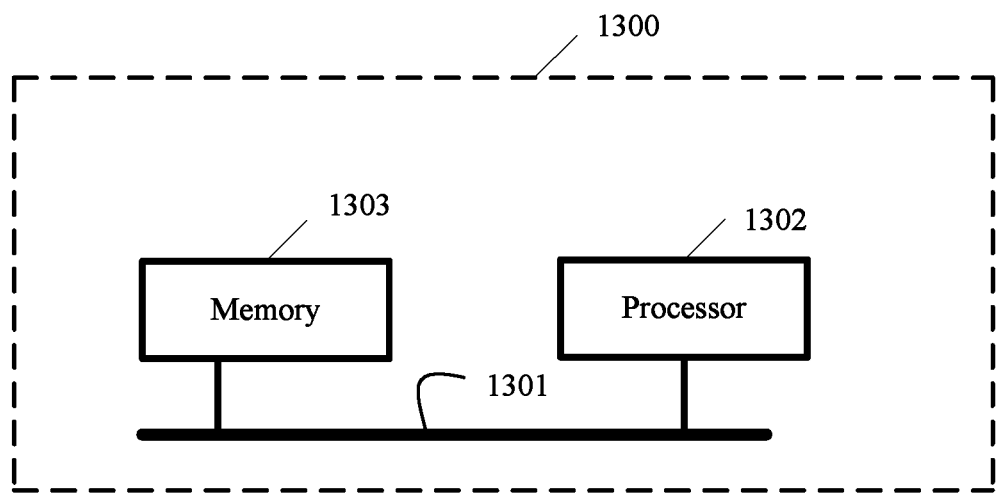
FIG. 13 is a schematic diagram of another picture processing apparatus according to an embodiment of the present disclosure.

Referring to FIG. 13, FIG. 13 is a schematic diagram of a picture processing apparatus 1300 according to an embodiment of the present disclosure. The picture processing apparatus 1300 may include at least one bus 1301, at least one processor 1302 connected to the bus 1301, and at least one memory 1303 connected to the bus 1301.

The processor 1302 invokes, by using the bus 1301, code or an instruction stored in the memory 1303, so that the processor 1302 is configured to: obtain coefficients of an affine motion model, and obtain a motion vector of any pixel sample in the current picture block through computation by using the coefficients of the affine motion model and the affine motion model; and determine a predicted pixel value of a pixel of the any pixel sample by using the motion vector that is of the any pixel sample and is obtained through computation.

Optionally, in some possible implementations of the present disclosure, the affine motion model may be in the following form:

$$\begin{cases} vx = ax + by \\ vy = -bx + ay \end{cases},$$

where (x, y) are coordinates of the any pixel sample, vx is a horizontal component of the motion vector of the any pixel sample, and vy is a vertical component of the motion vector of the any pixel sample; and in the equation vx=ax+by, a is a horizontal coordinate coefficient of the horizontal component of the affine motion model, and b is a vertical coordinate coefficient of the horizontal component of the affine motion model; and in the equation vy=−bx+ay, a is a vertical coordinate coefficient of the vertical component of the affine motion model, −b is a horizontal coordinate coefficient of the vertical component of the affine motion model, and the coefficients of the affine motion model may include a and b.

Optionally, in some possible implementations of the present disclosure, the coefficients of the affine motion model may further include a horizontal displacement coefficient c of the horizontal component of the affine motion model and a vertical displacement coefficient d of the vertical component of the affine motion model, and therefore, the affine motion model is in the following form:

$$\begin{cases} vx = ax + by + c \\ vy = -bx + ay + d \end{cases}.$$

For the detailed description in this embodiment, refer to the related description in the foregoing embodiment.

It may be understood that, functions of functional units of the picture processing apparatus 1300 in this embodiment may be specifically implemented according to the method in the foregoing method embodiment. For a specific implementation process thereof, refer to the related description in the foregoing method embodiment. Details are not described again herein. The picture processing apparatus 1300 may be any apparatus that needs to output and play a video, for example, a device such as a notebook computer, a tablet computer, a personal computer, or a mobile phone.

In the technical solution provided by this embodiment of the present disclosure, the picture processing apparatus 1300 constructs an affine motion model based on rotation and scaling motion by using only two parameters. This not only reduces computational complexity, but also improves motion vector estimation accuracy. After two displacement coefficients are introduced into the picture processing apparatus 1300, the picture processing apparatus 1300 may perform motion vector estimation based on mixed motion of rotation, scaling, and translational motion, so that motion vector estimation is more accurate.

An embodiment of the present disclosure further provides a computer storage medium. The computer storage medium may store a program, and when the program is executed, at least some or all of the steps of any picture processing method in the foregoing method embodiments may be performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected according to actual requirements to achieve objectives of solutions of embodiments.

In addition, functional units in embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, technical solutions of the present disclosure may be implemented in the form of a software product. The software product is stored in a storage medium and includes several instructions for instructing a computer device (which may be a personal computer, a server, or a network device, and may specifically be a processor in a computer device) to perform all or some of the steps of the foregoing methods described in embodiments of the present disclosure. The foregoing storage medium includes: any medium that can store program code, such as a Universal Serial Bus (USB)

flash drive, a removable hard disk, a magnetic disk, an optical disc, a read-only memory (ROM), or a random access memory (RAM).

The foregoing embodiments are merely intended for describing exemplary technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. A picture processing method, comprising:
obtaining, by a picture processing apparatus, motion vectors of two pixel samples in a video frame to which a current picture block belongs; and
obtaining, by the picture processing apparatus, a motion vector of a pixel sample in the current picture block by using an affine motion model and the obtained motion vectors;
wherein the affine motion model comprises:

$$\begin{cases} vx = ax + by + c \\ vy = -bx + ay + d \end{cases},$$

wherein (x, y) are coordinates of the pixel sample, vx is a horizontal component of the motion vector of the pixel sample, vy is a vertical component of the motion vector of the pixel sample, and a, b, c and d are coefficients of the affine motion model.

2. The method of claim 1, wherein when the two pixel samples comprise an upper left pixel sample of the current picture block and an upper right pixel sample of the current picture block, a is $$\frac{vx_2 - vx_0}{w},$$

b is $$-\frac{vy_2 - vy_0}{w},$$

c is $vx_0$, d is $vy_0$, and the affine motion model comprises:

$$\begin{cases} vx = \frac{vx_2 - vx_0}{w}x - \frac{vy_2 - vy_0}{w}y + vx_0 \\ vy = \frac{vy_2 - vy_0}{w}x + \frac{vx_2 - vx_0}{w}y + vy_0 \end{cases},$$

and wherein $(vx_0, vy_0)$ is a motion vector of the upper left pixel sample, $(vx_1, vy_1)$ is a motion vector of the upper right pixel sample, and w is a distance between the two pixel samples.

3. The method of claim 1, wherein when the two pixel samples comprise an upper left pixel sample of the current picture block and a lower left pixel sample of the current picture block, a is $$\frac{vy_2 - vy_0}{h},$$

b is $$\frac{vx_2 - vx_0}{h},$$

c is $vx_0$, d is $vy_0$, and the affine motion model comprises:

$$\begin{cases} vx = \frac{vy_2 - vy_0}{h}x - \frac{vx_2 - vx_0}{h}y + vx_0 \\ vy = \frac{vx_2 - vx_0}{h}x + \frac{vy_2 - vy_0}{h}y + vy_0 \end{cases},$$

and wherein $(vx_0, vy_0)$ is a motion vector of the upper left pixel sample, $(vx_2, vy_2)$ is a motion vector of the lower left pixel sample, and h is a distance between the two pixel samples.

4. The method of claim 1, wherein after obtaining the motion vector of the pixel sample in the current picture block, the method further comprises:
performing motion compensation predictive coding on a picture block by using the motion vector of the pixel sample in the current picture block, wherein the pixel sample in the current picture block belongs to the picture block and the picture block belongs to the current picture block.

5. A picture processing apparatus comprising a processor and a non-transitory memory having instructions stored thereon, wherein the instructions, when executed by the processor, facilitate:
obtaining motion vectors of two pixel samples in a video frame to which a current picture block belongs; and
obtaining a motion vector of a pixel sample in the current picture block by using an affine motion model and the obtained motion vectors;
wherein the affine motion model comprises:

$$\begin{cases} vx = ax + by + c \\ vy = -bx + ay + d \end{cases},$$

wherein (x, y) are coordinates of the pixel sample, vx is a horizontal component of the motion vector of the pixel sample, vy is a vertical component of the motion vector of the pixel sample, and a, b, c and d are coefficients of the affine motion model.

6. The apparatus of claim 5, wherein when the two pixel samples comprise an upper left pixel sample of the current picture block and an upper right pixel sample of the current picture block, a is $$\frac{vx_1 - vx_0}{w},$$

b is $$-\frac{vy_1 - vy_0}{w},$$

c is $vx_0$, d is $vy_0$, and the affine motion model comprises:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

and wherein $(vx_0, vy_0)$ is a motion vector of the upper left pixel sample, $(vx_1, vy_1)$ is a motion vector of the upper right pixel sample, and w is a distance between the two pixel samples.

7. The apparatus of claim 5, wherein when the two pixel samples comprise an upper left pixel sample of the current picture block and a lower left pixel sample of the current picture block, a is $$\dfrac{vy_2 - vy_0}{h},$$

b is $$\dfrac{vx_2 - vx_0}{h},$$

c is $vx_0$, d is $vy_0$, and the affine motion model comprises:

$$\begin{cases} vx = \dfrac{vy_2 - vy_0}{h}x - \dfrac{vx_2 - vx_0}{h}y + vx_0 \\ vy = \dfrac{vx_2 - vx_0}{h}x + \dfrac{vy_2 - vy_0}{h}y + vy_0 \end{cases},$$

and wherein $(vx_0, vy_0)$ is a motion vector of the upper left pixel sample, $(vx_2, vy_2)$ is a motion vector of the lower left pixel sample, and h is a distance between the two pixel samples.

8. The apparatus of claim 5, wherein the instructions, when executed by the processor, further facilitate:
performing motion compensation predictive coding on a picture block by using the motion vector of the pixel sample in the current picture block, wherein the pixel sample in the current picture block belongs to the picture block and the picture block belongs to the current picture block.

9. A non-transitory computer-readable medium having processor-executable instructions stored thereon, wherein the processor-executable instructions, when executed, facilitate:
obtaining motion vectors of two pixel samples in a video frame to which a current picture block belongs; and
obtaining a motion vector of a pixel sample in the current picture block by using an affine motion model and the obtained motion vectors;
wherein the affine motion model comprises:

$$\begin{cases} vx = ax + by + c \\ vy = -bx + ay + d \end{cases},$$

wherein $(x, y)$ are coordinates of the pixel sample, vx is a horizontal component of the motion vector of the pixel sample, vy is a vertical component of the motion vector of the pixel sample, and a, b, c and d are coefficients of the affine motion model.

10. The non-transitory computer-readable medium of claim 9, wherein when the two pixel samples comprise an upper left pixel sample of the current picture block and an upper right pixel sample of the current picture block, a is $$\dfrac{vx_1 - vx_0}{w},$$

b is $$-\dfrac{vy_1 - vy_0}{w},$$

c is $vx_0$, d is $vy_0$, and the affine motion model comprises:

$$\begin{cases} vx = \dfrac{vx_1 - vx_0}{w}x - \dfrac{vy_1 - vy_0}{w}y + vx_0 \\ vy = \dfrac{vy_1 - vy_0}{w}x + \dfrac{vx_1 - vx_0}{w}y + vy_0 \end{cases},$$

and wherein $(vx_0, vy_0)$ is a motion vector of the upper left pixel sample, $(vx_1, vy_1)$ is a motion vector of the upper right pixel sample, and w is a distance between the two pixel samples.

11. The non-transitory computer-readable medium of claim 9, wherein when the two pixel samples comprise an upper left pixel sample of the current picture block and a lower left pixel sample of the current picture block, a is $$\dfrac{vy_2 - vy_0}{h},$$

b is $$\dfrac{vx_2 - vx_0}{h},$$

c is $vx_0$, d is $vy_0$, and the affine motion model comprises:

$$\begin{cases} vx = \dfrac{vy_2 - vy_0}{h}x - \dfrac{vx_2 - vx_0}{h}y + vx_0 \\ vy = \dfrac{vx_2 - vx_0}{h}x + \dfrac{vy_2 - vy_0}{h}y + vy_0 \end{cases},$$

and wherein $(vx_0, vy_0)$ is a motion vector of the upper left pixel sample, $(vx_2, vy_2)$ is a motion vector of the lower left pixel sample, and h is a distance between the two pixel samples.

12. The non-transitory computer-readable medium of claim 9, wherein the processor-executable instructions, when executed, further facilitate:
performing motion compensation predictive coding on a picture block by using the motion vector of the pixel sample in the current picture block, wherein the pixel sample in the current picture block belongs to the picture block and the picture block belongs to the current picture block.

* * * * *